(12) United States Patent
Ramaraju et al.

(10) Patent No.: US 12,706,744 B2
(45) Date of Patent: Aug. 11, 2026

(54) COMPUTER-IMPLEMENTED SYSTEM AND METHOD FOR MANAGING AUTHENTICATION BETWEEN USER DEVICE AND AUTHENTICATION SERVER USING PRIVATE-PUBLIC KEY CRYPTOGRAPHY

(71) Applicant: Hawcx Inc, Los Altos, CA (US)

(72) Inventors: Ravindraraj Ramaraju, Round Rock, TX (US); Selvanathan Kumaraswamy, Round Rock, TX (US); Sri Soundarya Kottur Shanmugam, Los Altos, CA (US)

(73) Assignee: Hawcx Inc

( * ) Notice: Subject to any disclaimer, the term of this patent is extended or adjusted under 35 U.S.C. 154(b) by 5 days.

(21) Appl. No.: 18/659,245

(22) Filed: May 9, 2024

(65) Prior Publication Data

US 2025/0350461 A1 Nov. 13, 2025

(51) Int. Cl.

| | |
|---|---|
| ***H04L 29/06*** | (2006.01) |
| ***G06F 21/00*** | (2013.01) |
| ***H04L 9/08*** | (2006.01) |
| ***H04L 9/32*** | (2006.01) |

(52) U.S. Cl.

CPC ............ *H04L 9/321* (2013.01); *H04L 9/0869* (2013.01); *H04L 9/3228* (2013.01)

(58) Field of Classification Search

None

See application file for complete search history.

(56) References Cited

U.S. PATENT DOCUMENTS 8,868,923 B1 * 10/2014 Hamlet .................... H04L 9/00 326/8
11,263,298 B2 * 3/2022 Richardson ........... H04L 9/0863
2020/0099521 A1 * 3/2020 McDonald-Maier ........................ H04L 9/3242

* cited by examiner

*Primary Examiner* — Lisa C Lewis

(74) *Attorney, Agent, or Firm* — Jason C. Cameron

(57) ABSTRACT

A computer-implemented method and system for managing an authentication between user devices and authentication servers, is disclosed. The computer-implemented method includes: obtaining user credentials associated with users; retrieving information associated with device fingerprints corresponding to the user devices; generating cipher messages by at least one of: creating random numbers and encrypting the random numbers with keys derived from at least one of: the first and second index; transmitting the one or more user identities, the first index, the second index, and the cipher messages, to authentication servers; dynamically generating the private keys from private key variables; generating authentication responses by decoding authentication based questions obtained from the authentication servers, using cipher messages and the private keys; and transmitting the authentication responses to the authentication servers for adapting the authentication servers to authenticate the user devices.

20 Claims, 43 Drawing Sheets

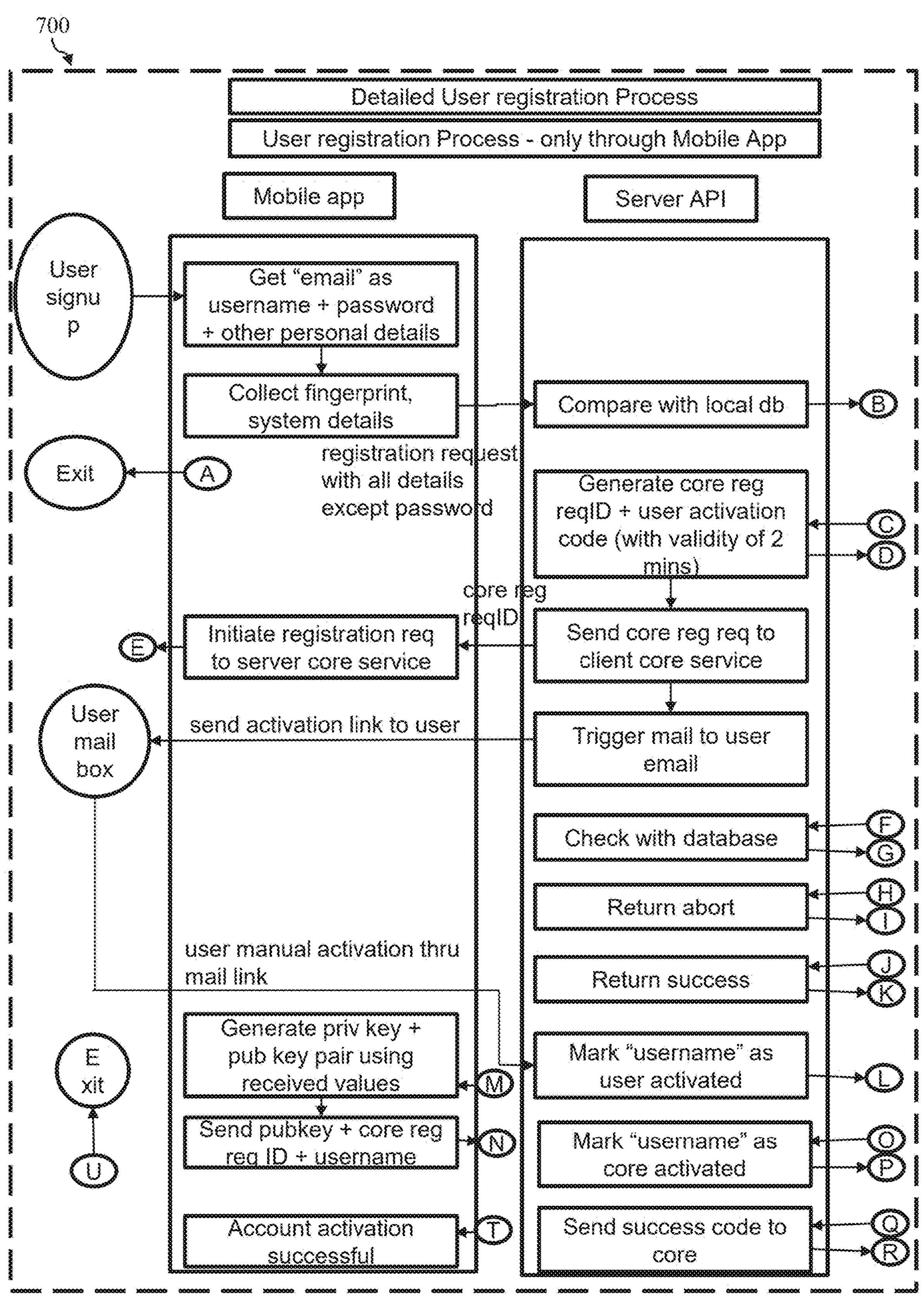
FIG. 7 (CONTINUED 1)

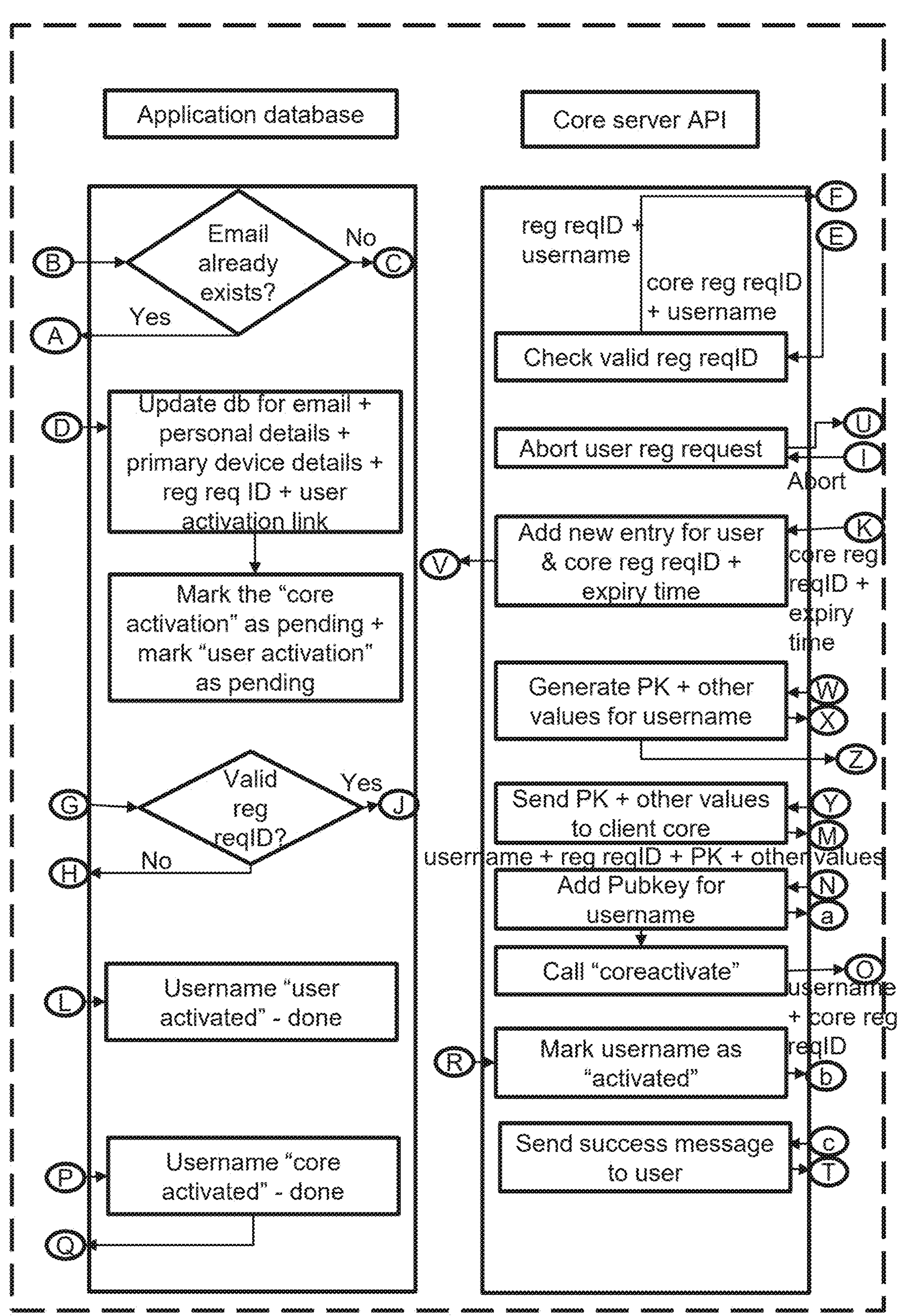
FIG. 7 (CONTINUED 2)

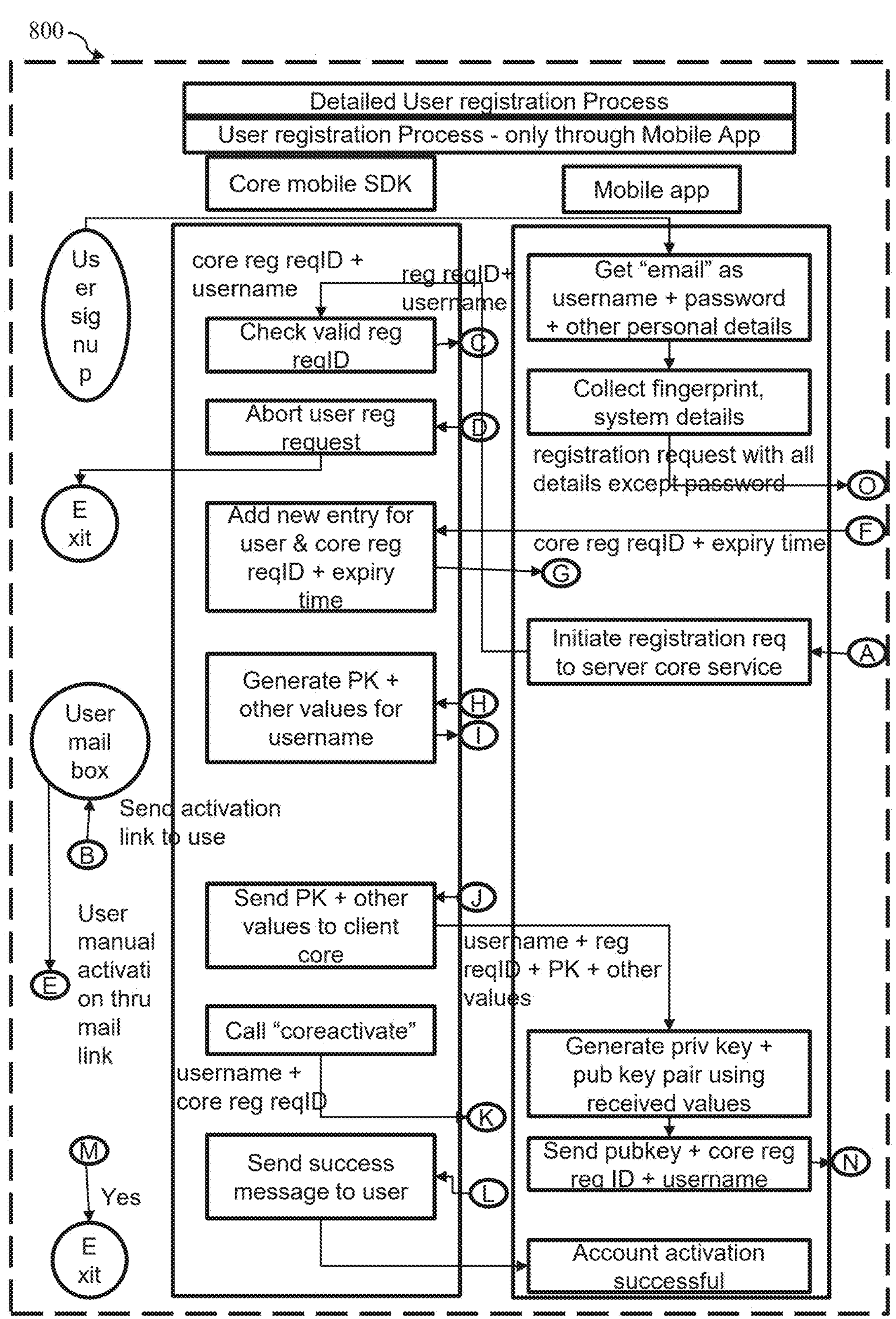
FIG. 8 (CONTINUED 1)

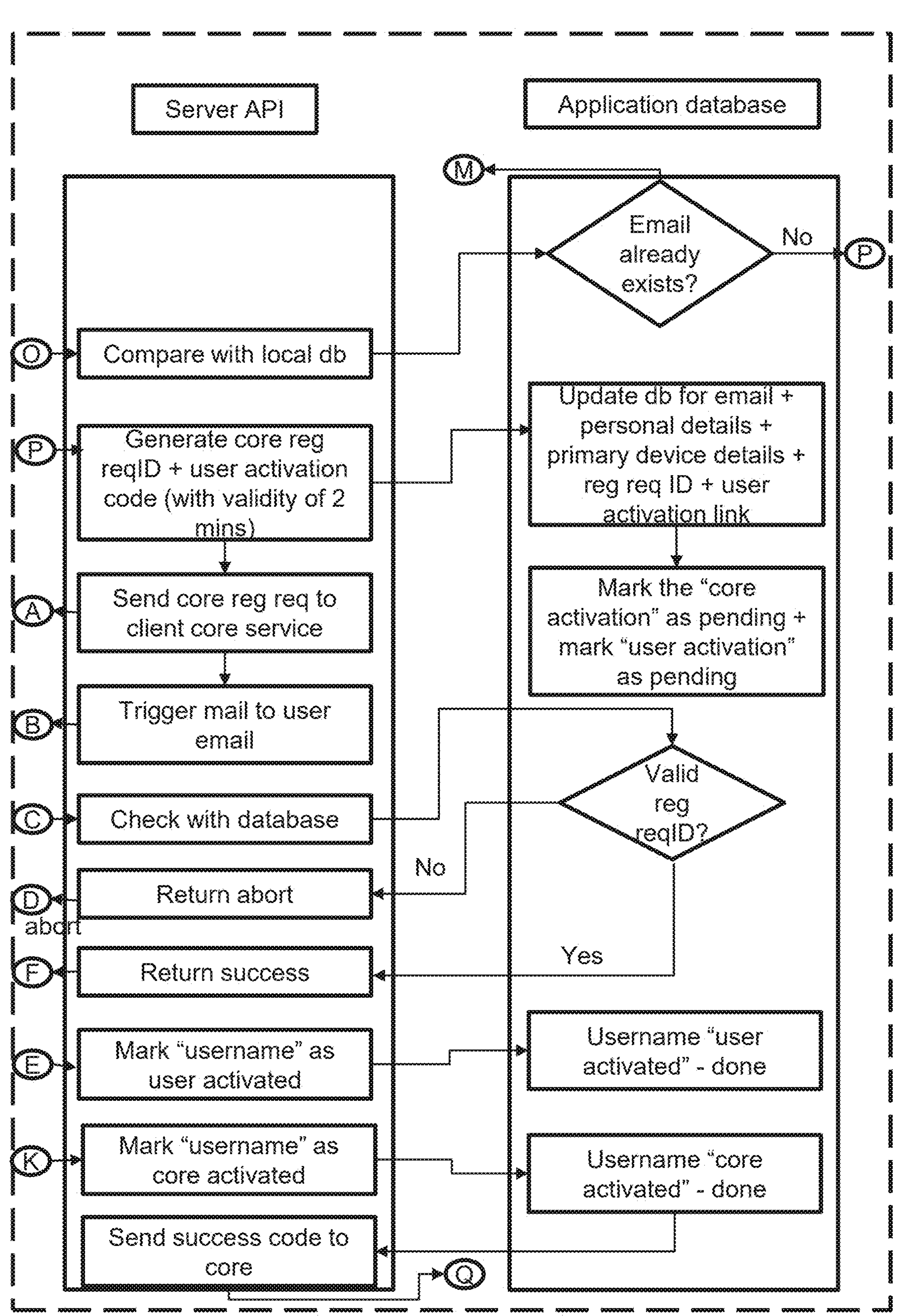
FIG. 8 (CONTINUED 2)

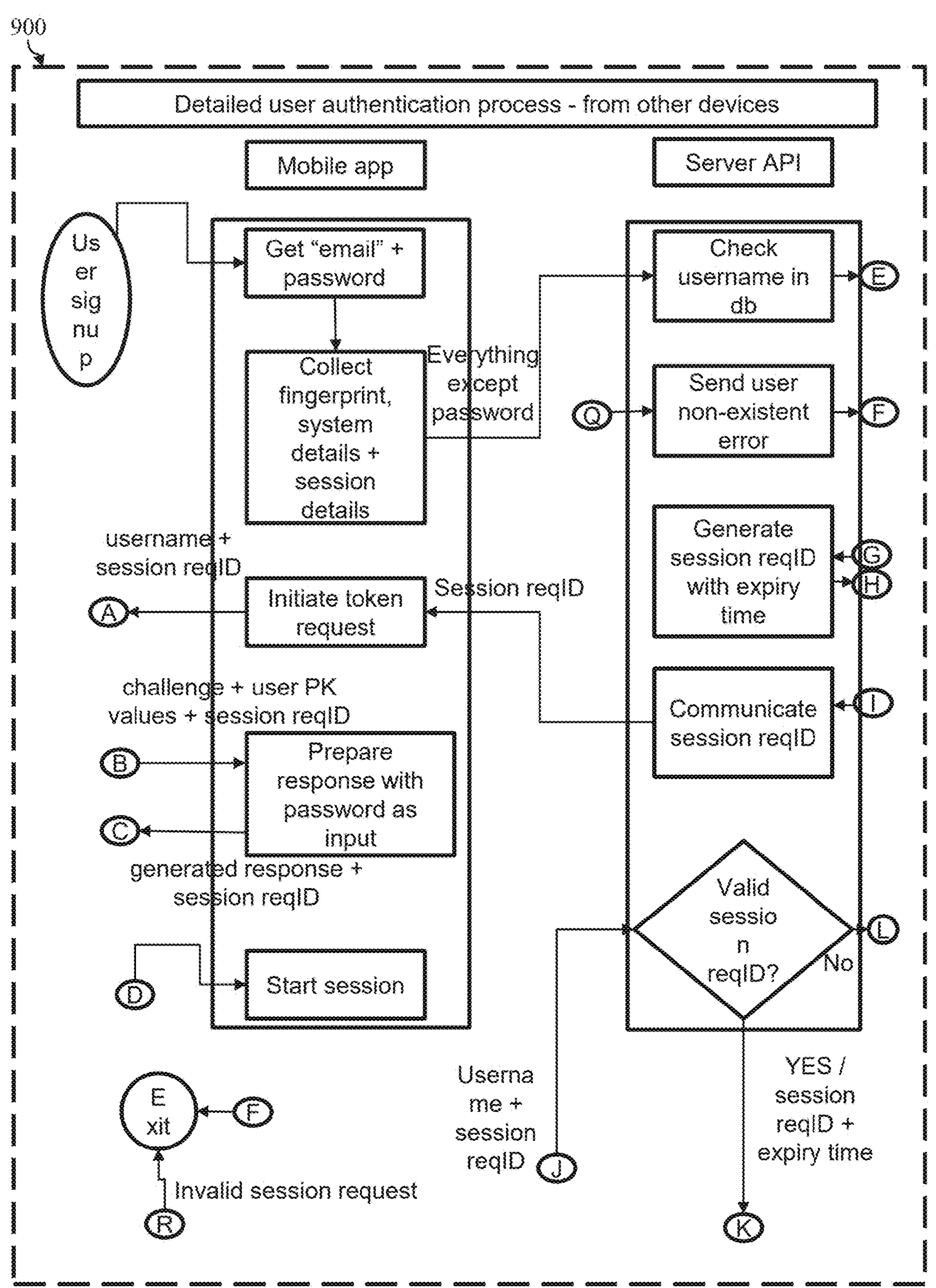
FIG. 9 (CONTINUED 1)

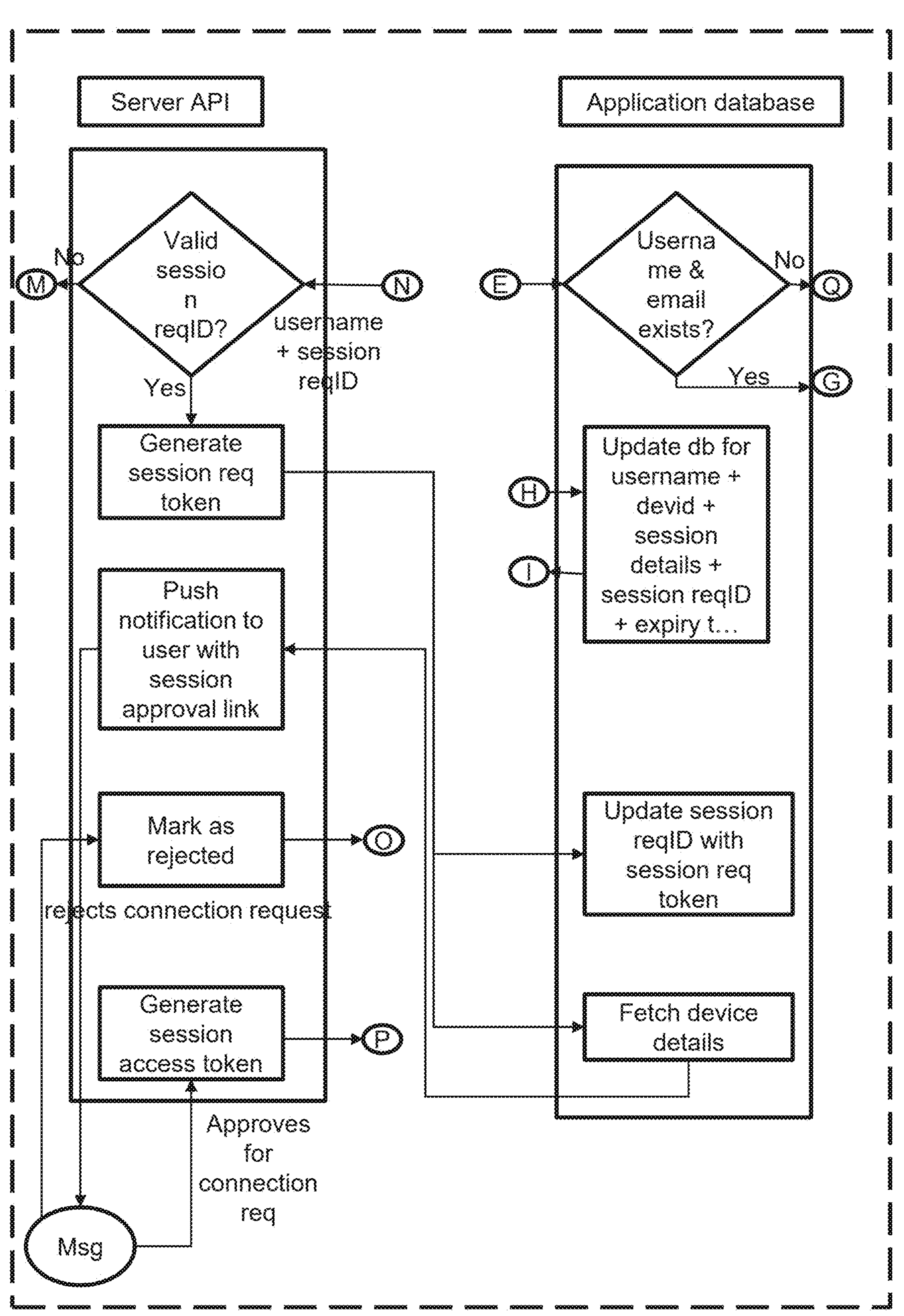
FIG. 9 (CONTINUED 2)

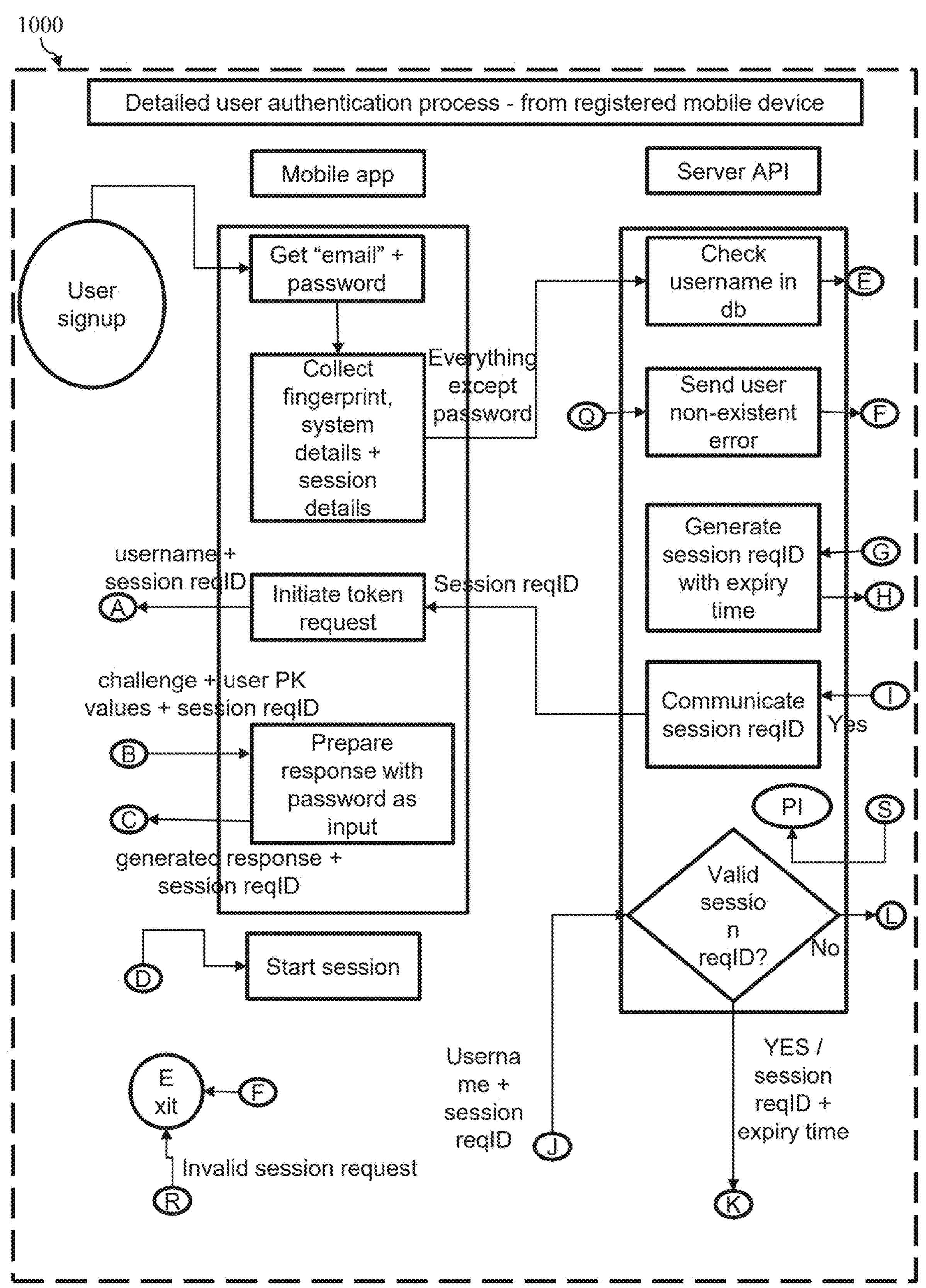
FIG. 10 (CONTINUED 1)

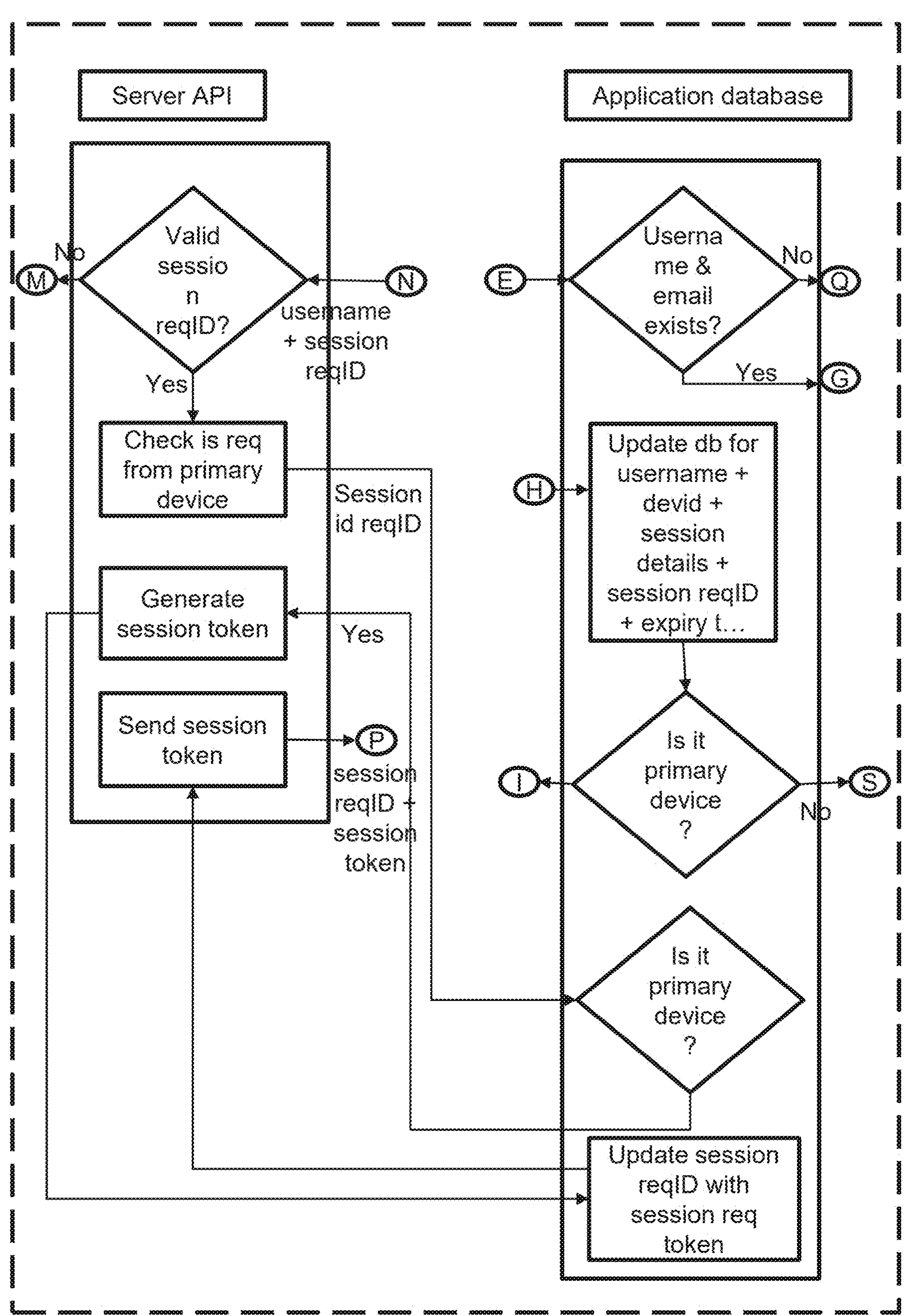
FIG. 10 (CONTINUED 2)

COMPUTER-IMPLEMENTED SYSTEM AND METHOD FOR MANAGING AUTHENTICATION BETWEEN USER DEVICE AND AUTHENTICATION SERVER USING PRIVATE-PUBLIC KEY CRYPTOGRAPHY

FIELD OF INVENTION

Embodiments of the present disclosure relate to authentication based computing systems, and more particularly relates to a computer-implemented system and method for managing an authentication between one or more user devices and one or more authentication servers based on generation of one or more private keys using private-public key cryptography.

BACKGROUND

In a realm of digital security and authentication, a landscape is constantly evolving to meet ever-growing challenges posed by cyber threats. Traditional authentication methods including username/password combinations have proven to be susceptible to various forms of an attack, leading to an increased demand for more robust and secure solutions.

One prominent advancement in this domain is a development of Fast Identity Online (FIDO) standards, which aim to address shortcomings of traditional authentication methods by introducing stronger security measures, including at least one of: a biometric authentication and public-key cryptography. However, existing implementations of the FIDO standards, such as those relying on Trusted Platform Modules (TPMs) for storing private keys are constrained by a vendor lock-in. This means that the private keys employed for the authentication are tied to specific hardware or ecosystems, limiting interoperability and flexibility for users. Additionally, the reliance on hardware-based storage solutions like the TPMs presents challenges for a cross-platform authentication.

Furthermore, the traditional authentication methods rely on a centralized storage of user credentials, making the authentication methods susceptible to data breaches and unauthorized access. When an attacker gains access to a central repository of the user credentials, the attacker may potentially compromise accounts of the numerous users, leading to widespread security implications.

In the existing technology, a key encryption and decryption mechanisms are disclosed. The key encryption and decryption mechanisms may provide an asymmetric encryption circuit. When a session encrypted data key (SEDK) is wrapped with an asymmetric encryption, an asymmetric decryption is required, using the private key of a public-private key pair set. In this case, the private key is only accessible by hardware internal to an Application Specific Integrated Circuit (ASIC), and requirements to intertwine the controls for multiplexors are much reduced. However, this ensures that the private key and the result of the decryption with the private key, are not accessible externally to the ASIC. Nevertheless, the key encryption and decryption mechanisms rely on the ASICs for the encryption and decryption processes. Hence, there are vendor lock-in issues, where the key encryption and decryption mechanisms become tightly coupled with a particular hardware vendor or technology stack.

There are various technical problems with the traditional authentication methods in the prior art. In the existing technology, a traditional password-based authentication is vulnerable to the various attacks, including brute force attacks, dictionary attacks, and credential stuffing. The users may choose weak passwords or reuse the passwords across the multiple accounts, increasing the risk of compromise. In the traditional authentication methods, the passwords are stored on servers, making the passwords susceptible to theft in the event of the data breach. The attackers may exploit vulnerabilities in a server infrastructure to gain the unauthorized access to the user credentials. Some traditional authentication methods, such as those based on proprietary hardware or cloud services, may lead to the vendor lock-in, limiting interoperability and flexibility. For instance, the traditional authentication methods that rely on the vendor specific TPMs or the cloud services restrict the users to a particular ecosystem.

Hence, there is a need for an improved computer-implemented system for managing an authentication between the user devices and authentication servers based on generation of private keys using private-public key cryptography, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for managing an authentication between one or more user devices and one or more authentication servers based on one or more private keys using private-public key cryptography, is provided. The computer-implemented method includes obtaining, by one or more hardware processors of the one or more user devices, one or more user credentials associated with one or more users. The one or more user credentials comprise at least one of: one or more user identities (ID) and one or more public keys, associated with the one or more users.

The computer-implemented method further includes retrieving, by the one or more hardware processors of the one or more user devices, information associated with one or more device fingerprints corresponding to the one or more user devices. In an embodiment, retrieving the information associated with the one or more device fingerprints comprises regenerating one or more indices comprising at least one of: first index and second index, associated with the one or more device fingerprints.

The computer-implemented method further includes generating, by the one or more hardware processors of the one or more user devices, one or more cipher messages by at least one of: creating one or more random numbers and encrypting the one or more random numbers with one or more keys derived from at least one of: the first index and the second index. The computer-implemented method further includes transmitting, by the one or more hardware processors of the one or more user devices, at least one of: the one or more user identities, the first index, the second index, and the one or more cipher messages, to one or more authentication servers.

The computer-implemented method further includes dynamically regenerating, by the one or more hardware processors of the one or more user devices, the one or more private keys from one or more private key variables. The computer-implemented method further includes generating, by the one or more hardware processors of the one or more user devices, one or more authentication responses by decoding one or more authentication based questions obtained from the one or more authentication servers, using at least one of: the one or more cipher messages and the one or more private keys. The computer-implemented method further includes transmitting, by the one or more hardware processors of the one or more user devices, the one or more authentication responses to the one or more authentication servers for adapting the one or more authentication servers to authenticate the one or more user devices.

In an embodiment, the computer-implemented method further includes (a) determining, by the one or more authentication servers, whether the one or more user identities are matched with first index associated with the one or more device fingerprints; (b) retrieving, by the one or more authentication servers, at least one of: one or more public keys and the one or more private key variables, from the one or more user devices; (c) decoding, by the one or more authentication servers, the one or more cipher messages received from the one or more user devices; (d) generating, by the one or more authentication servers, the one or more authentication based questions based on at least one of: the decoded one or more cipher messages and the one or more random numbers; (c) transmitting, by the one or more authentication servers, the one or more private key variables and the one or more authentication based questions, to the one or more user devices; (f) validating, by the one or more authentication servers, the one or more authentication responses received from the one or more user devices; (g) determining, by the one or more authentication servers, whether the one or more authentication responses received from the one or more user devices are matched with the one or more authentication based questions; and (h) authenticating, by the one or more authentication servers, the one or more user devices upon matching of the one or more authentication responses received from the one or more user devices with the one or more authentication based questions.

In another embodiment, the computer-implemented method further includes (a) determining, by the one or more authentication servers, whether the one or more user identities are matched with first index associated with the one or more device fingerprints; (b) retrieving, by the one or more authentication servers, at least one of: the one or more random numbers, one or more public keys, and the one or more private key variables; (c) decoding, by the one or more authentication servers, the one or more cipher messages received from the one or more user devices; (d) generating, by the one or more authentication servers, the one or more authentication based questions based on at least one of: the decoded one or more cipher messages and the one or more random numbers; (c) transmitting, by the one or more authentication servers, the one or more private key variables, the one or more random numbers, and the one or more authentication based questions, to the one or more user devices; (f) validating, by the one or more authentication servers, the one or more authentication responses received from the one or more user devices; (g) determining, by the one or more authentication servers, whether the one or more authentication responses received from the one or more user devices are matched with the one or more authentication based questions; and (h) authenticating, by the one or more authentication servers, the one or more user devices upon matching of the one or more authentication responses received from the one or more user devices with the one or more authentication based questions.

In yet another embodiment, the computer-implemented method further includes prior to generating the one or more private keys, generating, by the one or more hardware processors of the one or more user devices, one or more optimized passwords using at least one of: the one or more user identities, the one or more strong passwords, and the one or more random numbers.

In yet another embodiment, the computer-implemented method further includes (a) retrieving, by the one or more hardware processors of the one or more user devices, one or more encrypted random numbers from one or more databases, wherein the one or more encrypted random numbers comprise at least one of: an encrypted first random number, an encrypted second random number, and an encrypted third random number; (b) generating, by the one or more hardware processors of the one or more user devices, one or more hash indexes based on at one of: the one or more user identities and the one or more encrypted random numbers, wherein the one or more hash indexes comprise at least one of: a first hash index and a second hash index; (c) generating, by the one or more hardware processors of the one or more user devices, the one or more cipher messages by at least one of: creating the one or more random numbers and encrypting the one or more random numbers using a hash function of the one or more public keys as one or more encryption keys; (d) transmitting, by the one or more hardware processors of the one or more user devices, at least one of: the one or more user identities, the first hash index, the second hash index, and the encrypted one or more random numbers, to the one or more authentication servers; (c) decrypting, by the one or more hardware processors of the one or more user devices, the encrypted third random number using the encrypted first random number and the encrypted second random number; (f) decrypting, by the one or more hardware processors of the one or more user devices, the encrypted first random number and the encrypted second random number using the decrypted third random number; (g) decrypting, by the one or more hardware processors of the one or more user devices, encrypted one or more deltas using the decrypted third random number, wherein the one or more deltas comprise at least one of: a first delta and a second delta, and wherein the one or more deltas are differences between one or more prime numbers and the one or more random numbers; and (h) regenerating, by the one or more hardware processors of the one or more user devices, the one or more prime numbers based on a combination of the one or more deltas and the one or more random numbers.

In yet another embodiment, the computer-implemented method further includes (a) determining, by the one or more authentication servers, whether the one or more user identities are matched with first hash index; (b) retrieving, by the one or more authentication servers, at least one of: the encrypted third random number and the encrypted one or more deltas; (c) generating, by the one or more authentication servers, the one or more authentication based questions by decrypting the encrypted one or more random numbers using the hash function of the one or more public keys; and (d) transmitting, by the one or more authentication servers, the one or more authentication based questions with at least one of: the encrypted third random number and the encrypted one or more deltas, to the one or more user devices.

In yet another embodiment, the computer-implemented method further includes generating, by one or more pre-computation servers, at least one of: the one or more private key variables and the one or more encryption keys, wherein the generation of at least one of: the one or more private key variables and the one or more encryption keys, is isolated from the one or more authentication servers.

In yet another embodiment, the computer-implemented method further includes (a) pre-computing, by the one or more pre-computation servers, one or more unique user identities; and (b) transmitting, by the one or more pre-computation servers, the one or more unique user identities to the one or more user devices.

In yet another embodiment, the computer-implemented method further includes (a) determining, by the one or more hardware processors of the one or more user devices, whether hash square functions of the one or more public keys sent by the one or more authentication servers are matched with the hash function of the one or more public keys; and (b) decrypting, by the one or more hardware processors of the one or more user devices, the encrypted third random number using the encrypted first random number and the encrypted second random number upon matching of the hash square functions of the one or more public keys sent by the one or more authentication servers, with the hash function of the one or more public keys.

In yet another embodiment, the computer-implemented method further includes (a) receiving, by one or more roaming authenticators, one or more one time passwords from the one or more user devices; and (b) authenticating, by the one or more roaming authenticators, the one or more authentication servers by utilizing the one or more one time passwords received from the one or more user devices.

In one aspect, a computer-implemented system for managing an authentication between one or more user devices and one or more authentication servers based on one or more private keys using private-public key cryptography, is disclosed. The computer-implemented system includes one or more user devices including one or more hardware processors and a memory coupled to the one or more hardware processors. The memory includes a plurality of subsystems in the form of programmable instructions executable by the one or more hardware processors.

The plurality of subsystems comprises a user credentials obtaining subsystem configured to obtain one or more user credentials associated with one or more users. The one or more user credentials comprise at least one of: one or more user identities (ID) and one or more public keys, associated with the one or more users.

The plurality of subsystems further comprises an information retrieval subsystem configured to retrieve information associated with one or more device configurations corresponding to the one or more user devices. In an embodiment, retrieving the information associated with one or more device fingerprints comprises regenerating one or more indices comprising at least one of: first index and second index, associated with the one or more device fingerprints. The plurality of subsystems further comprises an information generating subsystem configured to generate one or more cipher messages by at least one of: creating one or more random numbers and encrypting the one or more random numbers with one or more keys derived from at least one of: the first index and the second index.

The plurality of subsystems further comprises a transmission subsystem configured to transmit at least one of: the one or more user identities, the first index, the second index, and the one or more cipher messages, to one or more authentication servers. The plurality of subsystems further comprises a key generation subsystem configured to dynamically regenerate the one or more private keys from one or more private key variables.

The plurality of subsystems further comprises an authentication response generation subsystem configured to generate one or more authentication responses by decoding one or more authentication based questions obtained from the one or more authentication servers, using at least one of: the one or more cipher messages and the one or more private keys. The plurality of subsystems further comprises the transmission subsystem configured to transmit the one or more authentication responses to the one or more authentication servers for adapting the one or more authentication servers to authenticate the one or more user devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
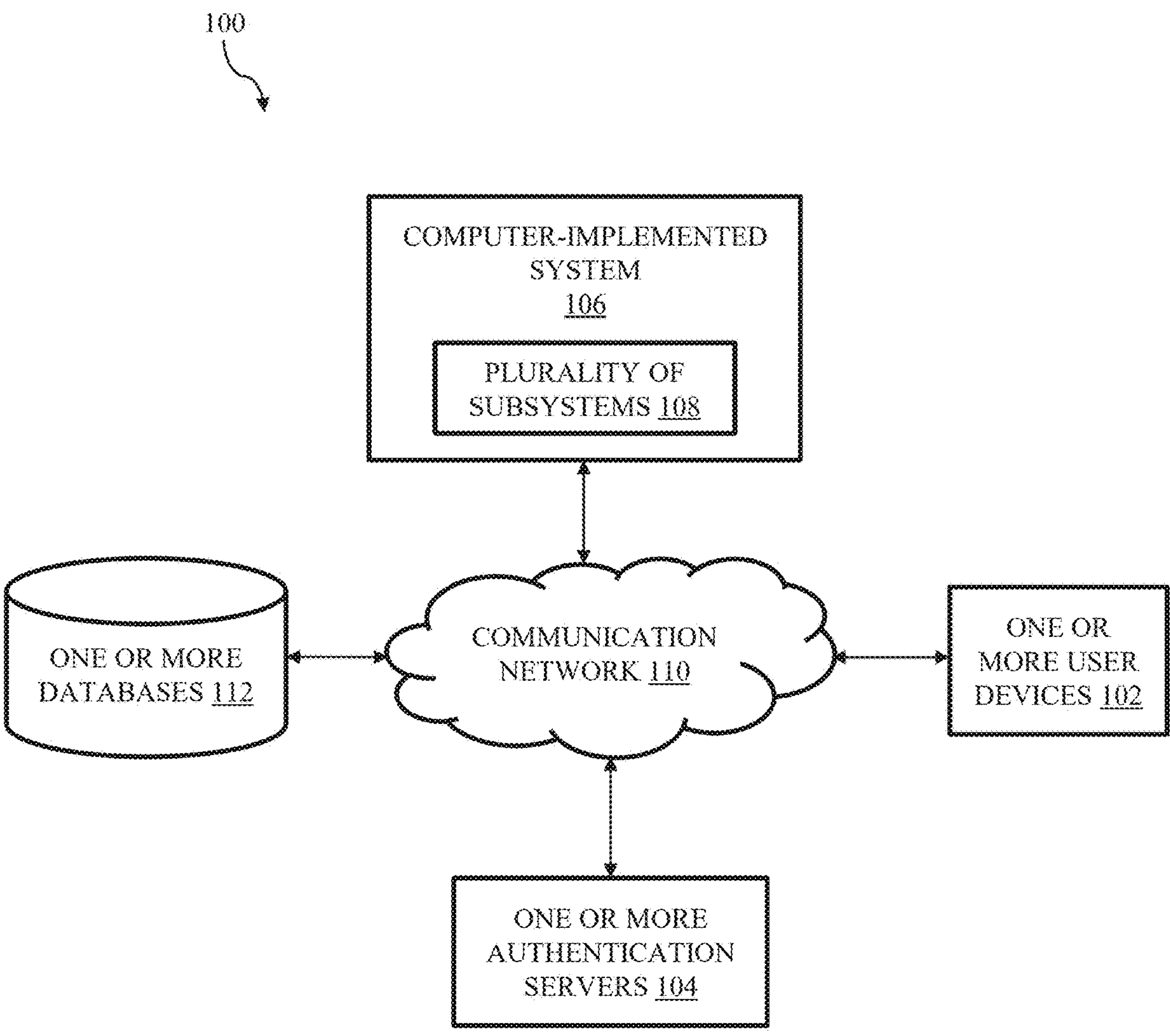
FIG. 1 is a block diagram illustrating a computing environment with a computer-implemented system for managing an authentication between one or more user devices and one or more authentication servers based on generation of one or more private keys using private-public key cryptography, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 29, where similar reference characters denote corresponding features consistently throughout the figures, there are shown preferred embodiments and these embodiments are described in the context of the following exemplary system and/or method.

FIG. 1 is a block diagram illustrating a computing environment 100 with a computer-implemented system 106 for managing an authentication between one or more user devices 102 and one or more authentication servers 104 based on generation of one or more private keys using private-public key cryptography, in accordance with an embodiment of the present disclosure. According to FIG. 1, the computing environment 100 includes the one or more user devices 102 that are communicatively coupled to the one or more authentication servers 104 through a network 110.

The present invention with the computer-implemented system 106 is configured to manage the authentication between one or more user devices 102 and the one or more authentication servers 104 based on generation of the one or more private keys using the private-public key cryptography. The one or more user devices 102 are initially configured to obtain one or more user credentials associated with one or more users by the one or more user devices 102. In an embodiment, the one or more user credentials may include at least one of: one or more user identities (ID) and one or more public keys, associated with the one or more users.

The one or more user devices 102 are further configured to retrieve information associated with one or more device fingerprints corresponding to the one or more user devices 102. In an embodiment, retrieving the information associated with one or more device fingerprints may include regenerating one or more indices including at least one of: first index and second index, associated with the one or more device fingerprints.

The one or more user devices 102 are further configured to generate one or more cipher messages by at least one of: creating one or more random numbers and encrypting the one or more random numbers with one or more keys derived from at least one of: the first index and the second index. The one or more user devices 102 are further configured to transmit at least one of: the one or more user identities, the first index, the second index, and the one or more cipher messages, to the one or more authentication servers 104.

The one or more authentication servers 104 are configured to determine whether the one or more user identities are matched with first index associated with the one or more device fingerprints. The one or more authentication servers 104 are further configured to retrieve at least one of: one or more public keys and the one or more private key variables, from the one or more user devices 102.

The one or more authentication servers 104 are configured to decode the one or more cipher messages received from the one or more user devices 102. The one or more authentication servers 104 are configured to generate the one or more authentication based questions based on at least one of: the decoded one or more cipher messages and the one or more random numbers. The one or more authentication servers 104 are configured to transmit the one or more private key variables and the one or more authentication based questions, to the one or more user devices 102.

The one or more user devices 102 are configured to dynamically regenerate the one or more private keys from one or more private key variables using at least one of: no password and the one or more passwords. The one or more user devices 102 are further configured to generate one or more authentication responses by decoding one or more authentication based questions obtained from the one or more authentication servers 104, using at least one of: the one or more cipher messages and the one or more private keys. The one or more user devices 102 are further configured to transmit the one or more authentication responses to the one or more authentication servers 104 for adapting the one or more authentication servers 104 to authenticate the one or more user devices 102.

Upon receiving the one or more authentication responses from the one or more users devices 102, the one or more authentication servers 104 are configured to validate the one or more authentication responses received from the one or more user devices 102. The one or more authentication servers 104 are further configured to determine whether the one or more authentication responses received from the one or more user devices 102 are matched with the one or more authentication based questions. The one or more authentication servers 104 are further configured to authenticate the one or more user devices 102 upon matching of the one or more authentication responses received from the one or more user devices 102 with the one or more authentication based questions.

In an embodiment, The computer-implemented system 106 may be hosted on a central server including at least one of: a cloud server or a remote server. In an embodiment, the computer-implemented system 106 may include at least one of: a user device, a server computer, a server computer over the network 110, a cloud-based computing system, a cloud-based computing system over the network 110, a distributed computing system, and the like. Further, the network 110 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more user devices 102 may include at least one of: a laptop computer, a desktop computer, a tablet computer, a Smartphone, a wearable device, a Smart watch, and the like.

Further, the computing environment 100 includes one or more databases 112 communicatively coupled to the computer-implemented system 106 through the network 110. In an embodiment, the one or more databases 112 include at least one of: one or more relational databases, one or more object-oriented databases, one or more data warehouses, one or more cloud-based databases, and the like. Furthermore, the one or more user devices 102 may include at least one of: a local browser, a mobile application, and the like.

Furthermore, the one or more users may use a web application through the local browser, the mobile application to authenticate with the one or more authentication servers 106. In an embodiment of the present disclosure, the computer-implemented system 106 includes a plurality of subsystems 108. Details on the plurality of subsystems 108 have been elaborated in subsequent paragraphs of the present description with reference to FIG. 2.

Figure 2:
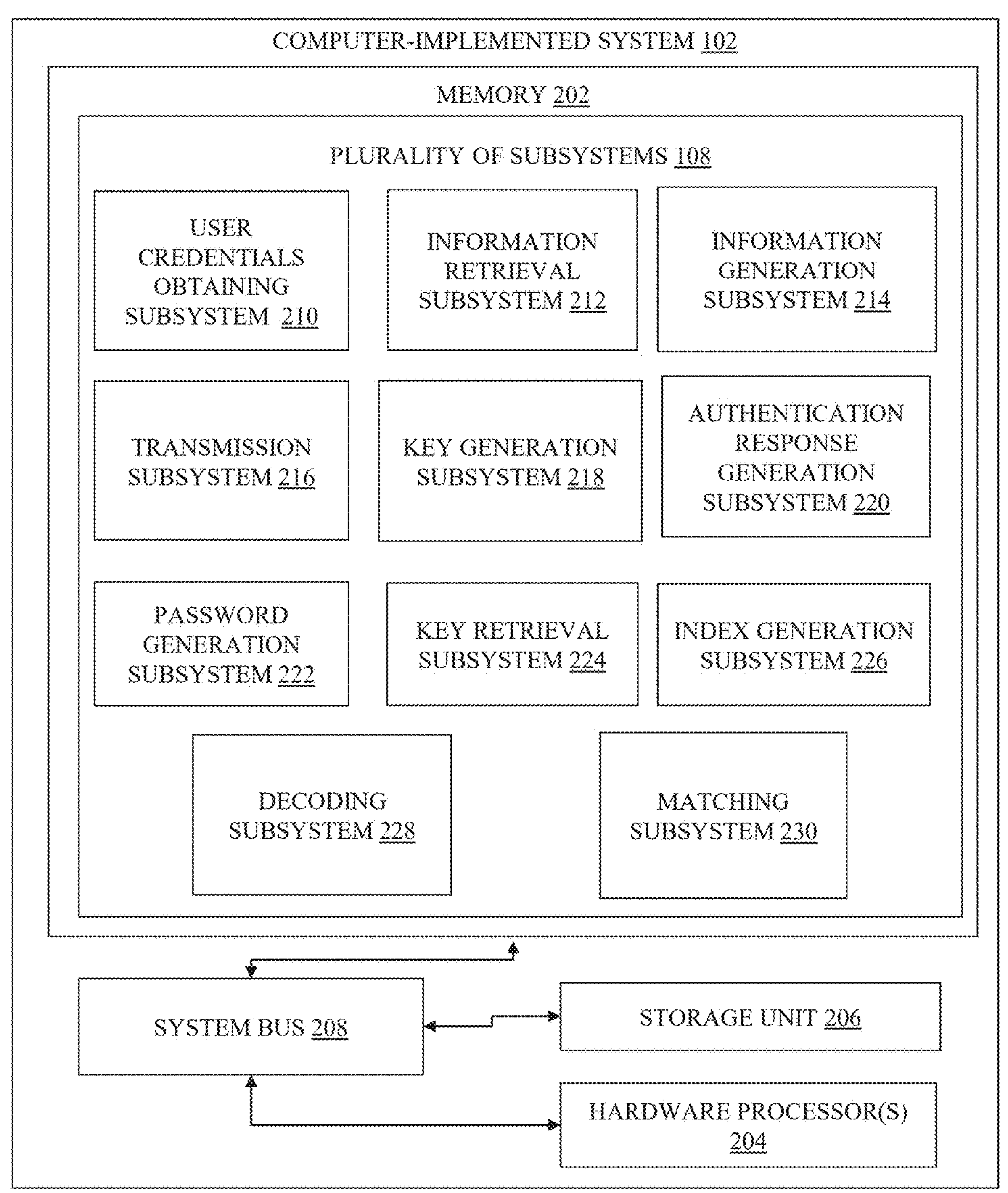
FIG. 2 is a detailed view of the computer-implemented system, such as those shown in FIG. 1, in accordance with another embodiment of the present disclosure.

FIG. 2 is a detailed view of the computer-implemented system 106, such as those shown in FIG. 1, in accordance with another embodiment of the present disclosure. The computer-implemented system 106 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 108 in the form of programmable instructions executable by the one or more hardware processors 204.

The plurality of subsystems 108 includes a user credentials obtaining subsystem 210, an information retrieval subsystem 212, an information generation subsystem 214, a transmission subsystem 216, a key generation subsystem 218, an authentication response generation subsystem 220, a password generation subsystem 222, a key retrieval subsystem 224, an index generation subsystem 226, a decoding subsystem 228, and a matching subsystem 230. The brief details of the plurality of subsystems 108 have been elaborated in a below table.

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 108 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 108.

The plurality of subsystems 108 includes the user credentials obtaining subsystem 210 that is communicatively connected to the one or more hardware processors 204. The user credentials obtaining subsystem 210 is configured to obtain the one or more user credentials associated with the one or more users. In an embodiment, the one or more user credentials may include at least one of: the one or more user identities (ID) and the one or more public keys, associated with the one or more users.

The plurality of subsystems 108 further includes the information retrieval subsystem 212 that is communicatively connected to the one or more hardware processors 204. The information retrieval subsystem 212 is configured to retrieve the information associated with the one or more device fingerprints corresponding to the one or more user devices 102. In an embodiment, retrieving the information associated with the one or more device fingerprints may include regenerating the one or more indices including at least one of: the first index and the second index, associated with the one or more device fingerprints.

The plurality of subsystems 108 further includes the information generation subsystem 214 that is communicatively connected to the one or more hardware processors 204. The information generation subsystem 214 is configured to generate the one or more cipher messages by at least one of: creating the one or more random numbers and encrypting the one or more random numbers with the one or more keys derived from at least one of: the first index and the second index.

The plurality of subsystems 108 further includes the transmission subsystem 216 that is communicatively connected to the one or more hardware processors 204. The transmission subsystem 216 is configured to transmit at least one of: the one or more user identities, the first index, the second index, and the one or more cipher messages, to the one or more authentication servers 104.

The one or more authentication servers 104 are configured to determine whether the one or more user identities are matched with first index associated with the one or more device fingerprints. The one or more authentication servers 104 are further configured to retrieve at least one of: one or more public keys and the one or more private key variables, from the one or more user devices 102.

The one or more authentication servers 104 are configured to decode the one or more cipher messages received from the one or more user devices 102. The one or more authentication servers 104 are configured to generate the one or more authentication based questions based on at least one of: the decoded one or more cipher messages and the one or more random numbers. The one or more authentication servers 104 are configured to transmit the one or more private key variables and the one or more authentication based questions, to the one or more user devices 102.

The plurality of subsystems 108 further includes the key generation subsystem 218 that is communicatively connected to the one or more hardware processors 204. The key generation subsystem 218 is configured to dynamically regenerate the one or more private keys from one or more private key variables using at least one of: no password and the one or more passwords.

The plurality of subsystems 108 further includes the authentication response generation subsystem 220 that is communicatively connected to the one or more hardware processors 204. The authentication response generation subsystem 220 is configured to generate the one or more authentication responses by decoding the one or more authentication based questions obtained from the one or more authentication servers 104, using at least one of: the one or more cipher messages and the one or more private keys.

The transmission subsystem 216 is further configured to transmit the one or more authentication responses to the one or more authentication servers 104 for adapting the one or more authentication servers 104 to authenticate the one or more user devices 102.

In an embodiment, prior to a logging in process, a registration process (Method 1) needs to be performed for authenticating the one or more user devices 102 with the one or more authentication servers 104. During the registration process, the one or more user devices 102 are configured to obtain the one or more user credentials including at least one of: the one or more user identities and the one or more public keys from the one or more users associated with the one or more user devices 102. The one or more user devices 102 are configured to transmit the one or more user credentials to the one or more authentication servers 104.

The one or more authentication servers 104 are configured to determine whether the user identity exists or not. The one or more authentication servers 104 are configured to send a response to the existence of the user identity to the one or more user devices 102. In one embodiment, the one or more user devices 102 are configured to generate one or more prime numbers (P and Q) having 1024 bit length. The one or more user devices 102 may compute the one or more public keys (n) based on the one or more prime numbers (i.e., n=P*Q). The one or more user devices 102 are further configured to generate one or more random salts including at least one of: first salt and second salt. The one or more user devices 102 are further configured to generate the one or more device fingerprints associated with the one or more user devices 102.

The one or more user devices 102 are further configured to generate the one or more private key variables (PKV) based on at least one of: (a) a hash function (H1) of a combination of a first user identity, the first salt and the one or more passwords/passcodes, (b) a hash function (H2) of a combination of a second user identity, the second salt and the one or more passwords/passcodes, (c) one or more delts values (Δ) including at least one of: a first delta value (Δ1) and a second delta value (Δ2). In an embodiment, the one or more private key variables (PKV) are generated/computed based on the first delta value (Δ1), the second delta value (Δ2), the first salt, and the second salt. In another embodiment, the first delta value (Δ1) is a difference between the prime number (P) and the hash function (H1). In another embodiment, the second delta value (Δ2) is a difference between the prime number (Q) and the hash function (H2). The one or more user devices 102 are further configured to generate one or more hash indices (i.e., a first index=H (fingerprint) and a second index=H(tnirpregnif)) from the one or more device fingerprints associated with the one or more user devices 102.

The one or more user devices 102 are further configured to transmit the one or more user identities, the first index, the second index, the one or more private key variables, and the one or more public keys (n), to the one or more authentication servers 104. The one or more authentication servers 104 are configured to store the user information. In an embodiment, the one or more authentication servers 104 may store the user information in two different dissociated databases. In an embodiment, in an event of the database being compromised, there is no information available to combine all the data associated with the user information. The one or more authentication servers 104 are configured to determine/verify whether the one or more user credentials are stored. Further, the one or more user devices 102 are further configured to store the one or more device fingerprints in a secure storage of the one or more user devices 102.

In an alternate embodiment (Method 2), the computer-implemented system 106 is configured to provide passwordless experience. In this scenario, the one or more passwords are not used during the private key regeneration step. The one or more private keys are generated in the one or more user devices 102 during registration and login processes. Further, a unique device fingerprint is generated and the device fingerprint is required for the authentication, providing additional level of security.

Figure 3:
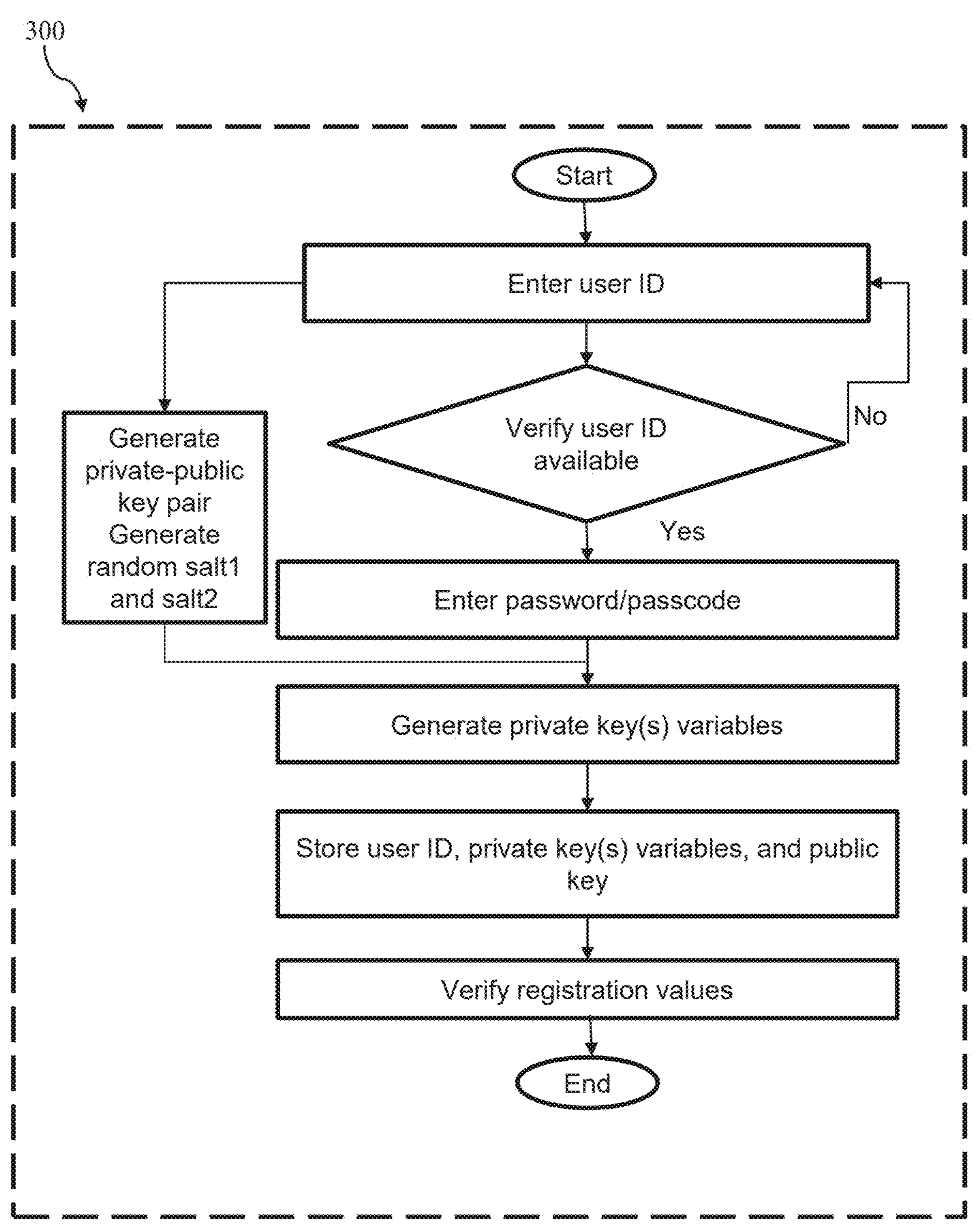
FIG. 3 is a flow chart illustrating a registration/signup process for the authentication between the one or more user devices and the one or more authentication servers, in accordance with an embodiment of the present disclosure.

In order to perform the registration process (as shown in FIG. 3), the one or more user devices 102 are configured to obtain the one or more user identities from the one or more users associated with the one or more user devices 102. The one or more authentication servers 104 are configured to determine whether the user identity exists or not. The one or more authentication servers 104 are configured to send a response to the existence of the user identity to the one or more user devices 102. In one embodiment, the one or more user devices 102 are configured to generate one or more prime numbers (P and Q) having 1024 bit length. The one or more user devices 102 may compute the one or more public keys (n) based on the one or more prime numbers (i.e., n=P*Q). The one or more user devices 102 are further configured to generate one or more random salts including at least one of: the first salt and the second salt. The one or more user devices 102 are further configured to generate the one or more device fingerprints associated with the one or more user devices 102.

The one or more user devices 102 are further configured to generate/compute the one or more private key variables (PKV) based on at least one of: (a) a hash function (H1) of a combination of a first user identity, the first salt and the one or more device fingerprints, (b) a hash function (H2) of a combination of a second user identity, the second salt and the one or more device fingerprints, (c) one or more delts values (Δ) including at least one of: a first delta value (Δ1) and a second delta value (Δ2). In an embodiment, the one or more private key variables (PKV) are generated/computed based on the first delta value (Δ1), the second delta value (Δ2), the first salt, and the second salt. In another embodiment, the first delta value (Δ1) is a difference between the prime number (P) and the hash function (H1). In another embodiment, the second delta value (Δ2) is a difference between the prime number (Q) and the hash function (H2). The one or more user devices 102 are further configured to generate the one or more hash indices (i.e., the first index=H (fingerprint) and the second index=H (tnirpregnif)) from the one or more device fingerprints associated with the one or more user devices 102.

The one or more user devices 102 are further configured to transmit the one or more user identities, the first index, the second index, the one or more private key variables, and the one or more public keys (n), to the one or more authentication servers 104. The one or more authentication servers 104 are configured to store the user information. In an embodiment, the one or more authentication servers 104 may store the user information in two different dissociated databases. In an embodiment, in an event of the database being compromised, there is no information available to combine all the data associated with the user information. The one or more authentication servers 104 are configured to determine/verify whether the one or more user credentials are stored. Further, the one or more user devices 102 are further configured to store the one or more device fingerprints in the secure storage of the one or more user devices 102.

Figure 4:
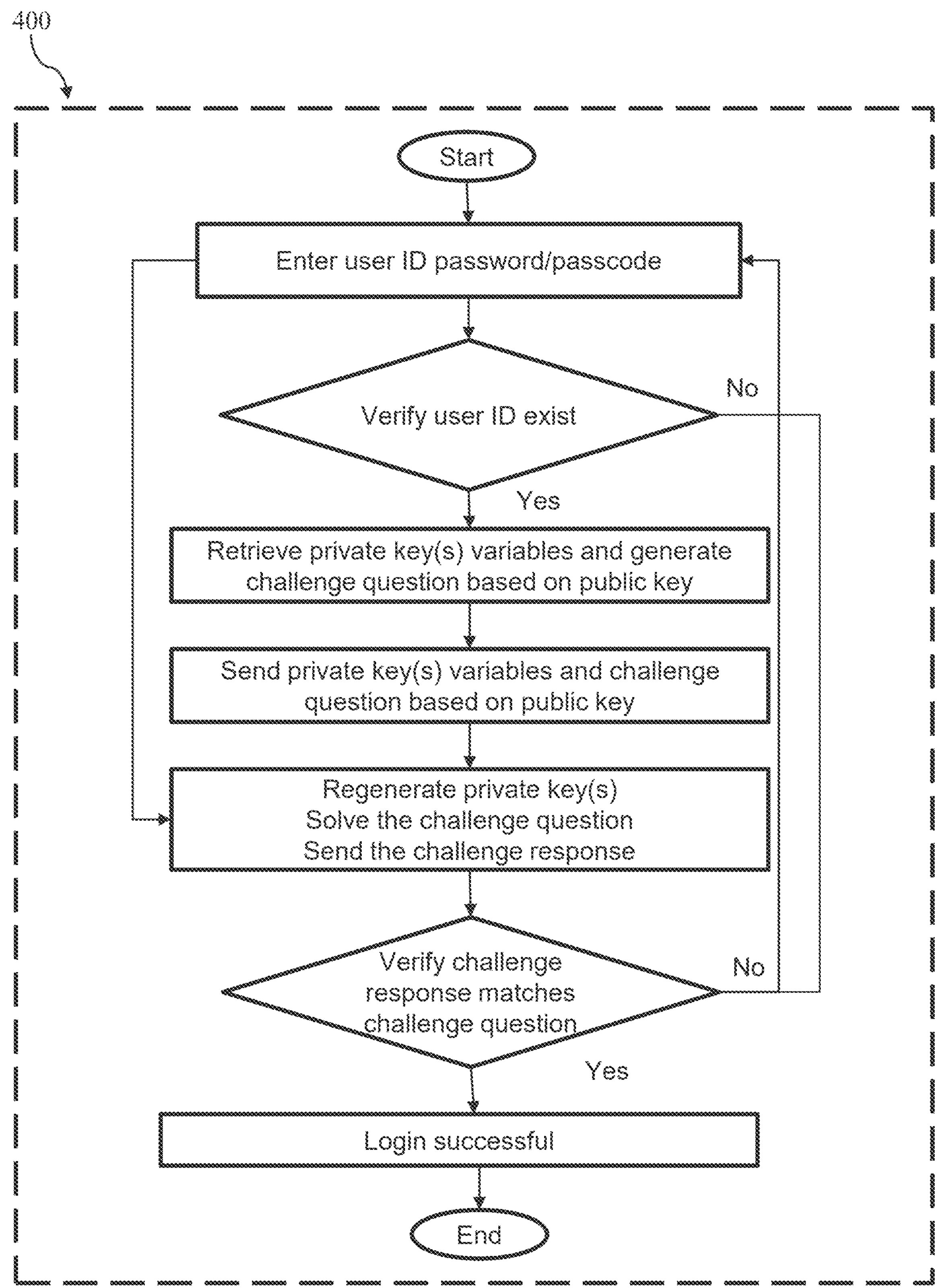
FIG. 4 is a flow chart illustrating a logging in process for the authentication between the one or more user devices and the one or more authentication servers, in accordance with an embodiment of the present disclosure.

In order to perform the logging in process (as shown in FIG. 4), the user credentials obtaining subsystem 210 of the one or more user devices 102 is configured to obtain the one or more user identities associated with the one or more users. The information retrieval subsystem 212 of the one or more user devices 102 is configured to retrieve the information associated with the one or more device fingerprints corresponding to the one or more user devices 102. In an embodiment, retrieving the information associated with the one or more device fingerprints may include regenerating the one or more indices including at least one of: the first index and the second index, associated with the one or more device fingerprints.

The information generation subsystem 214 of the one or more user devices 102 is configured to generate the one or more cipher messages by at least one of: creating the one or more random numbers and encrypting the one or more random numbers with the one or more keys derived from at least one of: the first index and the second index. The transmission subsystem 216 of the one or more user devices 102 is configured to transmit at least one of: the one or more user identities, the first index, the second index, and the one or more cipher messages, to the one or more authentication servers 104.

The one or more authentication servers 104 are configured to determine whether the one or more user identities are matched with first index associated with the one or more device fingerprints. The one or more authentication servers 104 are further configured to retrieve at least one of: one or more public keys and the one or more private key variables, from the one or more user devices 102. The one or more authentication servers 104 are configured to decode the one or more cipher messages received from the one or more user devices 102. The one or more authentication servers 104 are configured to generate the one or more authentication based questions based on at least one of: the decoded one or more cipher messages and the one or more random numbers. The one or more authentication servers 104 are configured to transmit the one or more private key variables and the one or more authentication based questions, to the one or more user devices 102.

The key generation subsystem 218 is configured to dynamically generate the one or more private keys from one or more private key variables using the one or more passwords or passcodes. The authentication response generation subsystem 220 is configured to generate the one or more authentication responses by decoding the one or more authentication based questions obtained from the one or more authentication servers 104, using at least one of: the one or more cipher messages and the one or more private keys. The transmission subsystem 216 is further configured to transmit the one or more authentication responses to the one or more authentication servers 104 for adapting the one or more authentication servers 104 to authenticate the one or more user devices 102.

The one or more authentication servers 104 are further configured to determine whether the one or more authentication responses match the one or more authentication based questions. If the one or more authentication responses match the one or more authentication based questions, then the one or more authentication servers 104 may authenticate the one or more user devices 102. If not, the one or more user devices 102 are denied to authenticate with the one or more authentication servers 104.

In another alternate embodiment (Method 3), the computer-implemented system 106 is configured to provide a username and password authentication experience for the one or more users and the authentication is based on a zero-knowledge authentication using the private-public key cryptography. In this scenario, neither the one or more passwords nor the one or more private keys is transmitted to the one or more authentication servers 104.

The one or more private keys regeneration variable hints are locally stored in the one or more user devices 102 during registration and login processes. Further, a unique device fingerprint is generated and the device fingerprint is required for the authentication, providing additional level of security.

Figure 5:
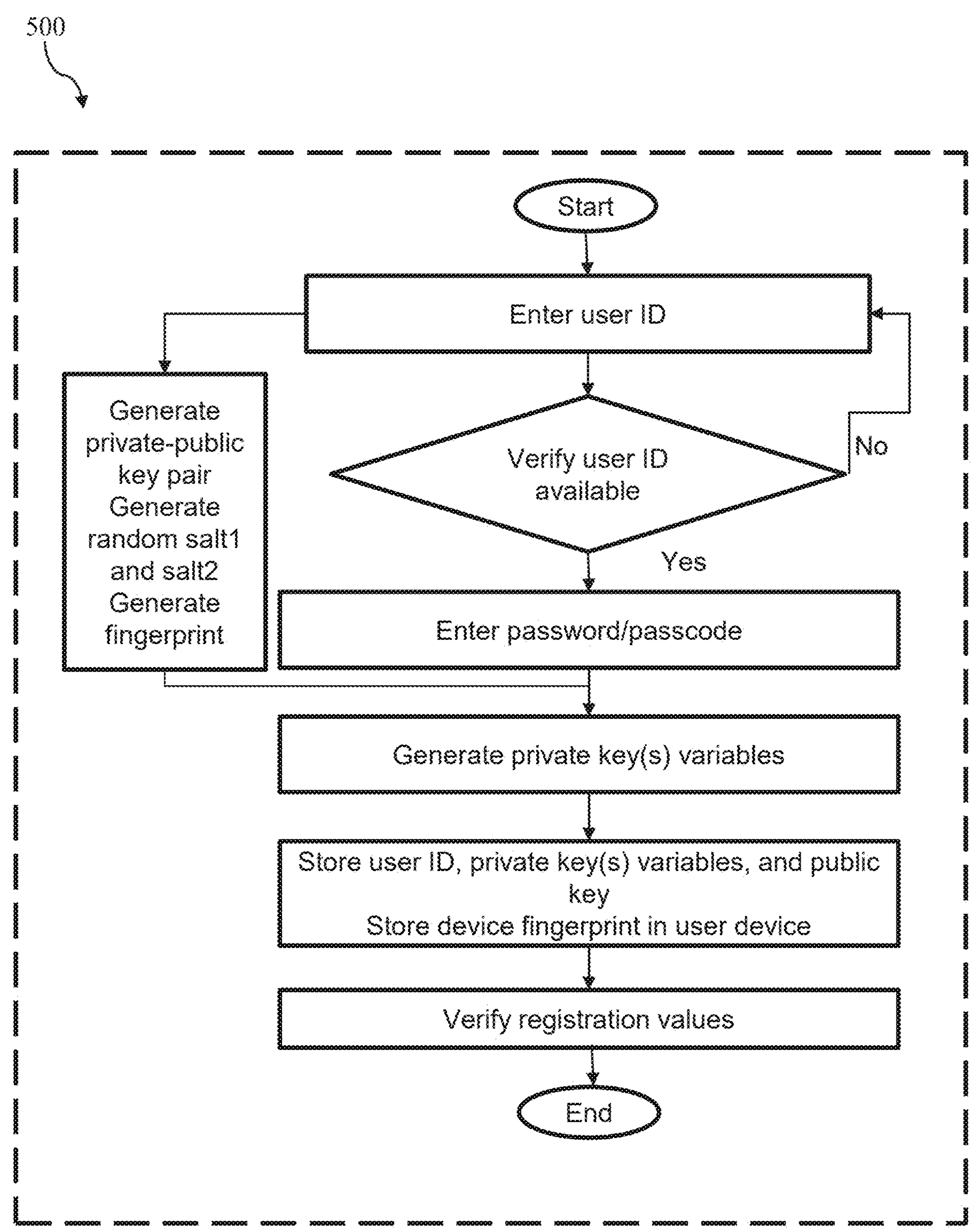
FIG. 5 is a flow chart illustrating a registration/signup process for the authentication between the one or more user devices and the one or more authentication servers based on one or more device fingerprints, in accordance with an embodiment of the present disclosure.

In order to perform the registration process (as shown in FIG. 5), the one or more user devices 102 are configured to obtain the one or more user identities and public keys from the one or more users associated with the one or more user devices 102. The one or more authentication servers 104 are configured to determine whether the user identity exists or not. The one or more authentication servers 104 are configured to send a response to the existence of the user identity to the one or more user devices 102. In one embodiment, the one or more user devices 102 are configured to generate one or more prime numbers (P and Q) having 1024 bit length. The one or more user devices 102 may compute the one or more public keys (n) based on the one or more prime numbers (i.e., n=P*Q). The one or more user devices 102 are further configured to generate one or more random salts including at least one of: the first salt and the second salt. The one or more user devices 102 are further configured to generate one or more random numbers (Y).

The one or more user devices 102 are further configured to generate one or more strong passwords. In an embodiment, the one or more strong passwords are generated based on a hash function of K values. The K values represents a combination of a hash function of the one or more passwords (i.e., X), a hash function of the user identity (i.e., Z), and the one or more random numbers (Y). The one or more user devices 102 are further configured to generate the one or more device fingerprints associated with the one or more user devices 102.

The one or more user devices 102 are further configured to generate/compute the one or more private key variables (PKV) based on at least one of: (a) a hash function (H1) of a combination of a first user identity, the first salt and the one or more strong passwords, (b) a hash function (H2) of a combination of a second user identity, the second salt and the one or more strong passwords, (c) one or more delts values (Δ) including at least one of: a first delta value (Δ1) and a second delta value (Δ2). In an embodiment, the one or more private key variables (PKV) are generated/computed based on the first delta value (Δ1), the second delta value (Δ2), the first salt, and the second salt. In another embodiment, the first delta value (Δ1) is a difference between the prime number (P) and the hash function (H1). In another embodiment, the second delta value (Δ2) is a difference between the prime number (Q) and the hash function (H2). The one or more user devices 102 are further configured to generate the one or more hash indices (i.e., the first index=H (fingerprint) and the second index=H(tnirpregnif)) from the one or more device fingerprints associated with the one or more user devices 102.

The one or more user devices 102 are further configured to transmit the one or more user identities, the first index, the second index, the one or more private key variables, the one or more public keys (n), and the one or more random numbers (Y), to the one or more authentication servers 104. The one or more authentication servers 104 are configured to store the user information. In an embodiment, the one or more authentication servers 104 may store the user information in two different dissociated databases. In an embodiment, in an event of the database being compromised, there is no information available to combine all the data associated with the user information. The one or more authentication servers 104 are configured to determine/verify whether the one or more user credentials are stored. Further, the one or more user devices 102 are further configured to store the one or more device fingerprints in the secure storage of the one or more user devices 102.

Figure 6:
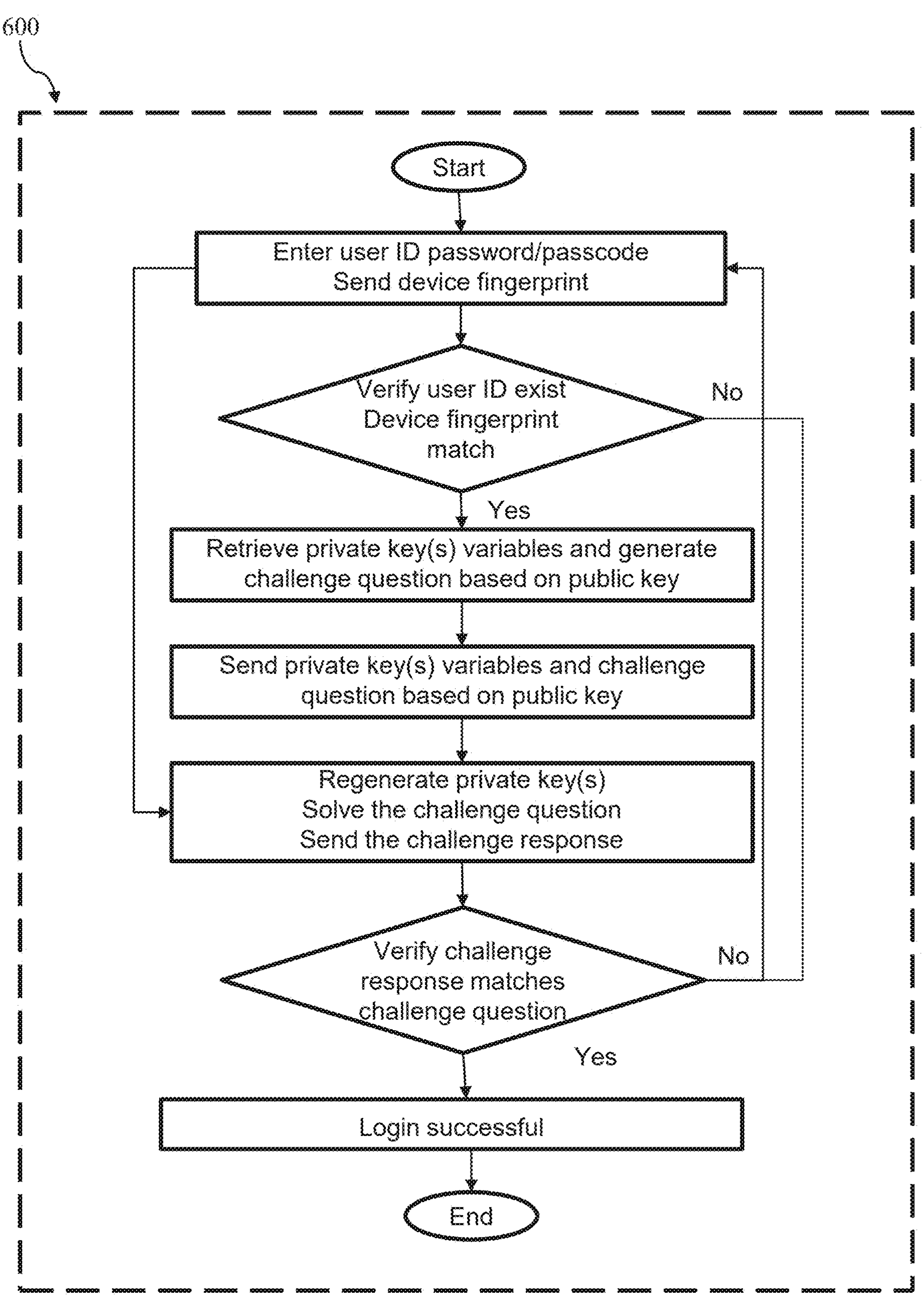
FIG. 6 is a flow chart illustrating a logging in process for the authentication between the one or more user devices and the one or more authentication servers based on the one or more device fingerprints, in accordance with an embodiment of the present disclosure.

In order to perform the logging in process (as shown in FIG. 6), the user credentials obtaining subsystem 210 of the one or more user devices 102 is configured to obtain the one or more user identities and the one or more public keys, associated with the one or more users. The information retrieval subsystem 212 of the one or more user devices 102 is configured to retrieve the information associated with the one or more device fingerprints corresponding to the one or more user devices 102. In an embodiment, retrieving the information associated with the one or more device fingerprints may include regenerating the one or more indices including at least one of: the first index and the second index, associated with the one or more device fingerprints.

The information generation subsystem 214 of the one or more user devices 102 is configured to generate the one or more cipher messages by at least one of: creating the one or more random numbers and encrypting the one or more random numbers with the one or more keys derived from at least one of: the first index and the second index. The transmission subsystem 216 of the one or more user devices 102 is configured to transmit at least one of: the one or more user identities, the first index, the second index, and the one or more cipher messages, to the one or more authentication servers 104.

The one or more authentication servers 104 are configured to determine whether the one or more user identities are matched with first index associated with the one or more device fingerprints. The one or more authentication servers 104 are further configured to retrieve at least one of: the one or more random numbers (Y), the one or more public keys and the one or more private key variables, from the one or more user devices 102. The one or more authentication servers 104 are configured to decode the one or more cipher messages received from the one or more user devices 102. The one or more authentication servers 104 are configured to generate the one or more authentication based questions based on at least one of: the decoded one or more cipher messages and the one or more random numbers. The one or more authentication servers 104 are configured to transmit the one or more private key variables, the one or more random numbers (Y), and the one or more authentication based questions, to the one or more user devices 102.

The password generation subsystem 222 is configured to regenerate the one or more strong passwords/passcodes using the one or more user identities, passwords/passcodes, and the one or more random numbers (Y). The key generation subsystem 218 is configured to regenerate the one or more private keys using the one or more private key variables and the one or more strong passwords. The authentication response generation subsystem 220 is configured to generate the one or more authentication responses by decoding the one or more authentication based questions obtained from the one or more authentication servers 104, using at least one of: the one or more cipher messages and the one or more private keys. The transmission subsystem 216 is further configured to transmit the one or more authentication responses to the one or more authentication servers 104 for adapting the one or more authentication servers 104 to authenticate the one or more user devices 102.

The one or more authentication servers 104 are further configured to determine whether the one or more authentication responses match the one or more authentication based questions. If the one or more authentication responses match the one or more authentication based questions, then the one or more authentication servers 104 may authenticate the one or more user devices 102. If not, the one or more user devices 102 are denied to authenticate with the one or more authentication servers 104.

In yet alternate embodiment (Method 4), the computer-implemented system 106 is configured to provide password-less experience. The one or more private keys are generated in the one or more user devices 102 during registration and login processes. Further, a unique device fingerprint is generated and the device fingerprint is required for the authentication, providing additional level of security.

In order to perform the registration process, the one or more user devices 102 are configured to obtain the one or more user identities from the one or more users associated with the one or more user devices 102. The one or more authentication servers 104 are configured to determine whether the user identity exists or not. The one or more authentication servers 104 are configured to send a response to the existence of the user identity to the one or more user devices 102. In one embodiment, the one or more user devices 102 are configured to generate the one or more prime numbers (P and Q) having 1024 bit length. The one or more user devices 102 may compute the one or more public keys (n) based on the one or more prime numbers (i.e., n=P*Q). The one or more user devices 102 are further configured to generate one or more random salts including at least one of: the first salt and the second salt. The one or more user devices 102 are further configured to generate the one or more device fingerprints associated with the one or more user devices 102. The one or more user devices 102 are further configured to generate the one or more random numbers (Y).

The one or more user devices 102 are further configured to generate the one or more strong passwords. In an embodiment, the one or more strong passwords are generated based on a hash function of K values. The K values represents a combination of a hash function of the one or more passwords (i.e., X), a hash function of the user identity (i.e., Z), and the one or more random numbers (Y). The one or more user devices 102 are further configured to generate the one or more device fingerprints associated with the one or more user devices 102.

The one or more user devices 102 are further configured to generate/compute the one or more private key variables (PKV) based on at least one of: (a) a hash function (H1) of a combination of a first user identity, the first salt and the one or more strong passwords, (b) a hash function (H2) of a combination of a second user identity, the second salt and the one or more strong passwords, (c) one or more delts values (Δ) including at least one of: a first delta value (Δ1) and a second delta value (Δ2). In an embodiment, the one or more private key variables (PKV) are generated/computed based on the first delta value (Δ1), the second delta value (Δ2), the first salt, and the second salt. In another embodiment, the first delta value (Δ1) is a difference between the prime number (P) and the hash function (H1). In another embodiment, the second delta value (Δ2) is a difference between the prime number (Q) and the hash function (H2). The one or more user devices 102 are further configured to generate the one or more hash indices (i.e., the first index=H (fingerprint) and the second index=H (tnirpregnif)) from the one or more device fingerprints associated with the one or more user devices 102.

The one or more user devices 102 are further configured to transmit the one or more user identities, the first index, the second index, the one or more private key variables, the one or more public keys (n), and the one or more random numbers (Y), to the one or more authentication servers 104. The one or more authentication servers 104 are configured to store the user information. In an embodiment, the one or more authentication servers 104 may store the user information in two different dissociated databases. In an embodiment, in an event of the database being compromised, there is no information available to combine all the data associated with the user information. The one or more authentication servers 104 are configured to determine/verify whether the one or more user credentials are stored. Further, the one or more user devices 102 are further configured to store the one or more device fingerprints in the secure storage of the one or more user devices 102.

In order to perform the logging in process, the user credentials obtaining subsystem 210 of the one or more user devices 102 is configured to obtain the one or more user identities, associated with the one or more users. The information retrieval subsystem 212 of the one or more user devices 102 is configured to retrieve the information associated with the one or more device fingerprints corresponding to the one or more user devices 102. In an embodiment, retrieving the information associated with the one or more device fingerprints may include regenerating the one or more indices including at least one of: the first index and the second index, associated with the one or more device fingerprints.

The information generation subsystem 214 of the one or more user devices 102 is configured to generate the one or more cipher messages by at least one of: creating the one or more random numbers and encrypting the one or more random numbers with the one or more keys derived from at least one of: the first index and the second index. The transmission subsystem 216 of the one or more user devices 102 is configured to transmit at least one of: the one or more user identities, the first index, the second index, and the one or more cipher messages, to the one or more authentication servers 104.

The one or more authentication servers 104 are configured to determine whether the one or more user identities are matched with first index associated with the one or more device fingerprints. The one or more authentication servers 104 are further configured to retrieve at least one of: the one or more public keys and the one or more private key variables, from the one or more user devices 102. The one or more authentication servers 104 are configured to decode the one or more cipher messages received from the one or more user devices 102. The one or more authentication servers 104 are configured to generate the one or more authentication based questions based on at least one of: the decoded one or more cipher messages and the one or more random numbers. The one or more authentication servers 104 are configured to transmit the one or more private key variables and the one or more authentication based questions, to the one or more user devices 102.

The key generation subsystem 218 is configured to regenerate the one or more private keys using the one or more private key variables and the one or more passwords/passcodes. The authentication response generation subsystem 220 is configured to generate the one or more authentication responses by decoding the one or more authentication based questions obtained from the one or more authentication servers 104, using at least one of: the one or more cipher messages and the one or more private keys. The transmission subsystem 216 is further configured to transmit the one or more authentication responses to the one or more authentication servers 104 for adapting the one or more authentication servers 104 to authenticate the one or more user devices 102.

The one or more authentication servers 104 are further configured to determine whether the one or more authentication responses match the one or more authentication based questions. If the one or more authentication responses match the one or more authentication based questions, then the one or more authentication servers 104 may authenticate the one or more user devices 102. If not, the one or more user devices 102 are denied to authenticate with the one or more authentication servers 104.

In above said embodiments, the one or more prime numbers required for the one or more private keys are generated in the one or more user devices 102. In an alternative embodiment, the one or more prime numbers and thereby the public-private keys may be pre-computed on the one or more authentication servers 104 and stored in-memory/secure storage that is isolated from the user database. During the user sign up process, when the one or more user identities are verified on the one or more authentication servers 104, the one or more private keys may be sent to the one or more user devices 102 and deleted from the precomputed storage. The precomputed stored public-private key may be deleted after a set time interval if the one or more private keys are not used, for security measures. The one or more private keys are transmitted during the sign up process from the one or more authentication servers 104 to the one or more user devices 102 and the one or more authentication servers 104 which is isolated from the one or more precomputation servers may not know the private key information.

In yet alternate embodiment (Method 5), the computer-implemented system 106 is configured to provide password-less authentication. In this scenario, one or more unique identities or the one or more device fingerprints are used as part of the generation of the one or more private keys. Further, one or more random numbers (R1, R2, and R3) are generated along with the one or more prime numbers (P and Q).

In one embodiment, in order to perform the registration process, the one or more user devices 102 are configured to generate the one or more prime numbers (P and Q) having 1024 bit length. the one or more user devices 102 are further configured to generate the one or more random numbers (R1 and R2, having 1024 bit length, and R3 has 256 bit length, in one embodiment). In an embodiment, the generation of the one or more prime numbers may take longer than the generation of the one or more random numbers. The one or more user devices 102 may compute the one or more public keys (n) based on the one or more prime numbers (i.e., n=P*Q). The one or more user devices 102 may generate secure hash algorithm (SHA256) of the one or more public keys (i.e., n: H(n)).

The one or more user devices 102 may generate/compute the one or more delts values. In an embodiment, the first delta value (Δ1) is a difference between the prime number (P) and the first random number (R1). In another embodiment, the second delta value (Δ2) is a difference between the prime number (Q) and the second random number (R2). The one or more authentication servers 104 are configured to determine whether the user identity exists or not. The one or more user devices 102 may encrypt an advanced encryption standard (AES 256) using the one or more random numbers (i.e., R3). The one or more user devices 102 may encrypt concatenated random numbers (R1 and R2) using the one or more random numbers (i.e., R3).

The above said encryption is performed by encrypting concatenated delta values (Δ1 and Δ2) using the random number R3 and encrypting the random number R3 using the secure hash algorithm (SHA256) of encrypted and concatenated random numbers (R1 and R2). The encryption of the random number R3 may involve a first method including (a) obtaining the secure hash algorithm (SHA256) of the encrypted and concatenated random numbers (R1 and R2) and (b) utilizing the resultant 256 bit value to encrypt the random number R3. The encryption of the random number R3 may involve a first method including (a) splitting the derived encrypted and concatenated random numbers (Ra and R2) values into at least 8 pieces array as 256 bit each, (b) performing XOR operation for each of 256 bits, and (c) utilizing the resultant 256 bit value to encrypt the random number R3.

The one or more user devices 102 may generate the one or more hash indices based on a hash function of a combination of the encrypted random numbers (R1 and R2) and the one or more user identities. The one or more user devices 102 may transmit the one or more user identities, the encrypted random number R3, the encrypted delta values (Δ1 and Δ2), the first hash index, the second hash index, and the one or more public keys (n), to the one or more authentication servers 104. In an embodiment, the encrypted random numbers (R1 and R2) and the one or more user identities are stored in the one or more user devices 102. In an embodiment, the encrypted random numbers (R1 and R2) are the unique identities or the device fingerprints. In an embodiment, the hash function of the one or more public keys (n) is used to encrypt the one or more ciphertexts (m1) that is transmitted to the one or more authentication servers 104 during the login process, which may save one network round trip to improve the latency.

The one or more user devices 102 may store one or more application identities, the one or more user identities, the encrypted random numbers (R1 and R2), and the hash function of the one or more public keys (n), in a trusted platform module (TPM) or secure keychain store. In an embodiment, the one or more user devices 102 may have n number of user identities. Upon transmitting the data to the one or more authentication servers 104, the one or more authentication servers 104 may store the one or more user identities, the first hash index, the encrypted random number R3, the second hash index, the encrypted delta values (Δ1 and Δ2), and the one or more public keys (n).

In order to perform the logging in process, the user credentials obtaining subsystem 210 of the one or more user devices 102 is configured to obtain the one or more user identities, associated with the one or more users. The information retrieval subsystem 212 of the one or more user devices 102 is configured to retrieve the information associated with the encrypted random numbers (R1 and R2) from a local key store. The information generation subsystem 214 of the one or more user devices 102 is configured to regenerate the one or more hash indices based on the hash function of a combination of the encrypted random numbers (R1 and R2) and the one or more user identities. The information generation subsystem 214 of the one or more user devices 102 is further configured to regenerate the one or more cipher messages by at least one of: creating a random number R4 and encrypting the random number R4 using a hash function of the one or more public keys as one or more encryption keys.

The transmission subsystem 216 of the one or more user devices 102 is configured to transmit at least one of: the one or more user identities, the first hash index, the second hash index, and the encrypted one or more random numbers R4, to the one or more authentication servers 104.

The one or more authentication servers 104 may determine whether the one or more user identities are matched with the first hash index (H1). The one or more authentication servers 104 are further configured to retrieve at least one of: the encrypted random number R3 and the encrypted delta values (Δ1 and Δ2). The one or more authentication servers 104 are further configured to generate the one or more authentication based questions by decrypting the encrypted random numbers (R3) using the hash function of the one or more public keys (i.e., H(n)). The one or more authentication servers 104 are further configured to transmit the one or more authentication based questions with at least one of: the encrypted random number (i.e., encrypted third random number E(R3)) and the encrypted one or more deltas (E(Δ1Δ2)), to the one or more user devices 102.

Upon receiving the one or more authentication based questions from the one or more authentication servers 104, the one or more user devices 102 are configured to decrypt the encrypted third random number (E(R3)) using the encrypted first random number and the encrypted second random number (E(R1R2)). The one or more user devices 102 are further configured to decrypt the encrypted first random number and the encrypted second random number (E(R1R2)) using the decrypted third random number (R3). The one or more user devices 102 are further configured to decrypt the encrypted one or more deltas (E(Δ1Δ2)) using the decrypted third random number (R3). The one or more user devices 102 are further configured to regenerate the one or more prime numbers (P and Q) based on a combination of the one or more deltas and the one or more random numbers (R1 and R2). The one or more user devices 102 are further configured to decrypt the one or more authentication based questions to generate the one or more authentication responses and transmit the one or more authentication responses to the one or more authentication servers 104.

In yet alternate embodiment (Method 6), the computer-implemented system 106 is configured to utilize the one or more pre-computation servers that generate the public-private key, the one or more private key variables and the one or more encryption keys, which are separated and isolated from the one or more authentication servers 104. The one or more pre-computation servers are configured to generate the one or more random numbers (i.e., R1 having 1024 bit, R2 having 1024 bit, R3 having 256 bit, in one embodiment), and the one or more prime numbers (P and Q having 1024 bit, in one embodiment). The one or more pre-computation servers are further configured to compute the one or more public keys (n) based on the one or more prime numbers (i.e., n=P*Q). The one or more pre-computation servers are further configured to generate the hash function of the one or more public keys (i.e., H(n)). The one or more pre-computation servers are further configured to generate/compute the one or more delts values. In an embodiment, the first delta value (Δ1) is a difference between the prime number (P) and the first random number (R1). In another embodiment, the second delta value (Δ2) is a difference between the prime number (Q) and the second random number (R2).

The one or more pre-computation servers are further configured to encrypt concatenated random numbers (Concatenated (R1R2)) using the third random number (R3) as a key. The one or more pre-computation servers are further configured to encrypt concatenated delta values (Concatenated (Δ1Δ2)) using the third random number (R3) as a key. The one or more pre-computation servers are further configured to encrypt the third random number (R3) using the encrypted random numbers (E(R1R2)) as a key. The one or more pre-computation servers are further configured to generate the hash indices based on a hash function of a combination of encrypted random numbers (E(R1R2)) and the one or more user identities.

In order to perform the registration process, the one or more user devices 102 are configured to transmit the one or more user identities to the one or more authentication servers 104. Upon receiving the one or more user identities from the one or more user devices 102, the one or more authentication servers 104 are configured to verify the one or more user identities. The one or more authentication servers 104 are configured to send a token and request the one or more pre-computation servers when the one or more user identities are verified. The one or more pre-computation servers are configured to send the encrypted random numbers (E(R1R2)) and the hash function of the one or more public keys (H(n)), to the one or more user devices 102. In an embodiment, the values are then stored in the one or more user devices 102.

Figure 11:
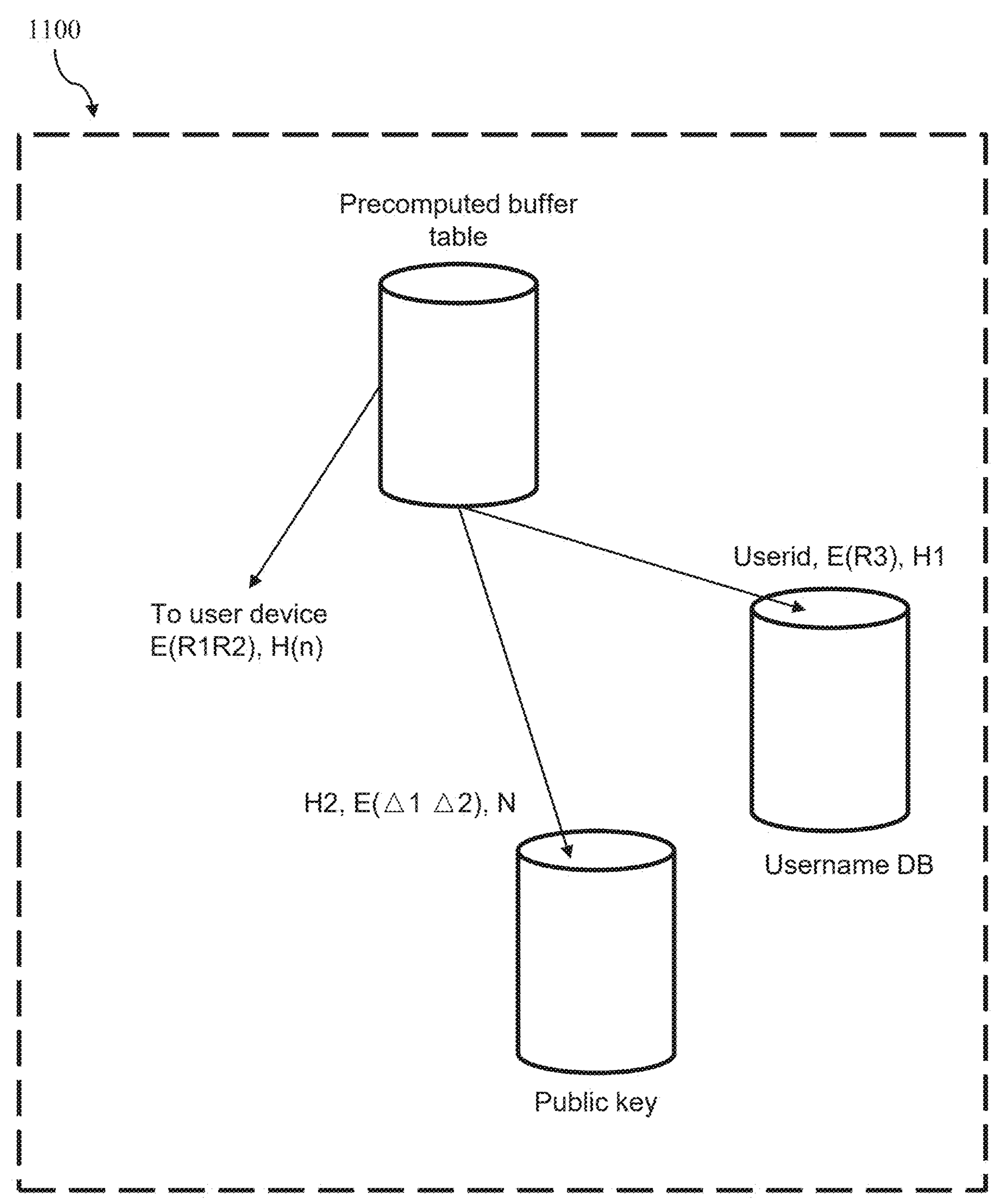
FIG. 11 is a schematic representation of a pre-computation server for generating one or more private key variables and one or more encryption keys, in accordance with an embodiment of the present disclosure.

In an embodiment, the one or more pre-computation servers are configured to transmit at least one of: the token, the encrypted third random number (E(R3)), the first hash index (H1), the second hash index (H2), and the one or more public keys (n), to the one or more databases (i.e., username databases) of the one or more user devices 102. The username database may store at least one of: the one or more user identities, the first hash index (H1), the encrypted third random number (E(R3)), the second hash index (H2), the encrypted delta values (E(Δ1Δ2)), and the one or more public keys (n), as shown in FIG. 11.

In order to perform the logging in process, the user credentials obtaining subsystem 210 of the one or more user devices 102 is configured to obtain the one or more user identities, associated with the one or more users. The information retrieval subsystem 212 of the one or more user devices 102 is configured to retrieve the information associated with the encrypted random numbers (R1 and R2) from the local key store. The information generation subsystem 214 of the one or more user devices 102 is configured to regenerate the one or more hash indices based on the hash function of a combination of the encrypted random numbers (R1 and R2) and the one or more user identities. The information generation subsystem 214 of the one or more user devices 102 is further configured to regenerate the one or more cipher messages by at least one of: creating a random number R4 and encrypting the random number R4 using the hash function of the one or more public keys as one or more encryption keys.

The transmission subsystem 216 of the one or more user devices 102 is configured to transmit at least one of: the one or more user identities, the first hash index (H1), the second hash index (H2), and the encrypted one or more random numbers (R4), to the one or more authentication servers 104.

The one or more authentication servers 104 may determine whether the one or more user identities are matched with the first hash index (H1). The one or more authentication servers 104 are further configured to retrieve at least one of: the encrypted random number R3 and the encrypted delta values (Δ1 and Δ2). The one or more authentication servers 104 are further configured to generate the one or more authentication based questions by decrypting the encrypted random numbers (R4) using the hash function of the one or more public keys (i.e., H(n)). The one or more authentication servers 104 are further configured to transmit the one or more authentication based questions with at least one of: the encrypted random number (i.e., encrypted third random number E(R3)) and the encrypted one or more deltas (E(Δ1Δ2)), to the one or more user devices 102.

Upon receiving the one or more authentication based questions from the one or more authentication servers 104, the one or more user devices 102 are configured to decrypt the encrypted third random number (E(R3)) using the encrypted first random number and the encrypted second random number (E(R1R2)). The one or more user devices 102 are further configured to decrypt the encrypted first random number and the encrypted second random number (E(R1R2)) using the decrypted third random number (R3). The one or more user devices 102 are further configured to decrypt the encrypted one or more deltas (E(Δ1Δ2)) using the decrypted third random number (R3). The one or more user devices 102 are further configured to regenerate the one or more prime numbers (P and Q) based on a combination of the one or more delta values (Δ1 and Δ2) and the one or more random numbers (R1 and R2). The one or more user devices 102 are further configured to decrypt the one or more authentication based questions to generate the one or more authentication responses and transmit the one or more authentication responses to the one or more authentication servers 104.

In yet alternate embodiment (Method 7), the one or more pre-computation servers are configured to pre-compute one or more unique user identities and send the one or more user identities to the one or more user devices 102 during the registration process.

The one or more pre-computation servers may pre-generate one or more user names and pre-compute the public-private keys, in a buffer and the buffer is completely separate from the username databases and isolated from the username databases. The one or more pre-computation servers are configured to generate the one or more random numbers (i.e., R1 having 1024 bit, R2 having 1024 bit, R3 having 256 bit, in one embodiment), and the one or more prime numbers (P and Q having 1024 bit, in one embodiment). The one or more pre-computation servers are further configured to compute the one or more public keys (n) based on the one or more prime numbers (i.e., n=P*Q). The one or more pre-computation servers are further configured to generate the hash function of the one or more public keys (i.e., H(n)). The one or more pre-computation servers are further configured to generate/compute the one or more delts values. In an embodiment, the first delta value (Δ1) is a difference between the prime number (P) and the first random number (R1). In another embodiment, the second delta value (Δ2) is a difference between the prime number (Q) and the second random number (R2).

The one or more pre-computation servers are further configured to encrypt concatenated random numbers (Concatenated (R1R2)) using the third random number (R3) as the key. The one or more pre-computation servers are further configured to encrypt concatenated delta values (Concatenated (Δ1Δ2)) using the third random number (R3) as the key. The one or more pre-computation servers are further configured to encrypt the third random number (R3) using the encrypted random numbers (E(R1R2)) as the key. The one or more pre-computation servers are further configured to generate the hash indices based on a hash function of a combination of encrypted random numbers (E(R1R2)) and the one or more user identities.

In order to perform the registration process, the one or more user devices 102 are configured to request the one or more authentication servers 104 for user sign up. The one or more authentication servers 104 may request the one or more pre-computation servers for the one or more user identities and the one or more private key variables. The one or more pre-computation servers are configured to send at least one of: the user names, the encrypted random numbers (E(R1R2)) and the hash function of the one or more public keys (H(n)), to the one or more user devices 102. In an embodiment, the values are then stored in a secure storage of the one or more user devices 102.

Figure 12:
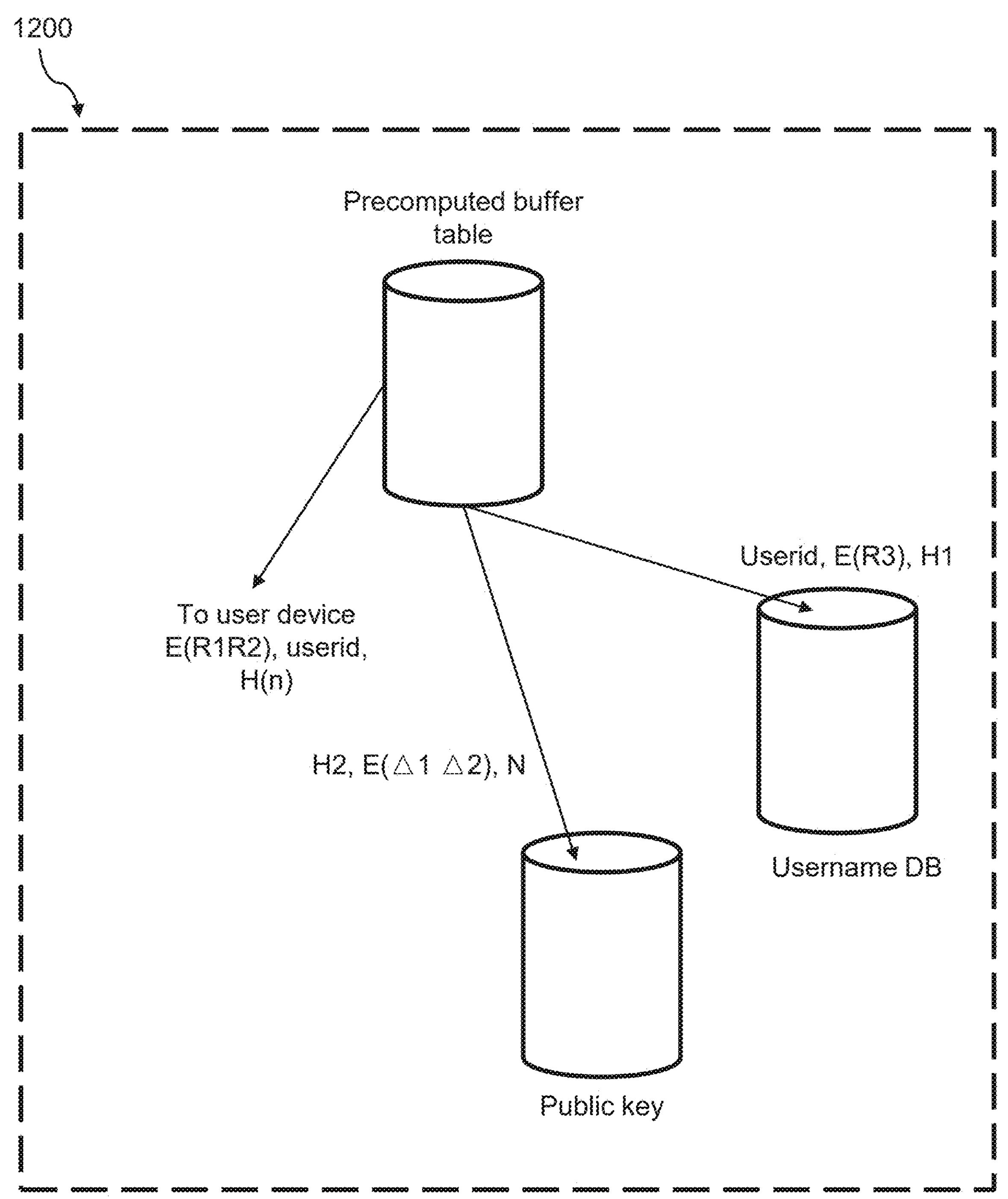
FIG. 12 is a schematic representation of the pre-computation server for pre-computing one or more unique user identities, in accordance with an embodiment of the present disclosure.

In an embodiment, the one or more pre-computation servers are configured to transmit at least one of: the user names, the encrypted third random number (E(R3)), the first hash index (H1), the second hash index (H2), and the one or more public keys (n), to the one or more databases (i.e., the username databases) of the one or more user devices 102. The username databases may store at least one of: the one or more user identities, the first hash index (H1), the encrypted third random number (E(R3)), the second hash index (H2), the encrypted delta values (E(Δ1Δ2)), and the one or more public keys (n), as shown in FIG. 12.

In yet alternate embodiment (Method 8), the computer-implemented system 106 is configured to add a process to make sure the one or more authentication servers 104 are true and not fake by verifying the HASH (HASH(n))=$H^2(n)$ sent by the server on the user/client device before proceeding the authentication process.

In order to perform the logging in process, the user credentials obtaining subsystem 210 of the one or more user devices 102 is configured to obtain the one or more user identities, associated with the one or more users. The information retrieval subsystem 212 of the one or more user devices 102 is configured to retrieve the information associated with the encrypted random numbers (R1 and R2) from the local key store. The information generation subsystem 214 of the one or more user devices 102 is configured to regenerate the one or more hash indices based on the hash function of a combination of the encrypted random numbers (R1 and R2) and the one or more user identities. The information generation subsystem 214 of the one or more user devices 102 is further configured to regenerate the one or more ciphertext messages by at least one of: creating the random number R4 and encrypting the random number R4 using a hash function of the one or more public keys as the one or more encryption keys.

The transmission subsystem 216 of the one or more user devices 102 is configured to transmit at least one of: the one or more user identities, the first hash index (H1), the second hash index (H2), and the encrypted one or more random numbers R4, to the one or more authentication servers 104.

The one or more authentication servers 104 may determine whether the one or more user identities are matched with the first hash index (H1). The one or more authentication servers 104 are further configured to retrieve at least one of: the encrypted random number R3 and the encrypted delta values (Δ1 and Δ2). The one or more authentication servers 104 are further configured to generate the one or more authentication based questions by decrypting the encrypted random numbers (R4) using the hash function of the one or more public keys (i.e., H(n)). The one or more authentication servers 104 are further configured to transmit the one or more authentication based questions with at least one of: the encrypted random number (i.e., encrypted third random number E(R3)), the encrypted one or more deltas (E(Δ1Δ2)), and the hash square functions ($H^2(n)$), to the one or more user devices 102.

The one or more user devices 102 are configured to determine whether the hash square functions of the one or more public keys sent by the one or more authentication servers 104 are matched with the hash function of the one or more public keys (HASH(H(n))). The one or more user devices 102 are configured to decrypt the encrypted third random number (R3) using the encrypted first random number and the encrypted second random number (E(R1R2)) upon matching of the hash square functions of the one or more public keys ($H^2(n)$) sent by the one or more authentication servers 104, with the hash function of the one or more public keys (HASH(H(n))). The one or more user devices 102 are further configured to decrypt the encrypted first random number and the encrypted second random number (E(R1R2)) using the decrypted third random number (R3).

The one or more user devices 102 are further configured to decrypt the encrypted one or more deltas (E(Δ1Δ2)) using the decrypted third random number (R3). The one or more user devices 102 are further configured to regenerate the one or more prime numbers (P and Q) based on a combination of the one or more deltas and the one or more random numbers (R1 and R2). The one or more user devices 102 are further configured to decrypt the one or more authentication based questions to generate the one or more authentication responses and transmit the one or more authentication responses to the one or more authentication servers 104.

In an embodiment, an example implementation may be provided for the authentication between the one or more user devices 102 and the one or more authentication servers 104. The example implementation may include one additional round trip between the one or more user devices 102 and the one or more authentication servers 104.

In order to perform the registration/sign up process, the one or more user devices 102 may generate the one or more strong passwords (i.e., k=x+y+2), where x represents a big integer value from pin number, y represents a big integer value from 10 digit random number, and z represents a big integer value from an electronic mail. The one or more user devices 102 may further send the one or more strong passwords to the one or more authentication servers 104. The one or more user devices 102 are configured to generate the one or more prime numbers (P and Q) having 1024 bit length, in one embodiment. The one or more user devices 102 may further generate the one or more salts based on the one or more random numbers. The one or more user devices 102 may further generate the one or more hash indices based on a combination of at least one of: the one or more strong passwords, the one or more emails, and the one or more salts.

The one or more user devices 102 may further generate the one or more private key variables (delta values) based on the one or more hash indices and the one or more private keys. In an embodiment, the one or more user devices 102 may further encrypt the one or more private key variables. The one or more user devices 102 may further transmit at least one of: the one or more strong passwords, the one or more public keys, the token and the keys, to the one or more authentication servers 104. In an embodiment, the one or more authentication servers 104 may store the one or more identities (e.g., the email), the random number (Y), the one or more strong passwords, the one or more private key variables, and the one or more public keys (n), in the one or more databases.

Figure 28:
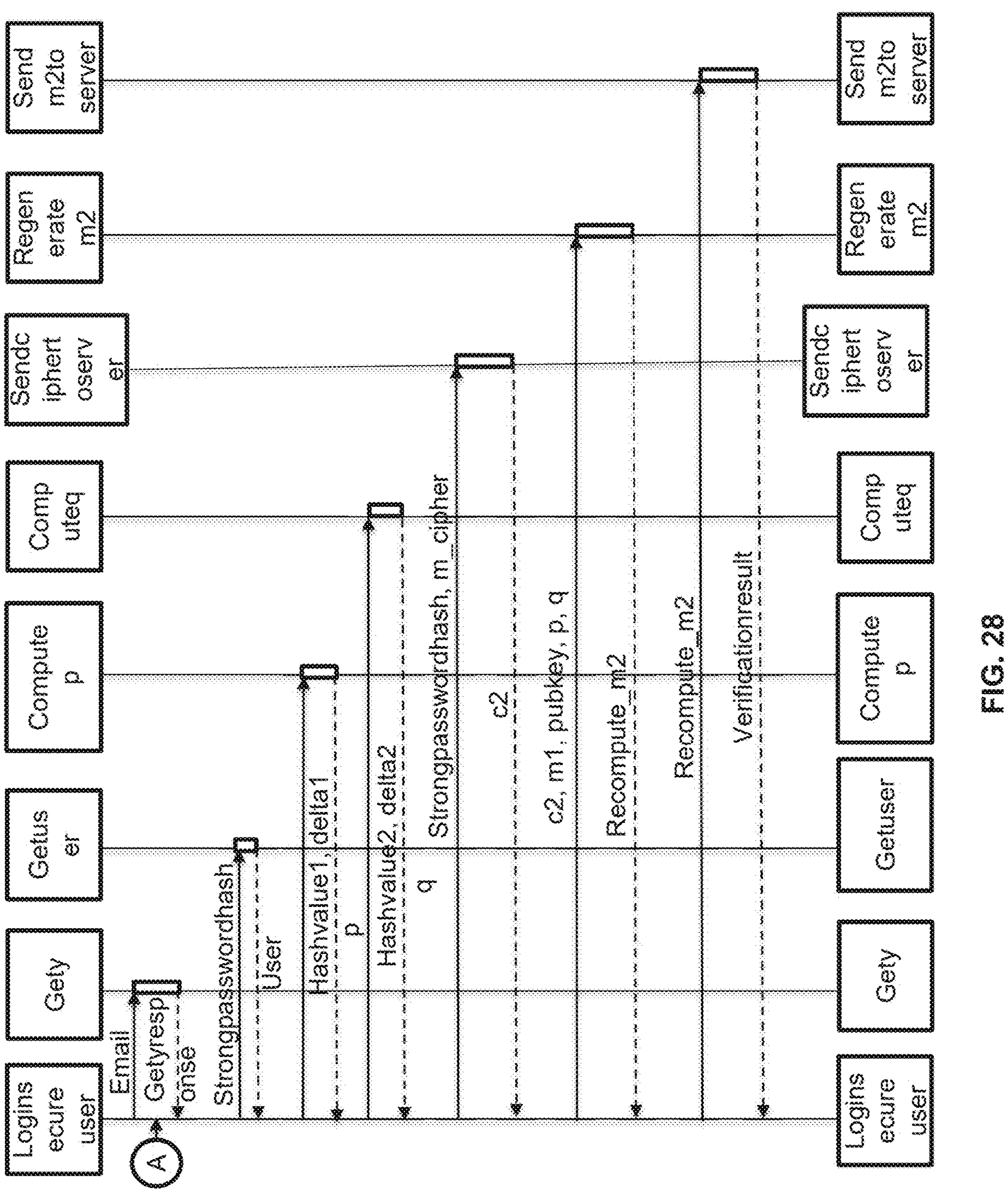
FIG. 28 is an exemplary process depicting an implementation for authentication between the one or more user devices and the one or more authentication servers, in accordance with an embodiment of the present disclosure.
Figure 28:
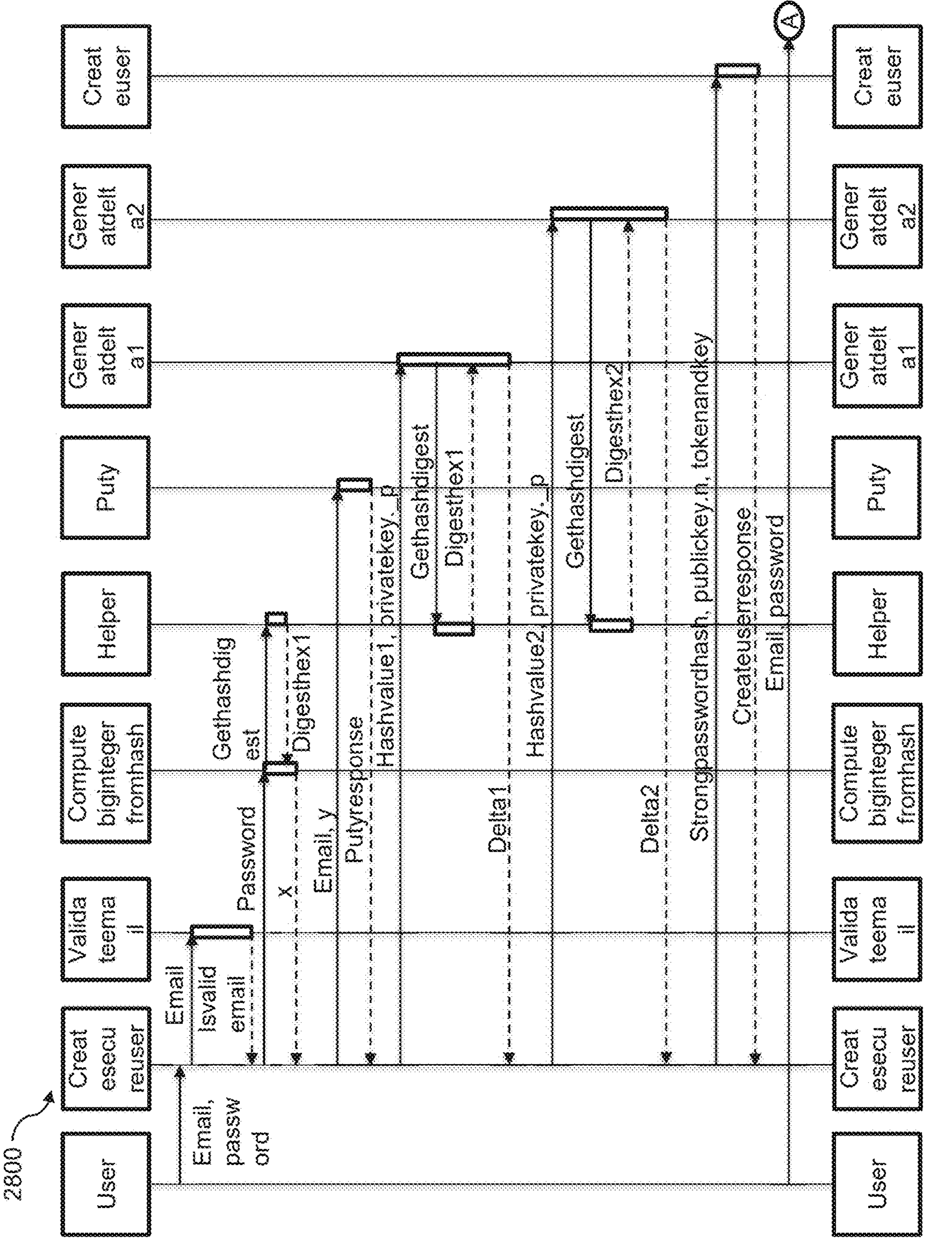

In order to perform the logging in process, the one or more user devices 102 may obtain the data (e.g., the emails) from the one or more authentication servers 104 (i.e., gety). The one or more user devices 102 may further generate the one or more strong passwords, and transmit the one or more strong passwords to the one or more authentication servers 104. The one or more user devices 102 may further retrieve the one or more private key variables with at least one of: the one or more salts and the one or more delta values. The one or more user devices 102 may further generate the one or more hash indices based on a combination of the one or more strong passwords, the one or more emails, and the one or more salts. The one or more user devices 102 may further regenerate the one or more prime numbers (P and Q) based on the hash indices and the delta values. The one or more user devices 102 may further encrypt the one or more ciphertexts with the one or more public keys (n) and send the one or more ciphertexts to the one or more authentication servers 104. The one or more user devices 102 may further decrypt the encrypted ciphertexts. Finally, the one or more user devices 102 may transmit the decrypted ciphertexts to the one or more authentication servers 104 and verify the ciphertexts based on at least one of: precomputation of m2, hash function of strong password, and the email (as shown in FIG. 28).

The computer-implemented system 106 is configured to allow for the one or more user devices 102 to be marked as a golden device or a primary device, which is used to authenticate non-primary registration. In an embodiment, the non-primary registration may be a web browser, additional devices, and the like. In an embodiment, a dynamic regeneration may allow the same passcode to the one or more users to authenticate across the one or more user devices 102 with different device fingerprint and public key pair.

The primary device may obtain the one or more user identities from the one or more users associated with the primary device. The one or more authentication servers 104 may verify the one or more user identities and send a notification to the primary/golden device. The one or more authentication servers 104 may further authenticate the one or more users associated with the primary device to allow the secondary device registration. Upon verifying the primary device, the one or more user identities are sent to the primary device.

The primary device may generate a public-private key pair. The primary device may further generate the one or more private key variables. The primary device may further generate the one or more device fingerprints by creating the one or more indices associated with the one or more device fingerprints. The primary device may transmit the one or more indices associated with the one or more device fingerprints, the one or more private key variables, and the one or more public keys, to the one or more authentication servers 104. The one or more authentication servers 104 may store the secondary device information including at least one of: the one or more user identities, the first index (H1), type of the device, the encrypted random numbers (E(R2R3)), the second index (H2), the one or more private key variables, and the one or more public keys (n2). In an embodiment, the one or more user devices may store the one or more fingerprints securely.

In an embodiment, the secondary device logging in process may be similar to the logging process of the primary device. The one or more user identities and the one or more indices based on the one or more device fingerprints are sent to the one or more authentication servers 104 and normal authentication steps are followed. From the primary device, the secondary device registration may be revoked and for switching the primary device to a new device, the user authentication in the primary device is required and then new primary device registration is allowed.

FIG. 3 is a flow chart 300 illustrating a registration/signup process for the authentication between the one or more user devices 102 and the one or more authentication servers 104, in accordance with an embodiment of the present disclosure. The detailed explanation for the registration/signup process for the authentication between the one or more user devices 102 and the one or more authentication servers 104, is given in the above said alternative embodiments (e.g., signup steps in the method 1).

FIG. 4 is a flow chart 400 illustrating a logging in process for the authentication between the one or more user devices 102 and the one or more authentication servers 104, in accordance with an embodiment of the present disclosure. The detailed explanation for the logging in process for the authentication between the one or more user devices 102 and the one or more authentication servers 104, is given in the above said alternative embodiments (e.g., login steps in the method 1).

FIG. 5 is a flow chart 500 illustrating a registration/signup process for the authentication between the one or more user devices 102 and the one or more authentication servers 104 based on one or more device fingerprints, in accordance with an embodiment of the present disclosure. The detailed explanation for the registration/signup process for the authentication between the one or more user devices 102 and the one or more authentication servers 104, is given in the above said alternative embodiments (e.g., signup steps in the method 2).

FIG. 6 is a flow chart 600 illustrating a logging in process for the authentication between the one or more user devices 102 and the one or more authentication servers 104 based on the one or more device fingerprints, in accordance with an embodiment of the present disclosure. The detailed explanation for the logging in process for the authentication between the one or more user devices 102 and the one or more authentication servers 104, is given in the above said alternative embodiments (e.g., login steps in the method 2).

Figure 7:
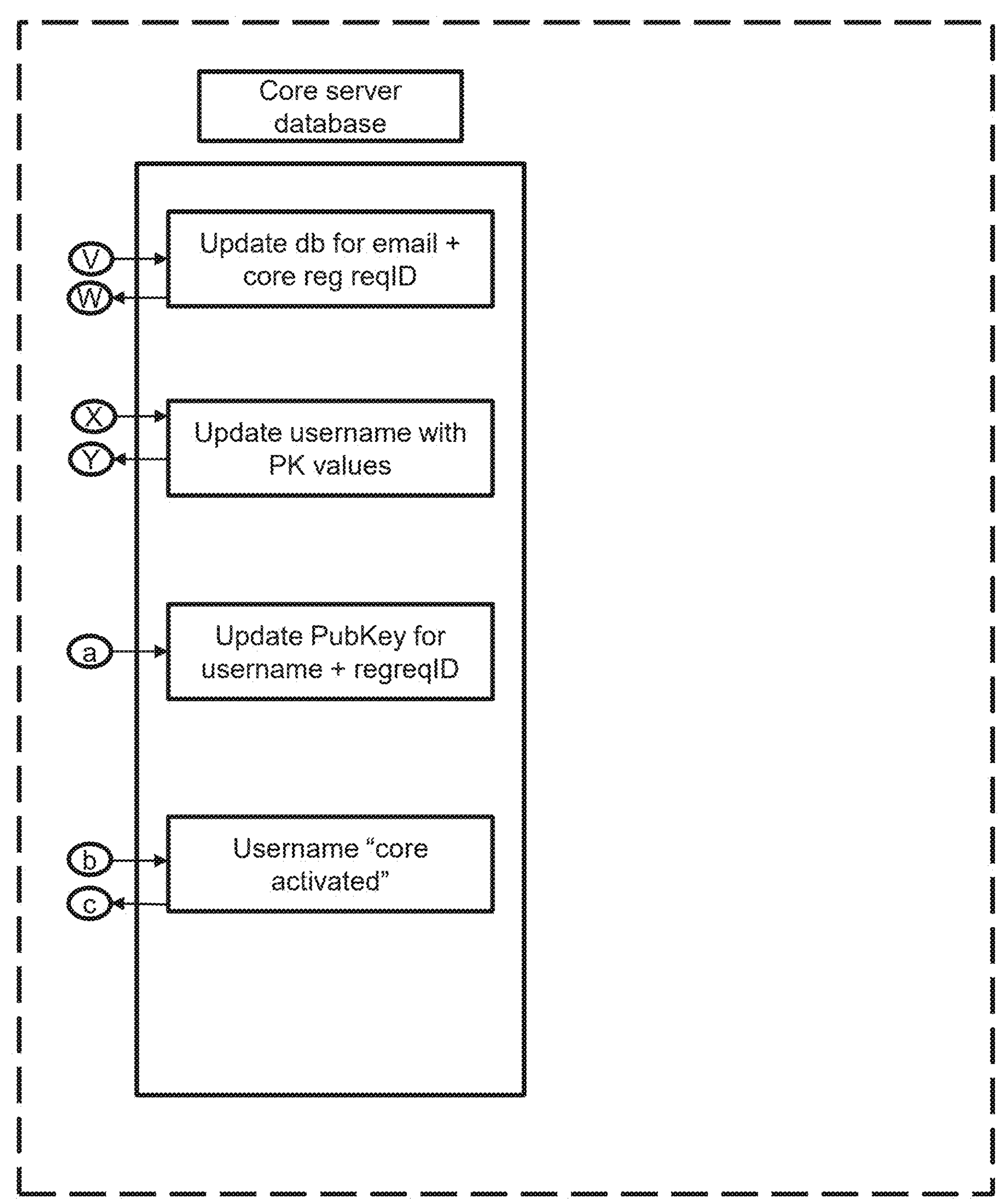
FIG. 7 is a process flow of a user registration process for the authentication between the one or more user devices and the one or more authentication servers, through one or more applications, in accordance with an embodiment of the present disclosure.

FIG. 7 is a process flow 700 of a user registration process for the authentication between the one or more user devices 102 and the one or more authentication servers 104, through one or more applications, in accordance with an embodiment of the present disclosure. The mobile application of the user device 102 may obtain the user credentials (e.g., the emails, password, and other personal details) from the users. The mobile application of the user device 102 may further collect fingerprints and system details. The authentication server API may compare the user information in a local database. The authentication server 104 checks whether the email already exists. If no, the authentication server 104 generates core registration request identity (ID) with user activation code, which enables the user device 102 to initiate registration request to the server core service.

The core server API may check a valid registration request ID. The authentication server 104 may check the registration request ID with the user information to check the valid registration request ID in the application database. If valid, the core server API may add new entry for user and core registration request ID along with expiry time. The core server database may be updated for email and core registration request ID and also updated with username and primary kay values, which are then sent to client core service. The client core or the mobile application may generate private key and public key pair using the received values associated with the private keys. The mobile application of the user device 102 may send the public key and core registration request ID with the user name to the core server API for adding the public key for the user name. In an embodiment, the public key, the user name, and the registration request ID are updated in the core server database. The core server API may activate the core registration request ID and the user name to mark the user name as core activated. Once the core activation is done, the success code is sent to the core server API to activate the user name and the user name is updated in the core server database. The core server API may send the success message to the user device 102.

Figure 8:
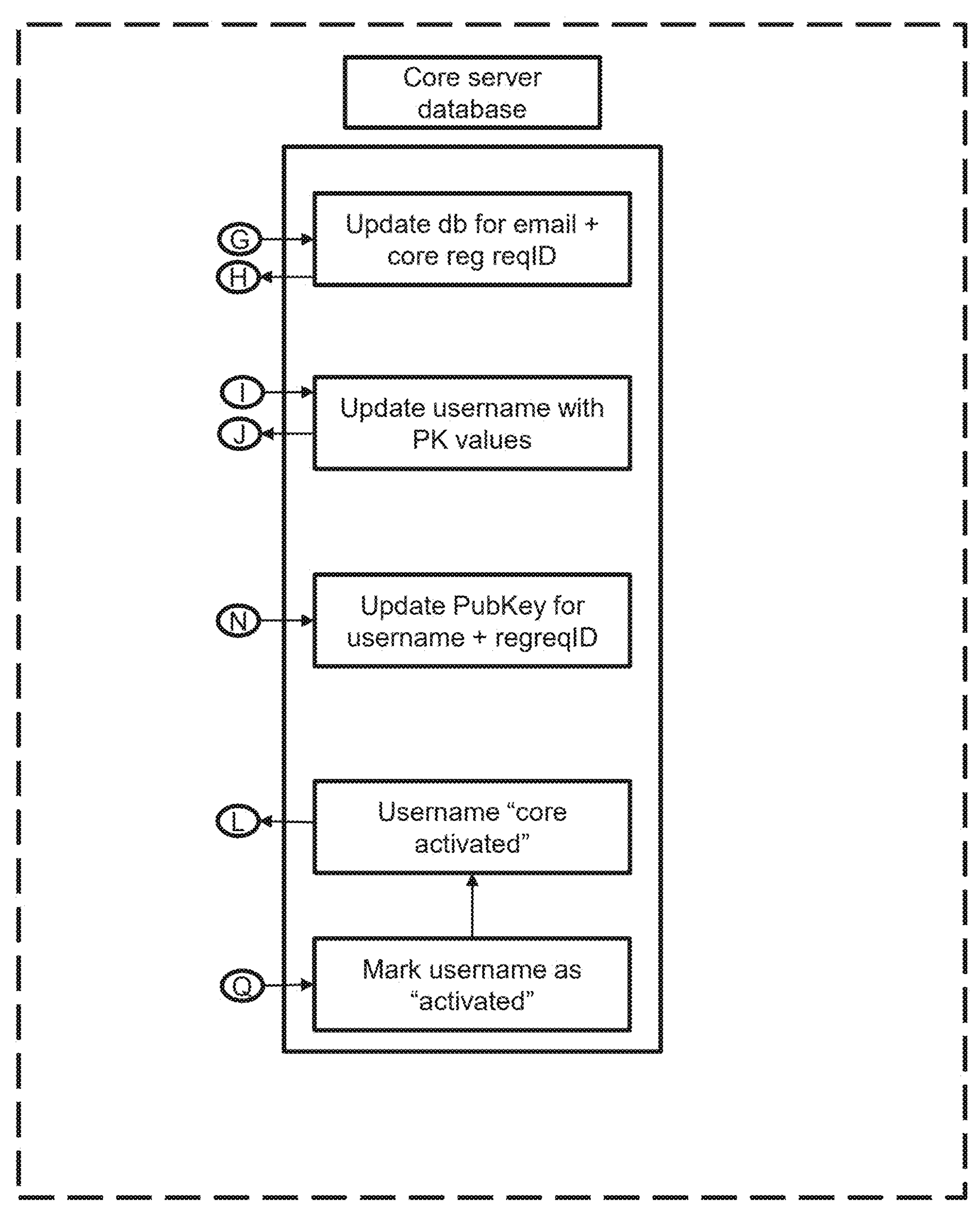
FIG. 8 is a process flow of the user registration process for the authentication between the one or more user devices and the one or more authentication servers, through one or more applications, in accordance with an embodiment of the present disclosure.

FIG. 8 is a process flow 800 of the user registration process for the authentication between the one or more user devices 102 and the one or more authentication servers 104, through one or more applications, in accordance with an embodiment of the present disclosure. The mobile application of the user device 102 may obtain the user credentials (e.g., the emails, password, and other personal details) from the users. The mobile application of the user device 102 may further collect the fingerprints and the system details. The authentication server API may compare the user information in the local database. The authentication server 104 checks whether the email already exists. If no, the authentication server 104 generates core registration request identity (ID) with user activation code, which enables the user device 102 to initiate registration request to the server core service.

The core mobile SDK may check a valid registration request ID. The authentication server 104 may check the registration request ID with the user information to check the valid registration request ID in the application database. If valid, the core server API may add new entry for user and core registration request ID along with expiry time. The core server database may be updated for email and core registration request ID and also updated with username and primary kay values, which are then sent to core mobile SDK. The client core or the mobile application may generate private key and public key pair using the received values associated with the private keys. The mobile application of the user device 102 may send the public key and core registration request ID with the user name to the core server database. In an embodiment, the public key, the user name, and the registration request ID are updated in the core server database. The core mobile SDK may activate the core registration request ID and the user name to mark the user name as core activated. Once the core activation is done, the success code is sent to the core server API to activate the user name and the user name is updated in the core server database. The core mobile SDK may send the success message to the user device 102.

Figure 9:
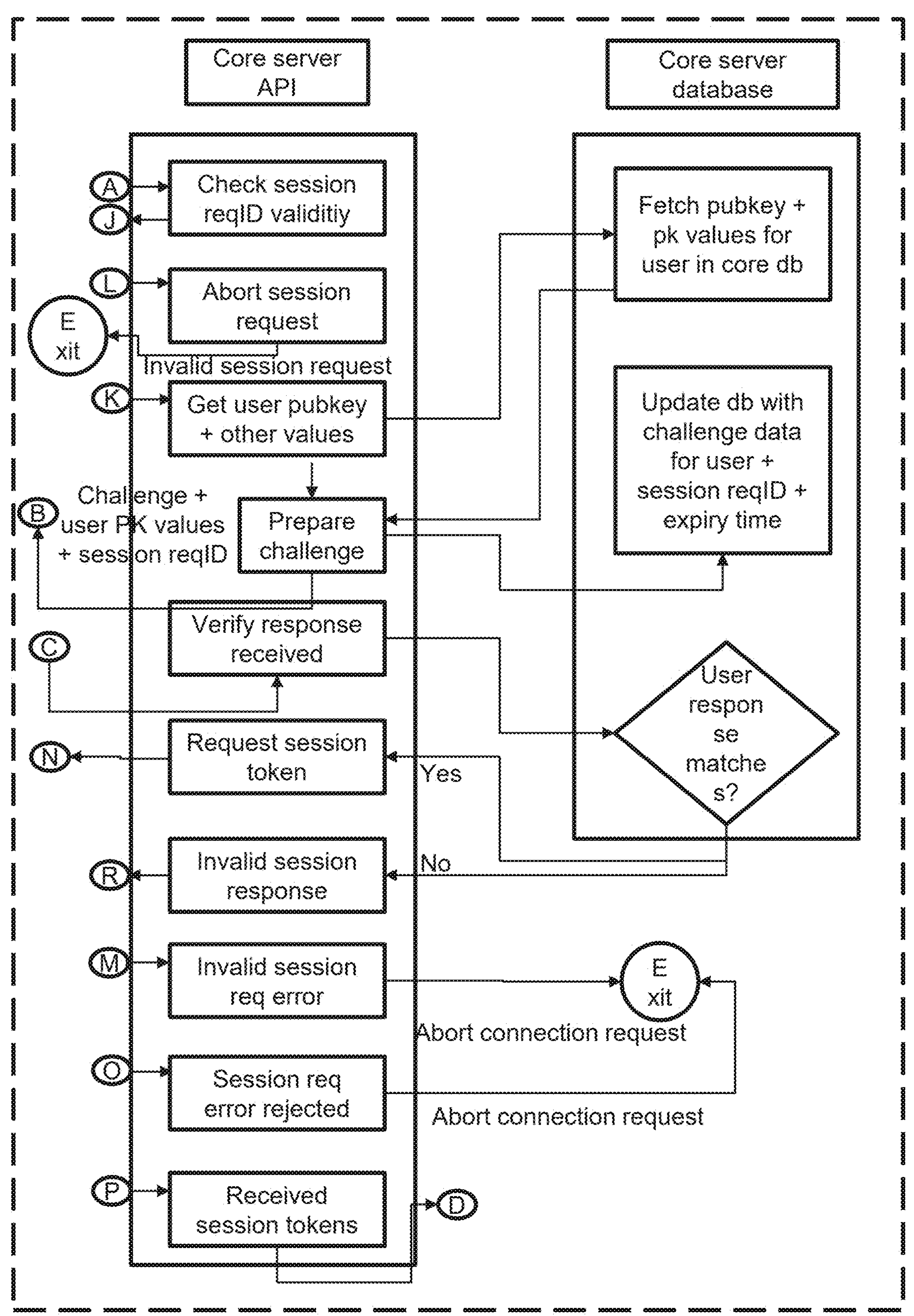
FIG. 9 is a process flow of the user registration process for the authentication between the one or more user devices and the one or more authentication servers, through one or more devices, in accordance with an embodiment of the present disclosure.

FIG. 9 is a process flow 900 of the user registration process for the authentication between the one or more user devices 102 and the one or more authentication servers 104, through one or more devices, in accordance with an embodiment of the present disclosure. The mobile application of the user device 102 may obtain the user credentials (e.g., the emails, password, and other personal details) from the users. The mobile application of the user device 102 may further collect the fingerprints, the system details, and session details. The authentication server API may compare the user information in the local database. The authentication server 104 checks whether the email already exists. If no, the authentication server 104 generates session request identity (ID) with expiry time, which enables the application database to update the user name, session details, devid, session request ID, and expiry time. The authentication server 104 communicates the session request ID to the mobile application of the user device 102 to initiate a token request.

The core server API may check for a valid session request ID. The authentication server 104 may check the session request ID with the user information to check the valid registration request ID in the application database. If valid, the core server API may obtain user public key with other values. The core server database may fetch the public key with primary key values for the user in core database. The core server API may prepare challenge based on the public key and other primary key values. The core server API may send the challenge, primary key values and the session request ID to the mobile application of the user device 102 to enable the user device 102 to prepare response with password as an input. The core server API receives the response and verifies the response at the core server database. If matches, the core server API requests the session token to the authentication server 104 and the authentication server 104 may check the validity of the session request ID. If yes, the authentication server 104 may generate session request token and fetch the device information from the application database. The authentication server 104 may push a notification to the user device 102 with the session approval link, as messages. The authentication server 104 may generate the session access token and send the session access token to the core server API to enable the user device 102 to start the session.

Figure 10:
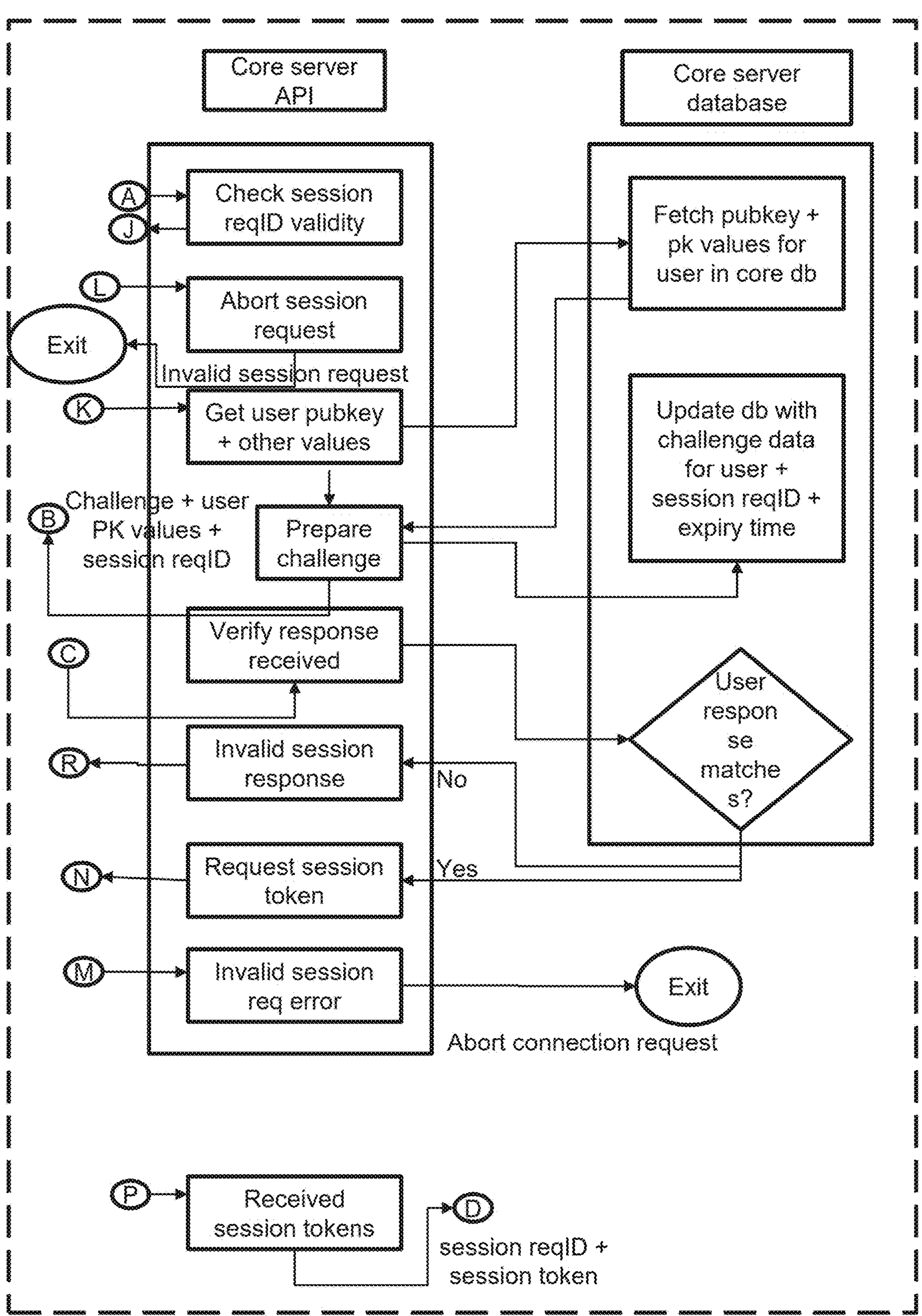
FIG. 10 is a process flow of the user registration process for the authentication between the one or more user devices and the one or more authentication servers, through one or more registered user devices, in accordance with an embodiment of the present disclosure.

FIG. 10 is a process flow 1000 of the user registration process for the authentication between the one or more user devices 102 and the one or more authentication servers 104, through one or more registered user devices, in accordance with an embodiment of the present disclosure. The mobile application of the user device 102 may obtain the user credentials (e.g., the emails and the password) from the users. The mobile application of the user device 102 may further collect the fingerprints, the system details, and the session details. The authentication server API may compare the user information in the local database. The authentication server 104 checks whether the email already exists. If no, the authentication server 104 generates the session request identity (ID) with expiry time, which enables the application database to update the user name, session details, devid, session request ID, and expiry time. The application database again checks whether it is a primary device. If yes, the authentication server 104 communicates the session request ID to the mobile application of the user device 102 to initiate a token request.

The core server API may check for a valid session request ID. The authentication server 104 may check the session request ID with the user information to check the valid registration request ID in the application database. If valid, the core server API may obtain user public key with other values. The core server database may fetch the public key with primary key values for the user in core database. The core server API may prepare challenge based on the public key and other primary key values. The core server API may send the challenge, primary key values and the session request ID to the mobile application of the user device 102 to enable the user device 102 to prepare response with password as an input. The core server API receives the response and verifies the response at the core server database. If matches, the core server API requests the session token to the authentication server 104 and the authentication server 104 may check the validity of the session request ID. If yes, the authentication server 104 may check whether it is the primary device. If yes, then the authentication server 104 generates session request token and updates the session request ID with the session request token at the application database. The authentication server 104 may send the session access token to the core server API to enable the user device 102 to start the session.

Figure 13:
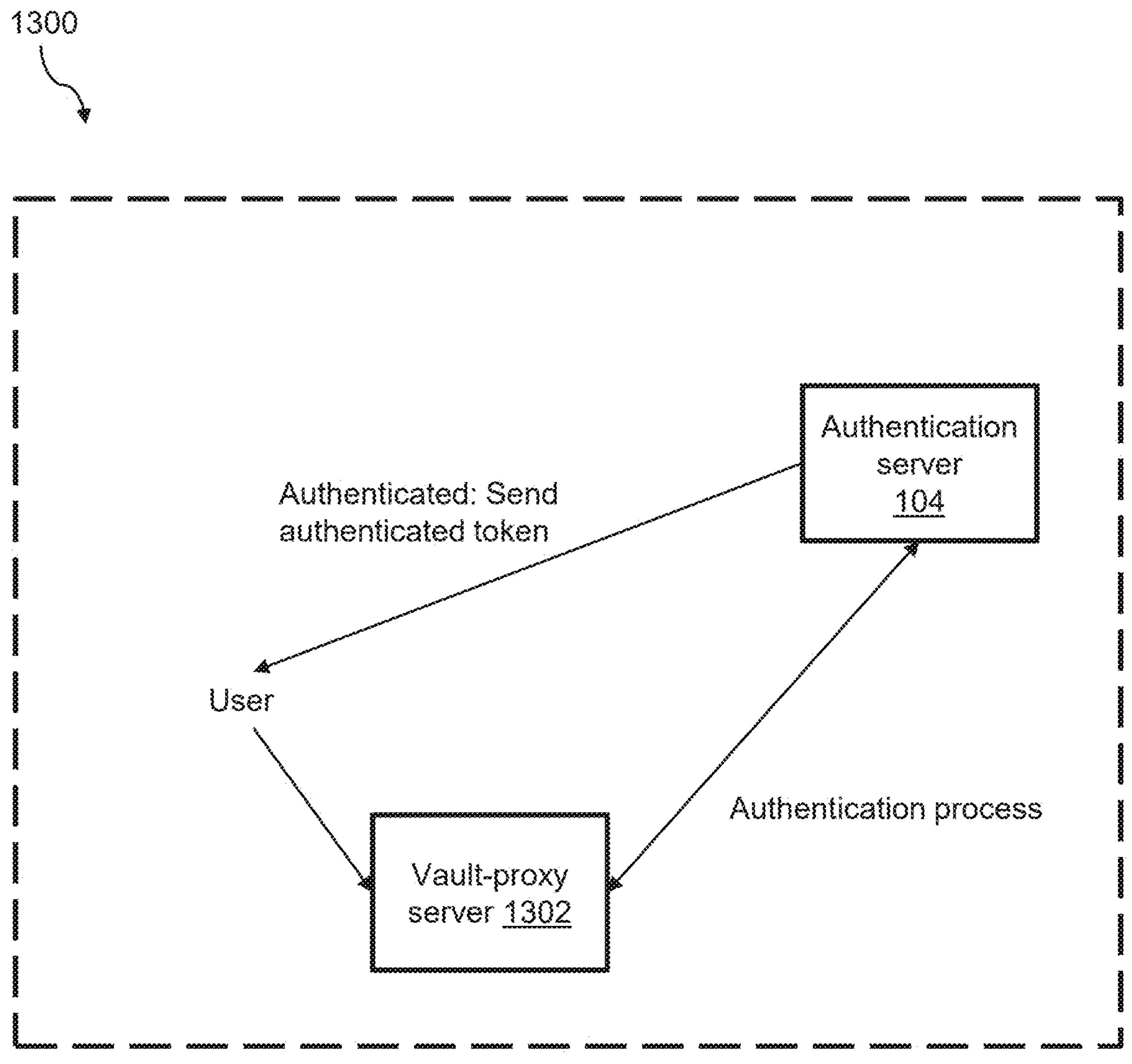
FIG. 13 is a schematic representation of one or more vaults in a cloud to store one or more user credentials, in accordance with an embodiment of the present disclosure.

FIG. 13 is a schematic representation 1300 of one or more vaults in a cloud to store the one or more user credentials, in accordance with an embodiment of the present disclosure. The one or more vaults in the cloud may be used instead of secure storage in the one or more user/client devices 102 to store the one or more user credentials and these user credentials may be accessed through the passcodes, and the private keys are dynamically regenerated in the one or more vaults. In an embodiment, a vault server 1302 may act as a proxy for the user associated with the one or more user devices 102 to authenticate with the one or more authentication servers 104. Once authenticated, the token is issued to the one or more user/client devices to access the service. The one or more vaults may act as a secure storage on the cloud and also a proxy agent to automatically authenticate the user associated with the one or more user devices 102 with the one or more authentication servers 104.

Figure 14:
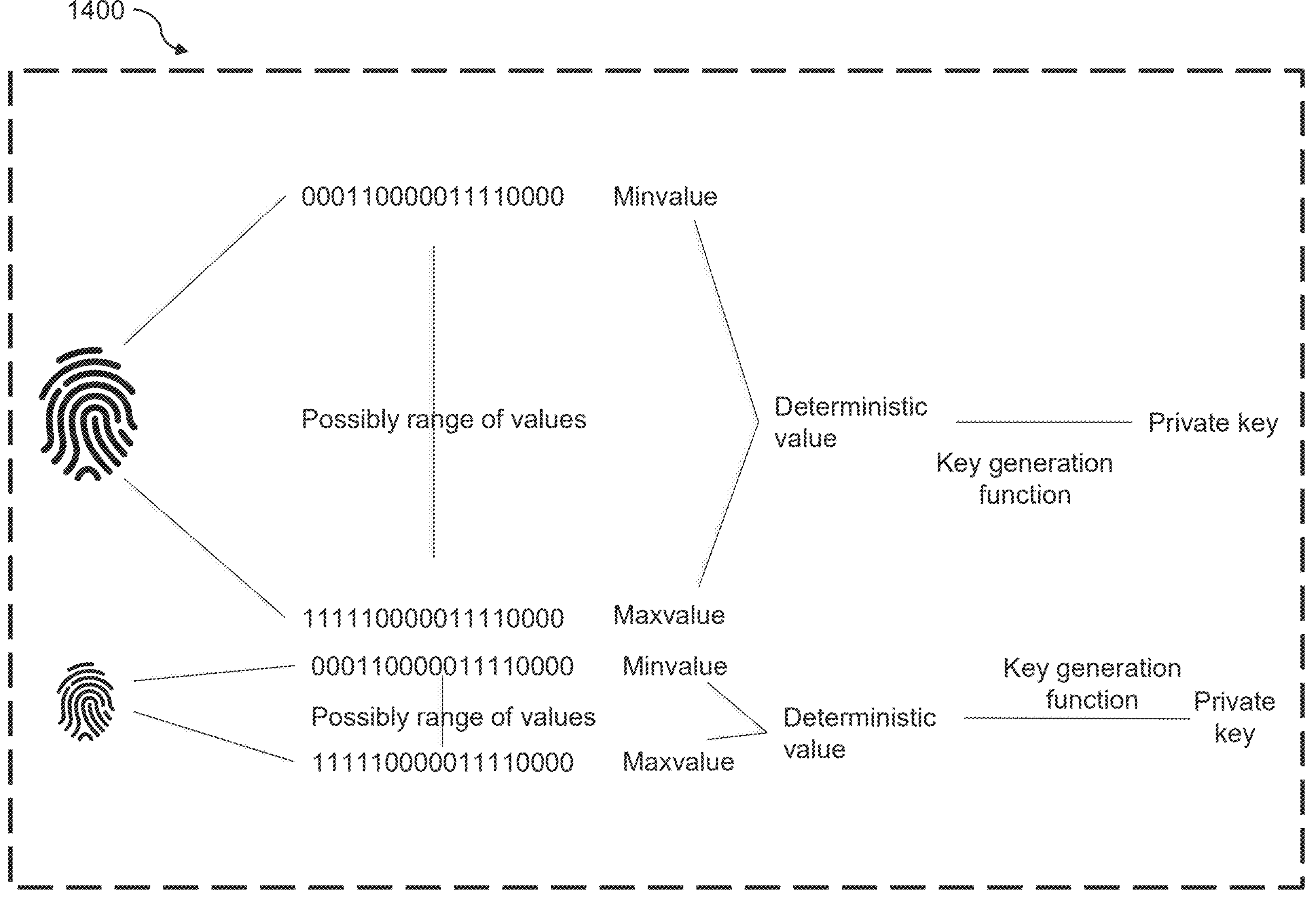
FIG. 14 is a schematic representation of generation of a private key based on biometric information, in accordance with an embodiment of the present disclosure.
Figure 15:
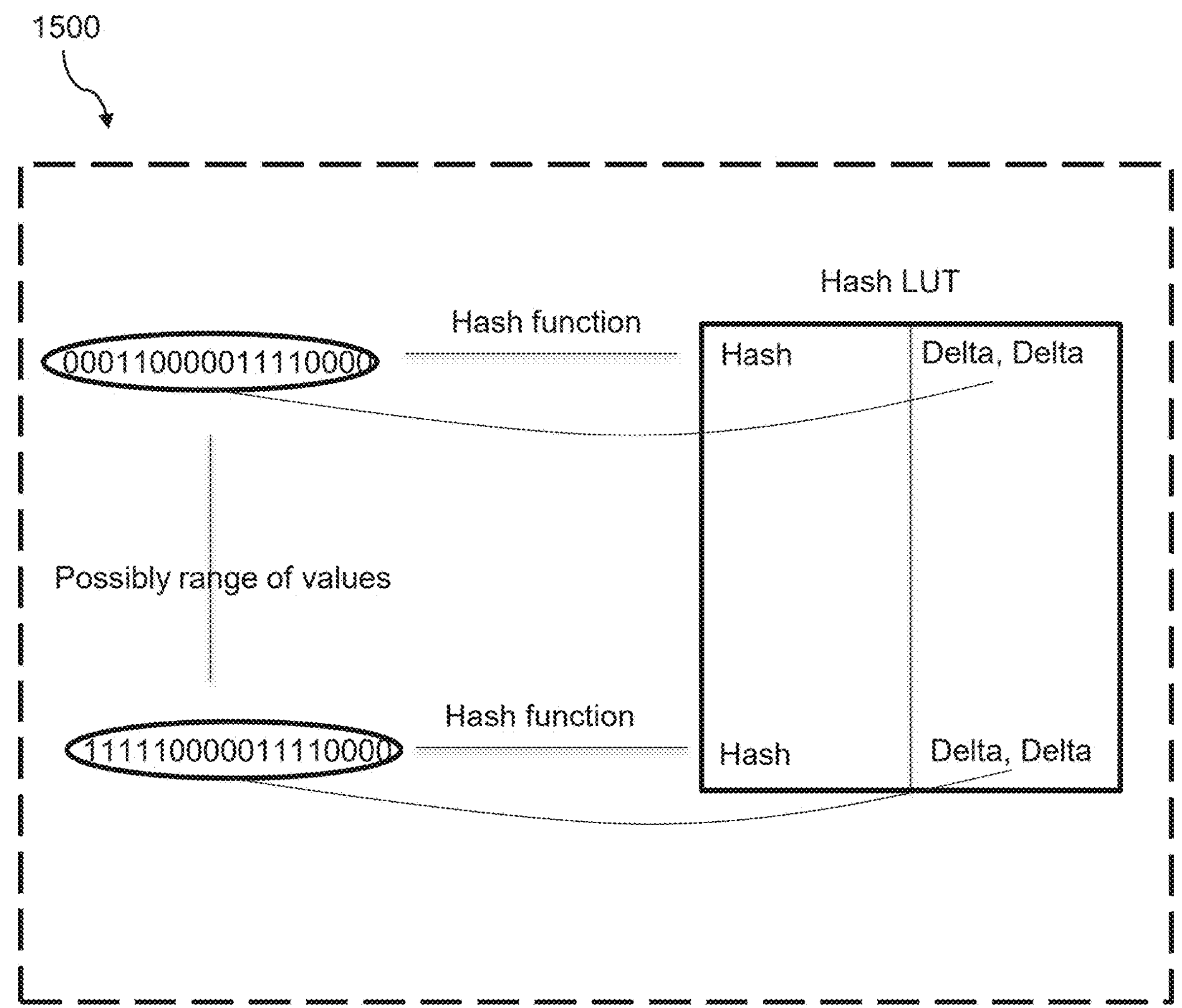
FIG. 15 is a schematic representation of a hash lookup table having delta values based on range of values associated with the biometric information, such as those shown in FIG. 14, in accordance with an embodiment of the present disclosure.

FIG. 14 is a schematic representation 1400 of generation of a private key based on biometric information, in accordance with an embodiment of the present disclosure. FIG. 14 shows that the biometric information of the one or more users are converted as possible range of values which are used to generate the one or more private keys. In an embodiment, the possible range of values may be maximum deterministic values and minimum deterministic values for generating the one or more private keys. FIG. 15 is a schematic representation of a hash lookup table having delta values based on the possible range of values associated with the biometric information, such as those shown in FIG. 14, in accordance with an embodiment of the present disclosure.

In an embodiment, in double blind authentication, the one or more user devices 102 may authenticate the one or more authentication servers 104 as the one or more authentication servers 104 authenticate the one or more user devices 102. In the double blind authentication, both the one or more user devices 102 and the one or more authentication servers 104 do not know the one or more private keys each other.

The double blind authentication may be used for machine to machine authentication, wherein both the machines concurrently act as a user device and an authentication server to each other. Both the machines may register with each other. Only when both the machines authenticate with each other makes the login happened, else the login may be rejected. In an embodiment, the hash square function (HASH (HASH (n))=$H^2$(n)) may provide a strong verification on the one or more user devices 102 and a weak verification of the one or more authentication servers 104. The double blind authentication may provide a strong verification on both the one or more user devices 102 and the one or more authentication servers 104.

The migration of the one or more user devices 102 based on at least one of: the one or more user identities, the one or more salts, the hash function of the salts and passwords, to enable the public-private key cryptography based authentication is a challenging task. The computer-implemented system 106 may allow just-in-time migration of the one or more user devices 102 and also bulk user device migration which is transparent to the users and the users may not see the difference. When a user device logs in for the first time, and if the password matches a password in the existing password database to logging in. The computer-implemented system 106 may convert the simple keyed-in password to a complex password. The computer-implemented system 106 may utilize the complex password as an input to generate the one or more private key variables.

In an embodiment, the one or more public keys may be stored in the user database and the one or more private key variables may be stored in the one or more vaults. The hashed password in the user's legacy authentication process may be deleted and a flag may be set for the user to "Yes" indicating the user as a primary user. When the user logs in next time, the password may be used by the computer-implemented system 106 to authenticate the one or more user devices 102 with the one or more authentication servers 104. The computer-implemented system 106 may migrate one user at a time at their first login after the computer-implemented system 106 is configured for the user. For the users wanting to do mass migration, the user devices 102 may send a push notification in batches asking their users to login once, which may automatically trigger the migration for the system 106.

In an embodiment, the one or more passwords/passcodes are used to generate the one or more strong passwords, as mentioned in above said alternate embodiments (e.g., method 3 and 4). The one or more passwords/passcodes are used as an input to a key derive function and an output of the key derive function is used as an encryption key instead of the random number R3, as mentioned in above said alternate embodiments (e.g., in method 5 to method 8). The utilization of the one or more passwords/passcodes may provide a continuation experience to the one or more users. In another implementation, the existing password is converted to the random number (R3) using one time code which may be salt or random number. In an embodiment, the password may not be required for subsequent login providing a passwordless experience, once the random number (R3) is created/generated.

In an embodiment, for a situation where there is no dedicated mobile application for signing up, a roaming authenticator may act as the mobile application for authenticating the user device 102. The one Time Passcode sent through SMS may not be authenticated whether the SMS coming from a claimed service provider or a malicious server. The roaming authenticator may authenticate and validate the one time password (OTP) for the user device 102, which defeats a situation where a user receives an OTP for the service provider A and enters the OTP in a malicious website that uses the OTP to login to the user's financial institution. By using the authenticator of the present invention, the user may enter the OTP code received in the authenticator for the corresponding service provider. The authenticator of the present invention may utilize the OTP to authenticate with the server.

Figure 16:
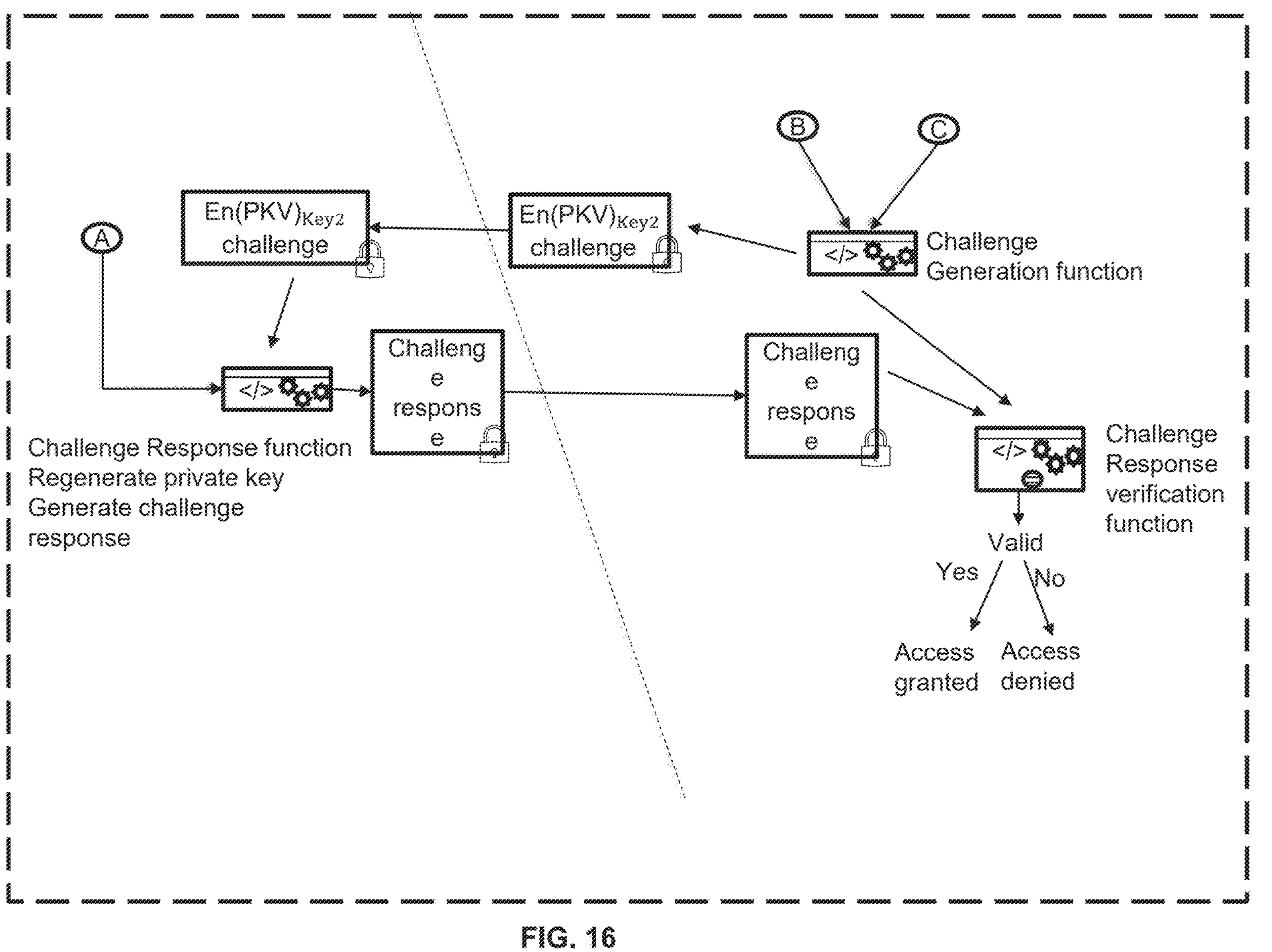
FIG. 16 is a schematic representation depicting the login process for the authentication between the one or more user devices and the one or more authentication servers, in accordance with an embodiment of the present disclosure.
Figure 16:
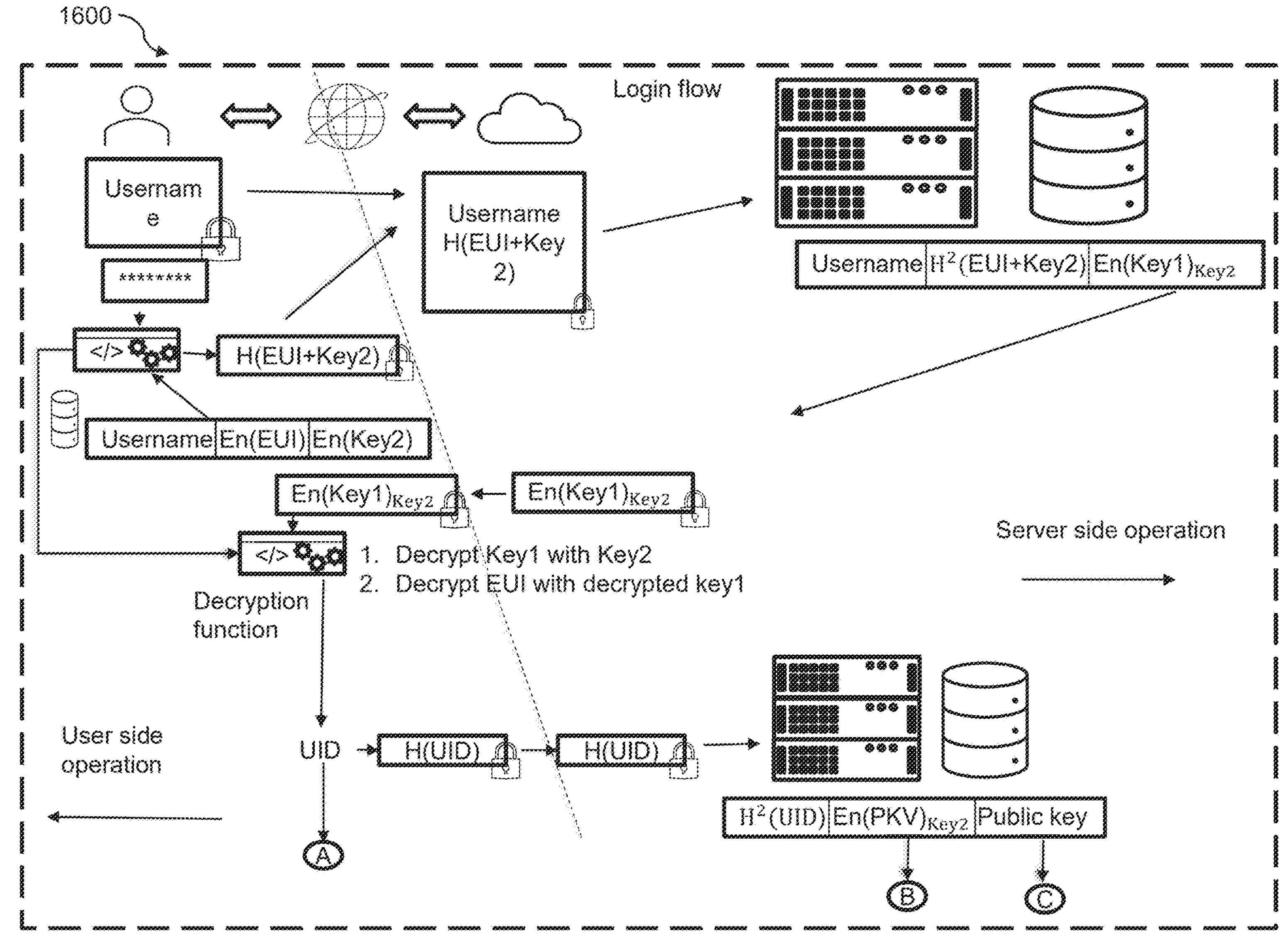

FIG. 16 is a schematic representation 1600 depicting the login process for the authentication between the one or more user devices 102 and the one or more authentication servers 104, in accordance with an embodiment of the present disclosure. The detailed explanation for the login process for the authentication between the one or more user devices 102 and the one or more authentication servers 104, is given in the above said alternative embodiments.

Figure 17:
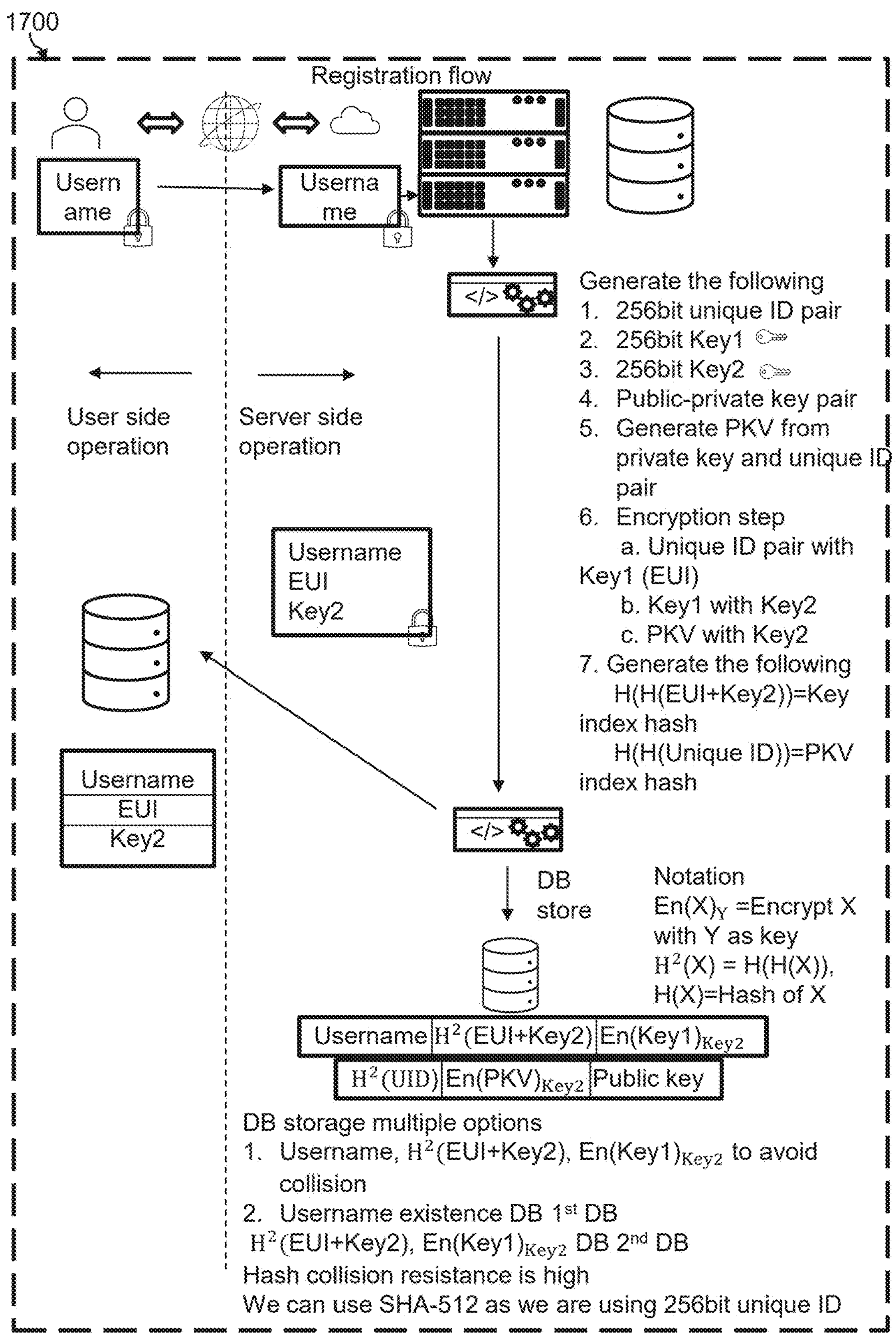
FIG. 17 is a schematic representation depicting the registration process for the authentication between the one or more user devices and the one or more authentication servers, in accordance with an embodiment of the present disclosure.

FIG. 17 is a schematic representation 1700 depicting the registration process for the authentication between the one or more user devices 102 and the one or more authentication servers 104, in accordance with an embodiment of the present disclosure. The detailed explanation for the registration process for the authentication between the one or more user devices 102 and the one or more authentication servers 104, is given in the above said alternative embodiments.

Figure 18:
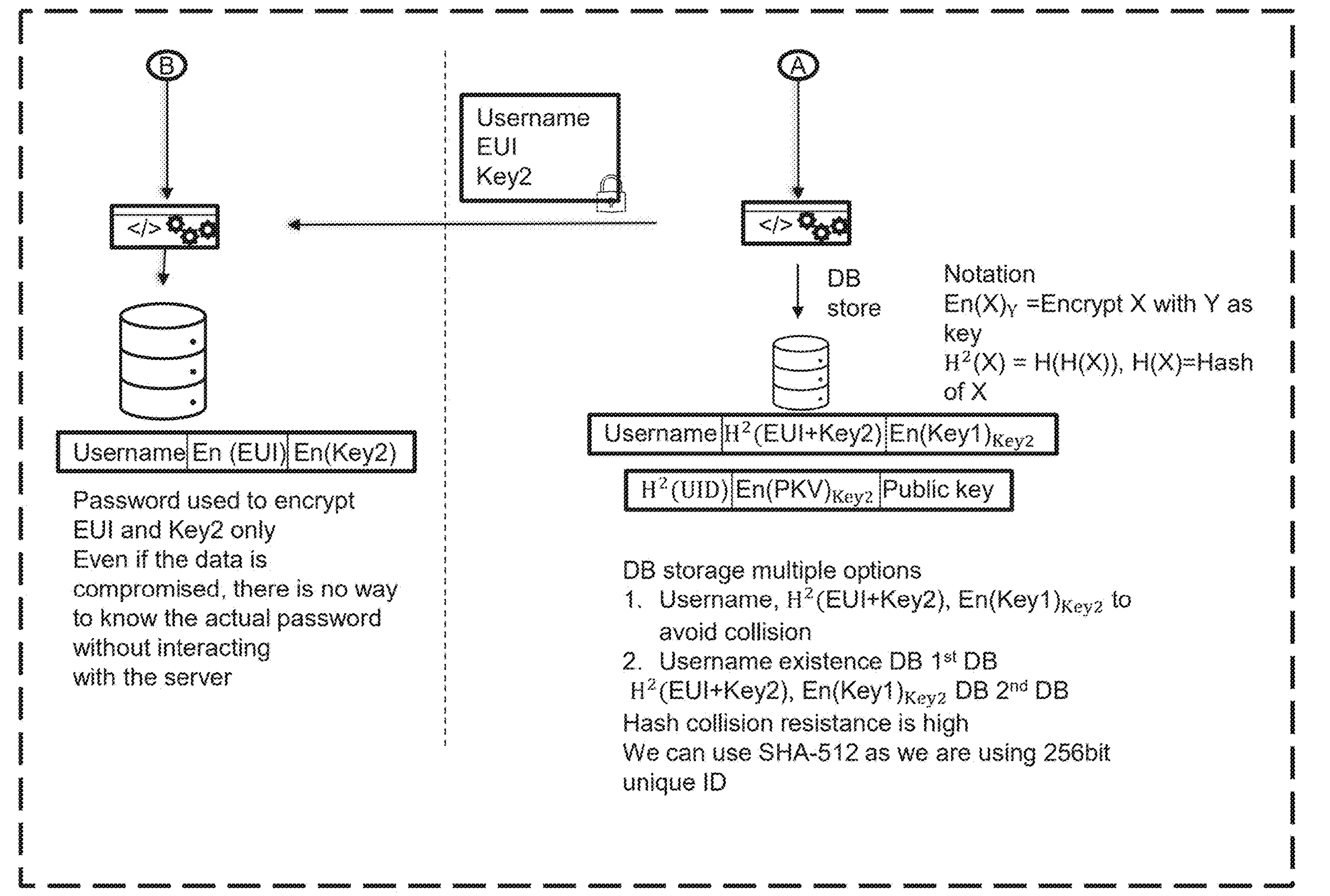
FIG. 18 is a schematic representation depicting the registration process for the authentication between the one or more user devices and the one or more authentication servers, based on one or more passwords used to encrypt extended unique identifier and one or more keys, in accordance with an embodiment of the present disclosure.
Figure 18:
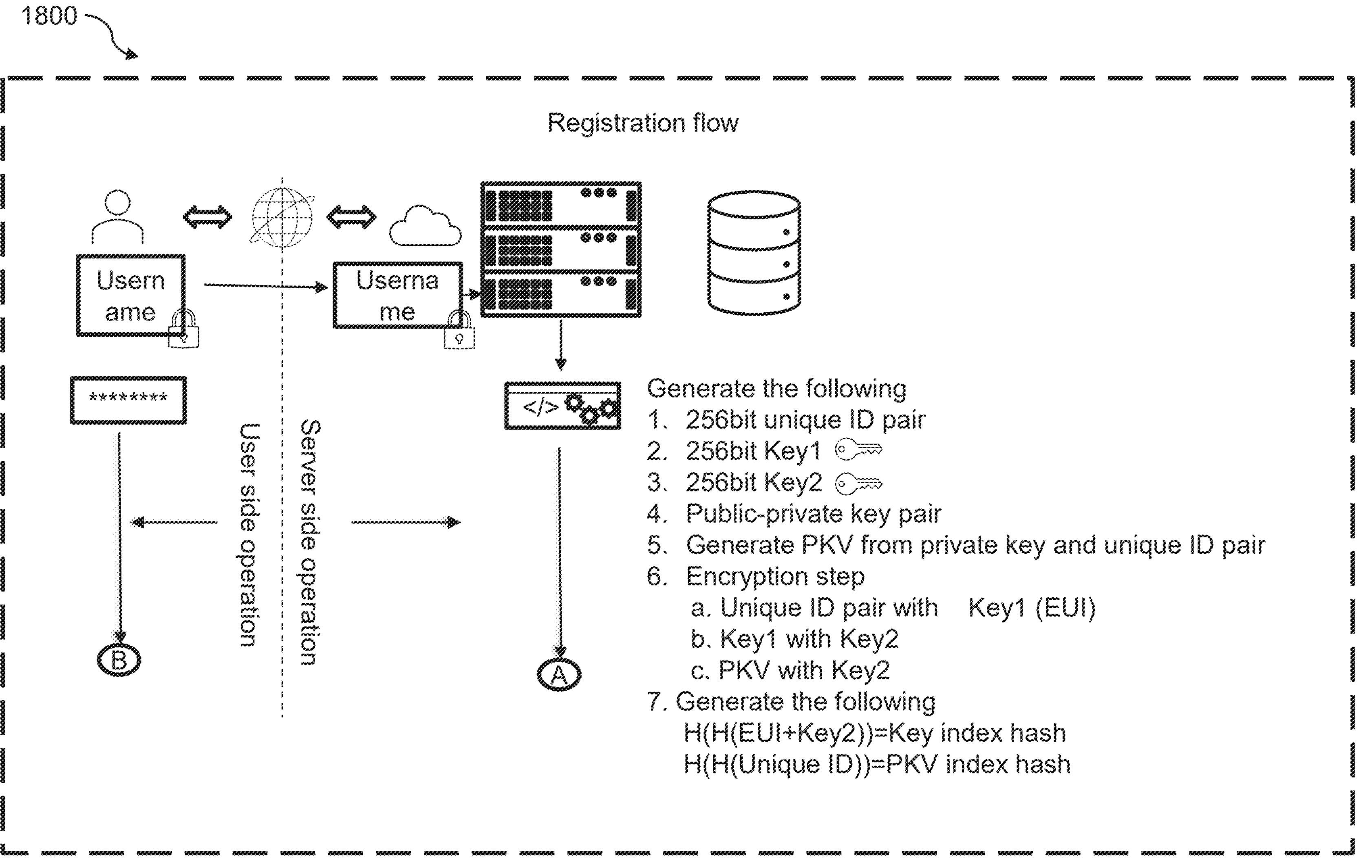

FIG. 18 is a schematic representation 1800 depicting the registration process for the authentication between the one or more user devices 102 and the one or more authentication servers 104, based on one or more passwords used to encrypt extended unique identifier and one or more keys, in accordance with an embodiment of the present disclosure. The detailed explanation for the registration process for the authentication between the one or more user devices 102 and the one or more authentication servers 104, is given in the above said alternative embodiments.

Figure 19:
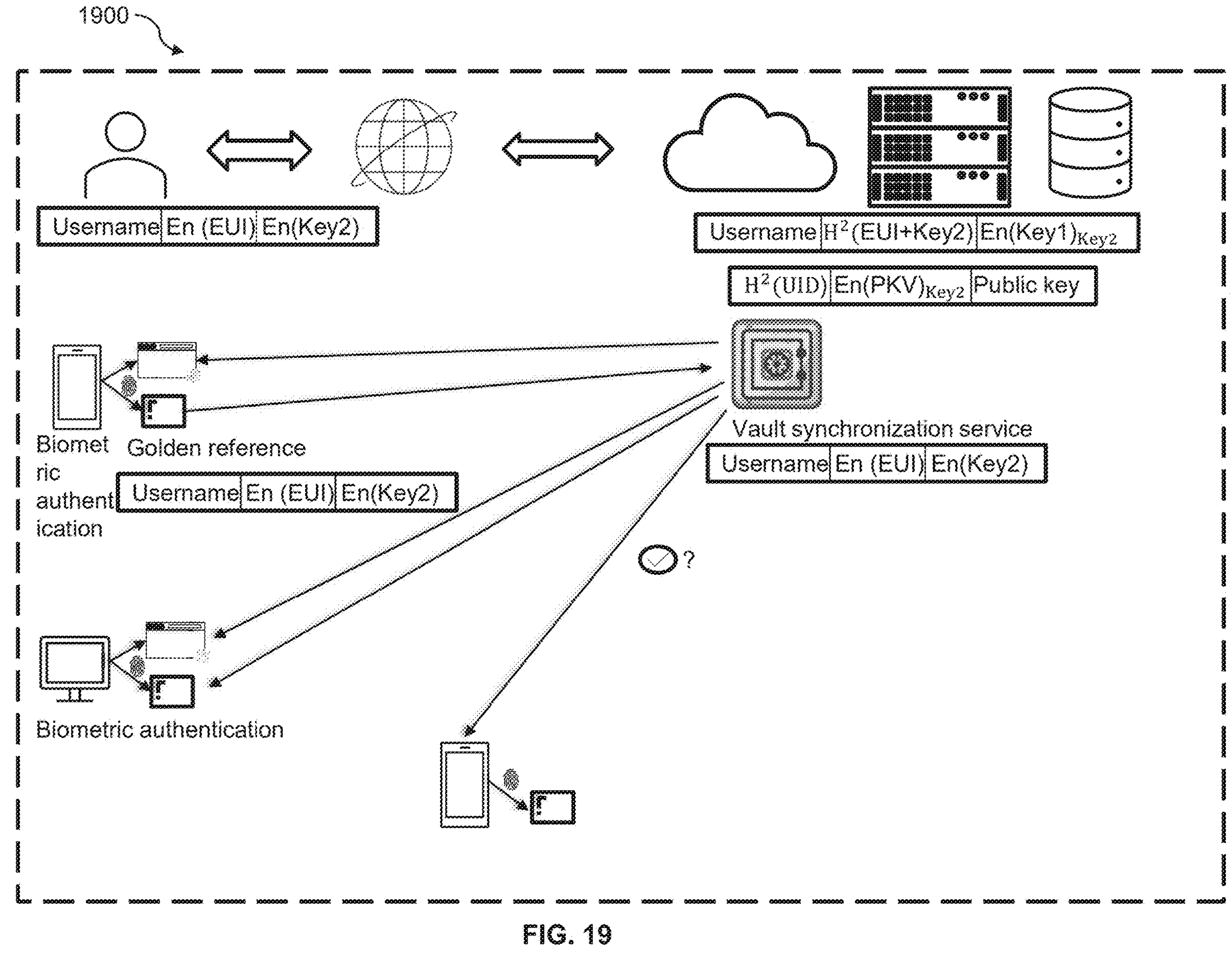
FIG. 19 is a schematic representation depicting a vault synchronization service for the authentication between the one or more user devices and the one or more authentication servers, in accordance with an embodiment of the present disclosure.

FIG. 19 is a schematic representation 1900 depicting a vault synchronization service for the authentication between the one or more user devices and the one or more authentication servers, in accordance with an embodiment of the present disclosure. The vault may store the one or more user identities, the encrypted extended unique identifier (EUI), the encrypted keys, for authenticating with the one or more user devices 102.

Figure 20:
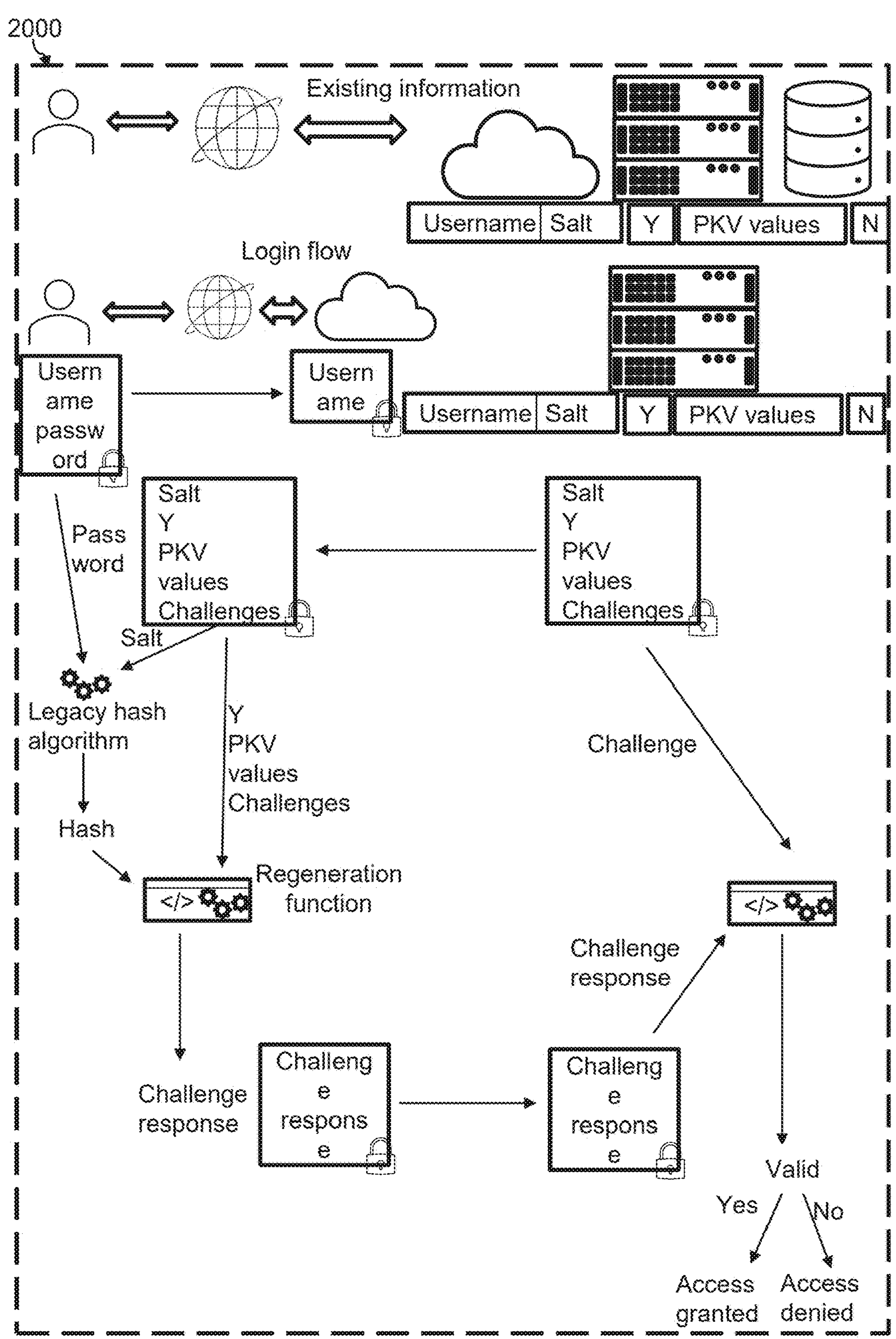
FIG. 20 is a schematic representation depicting the login process for the authentication between the one or more user devices and the one or more authentication servers, based on existing information, in accordance with an embodiment of the present disclosure.

FIG. 20 is a schematic representation 2000 depicting the login process for the authentication between the one or more user devices and the one or more authentication servers, based on existing information, in accordance with an embodiment of the present disclosure. The detailed explanation for the logging in process for the authentication between the one or more user devices 102 and the one or more authentication servers 104, is given in the above said alternative embodiments. The schematic representation 2000 depicts an user logging using the username and password and the authentication is based on public private key cryptography zero knowledge proof. The user entered password is not transmitted to the one or more authentication servers 104 to match for authenticating the user. The username and password to public private key authentication process is depicted. The one or more authentication servers 104 stores the user credentials that compromise of username, one or more salt, one or more Y (random value or seed) for strong password generation, one or more private keys variables, and one or more public keys. When one or more user devices 102 initiate the logging in process for authentication, the one or more authentication servers 104 checks for the existence of the username. If the username matches, the one or more authentication servers 104 transmit to the one or more user devices 102 the one or more salt, one or more Y, one or more private key variables and the challenge. The private key regeneration subsystem (i.e., the key generation subsystem 218) in the one or more user devices 102, regenerates the HASH of the user entered password and the salt, the regenerated HASH with the private key variable regenerates the private key. The regenerated private key is used to solve the challenge received from the one or more authentication servers 104 and transmit the challenge response to the one or more authentication servers 104. The one or more authentication servers 104 compares the received challenge response to the challenge. If it matches, the one or more user devices 102 are authenticated otherwise rejected. From the user perspective, the user enters the username and password credentials for the logging in process and the authentication process uses public-private key cryptography based zero knowledge authentication instead of matching the user entered password in the one or more authentication servers 104.

Figure 21:
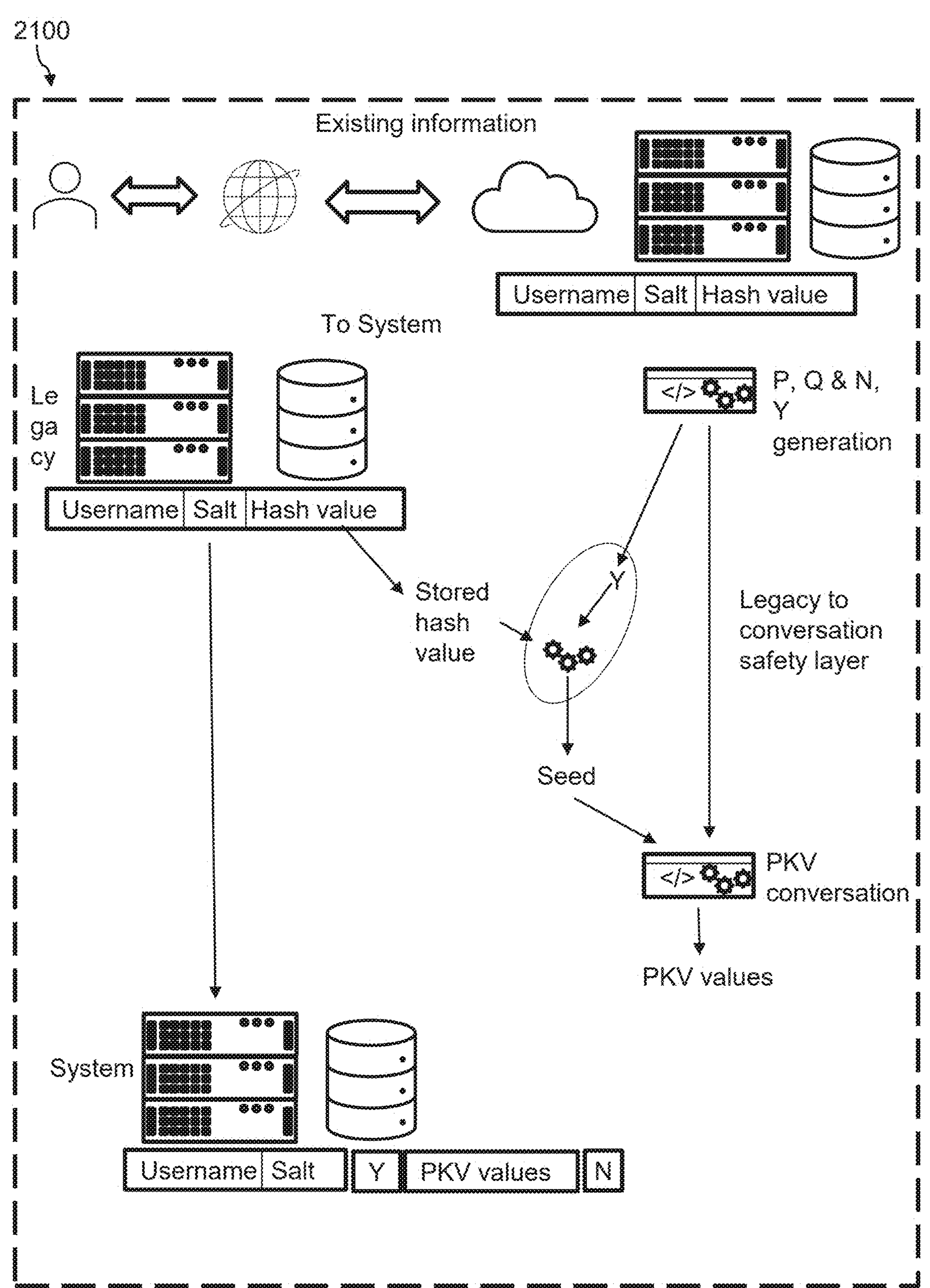
FIG. 21 is a schematic representation depicting a conversion of username and password based authentication to zero knowledge authentication based on public private key cryptography, in accordance with an embodiment of the present disclosure.

FIG. 21 is a schematic representation 2100 depicting the conversion of the username and password based authentication to zero knowledge authentication based on public private key cryptography. The existing legacy authentication that is based on username, salt, and the HASH of salt. In an embodiment, the password is converted into public private key cryptography. The public private key cryptography conversion system generates prime numbers P and Q, public key N=P*Q, and random value Y. The existing Hash value with random value Y is used to generate a strong password, the strong password and the prime numbers P,Q are used to generate the private key values. The new authentication server stores updated user credentials username, salt, Y, private key values, and public key. The login process for the authentication between the one or more user devices 102 and the one or more authentication servers 104 using the computer-implemented system 106, based on the existing information, in accordance with an embodiment of the present disclosure. The schematic representation 2100 depicts that the existing information may be utilized by the computer-implemented system 106 to generate the one or more private key variables.

Figure 22:
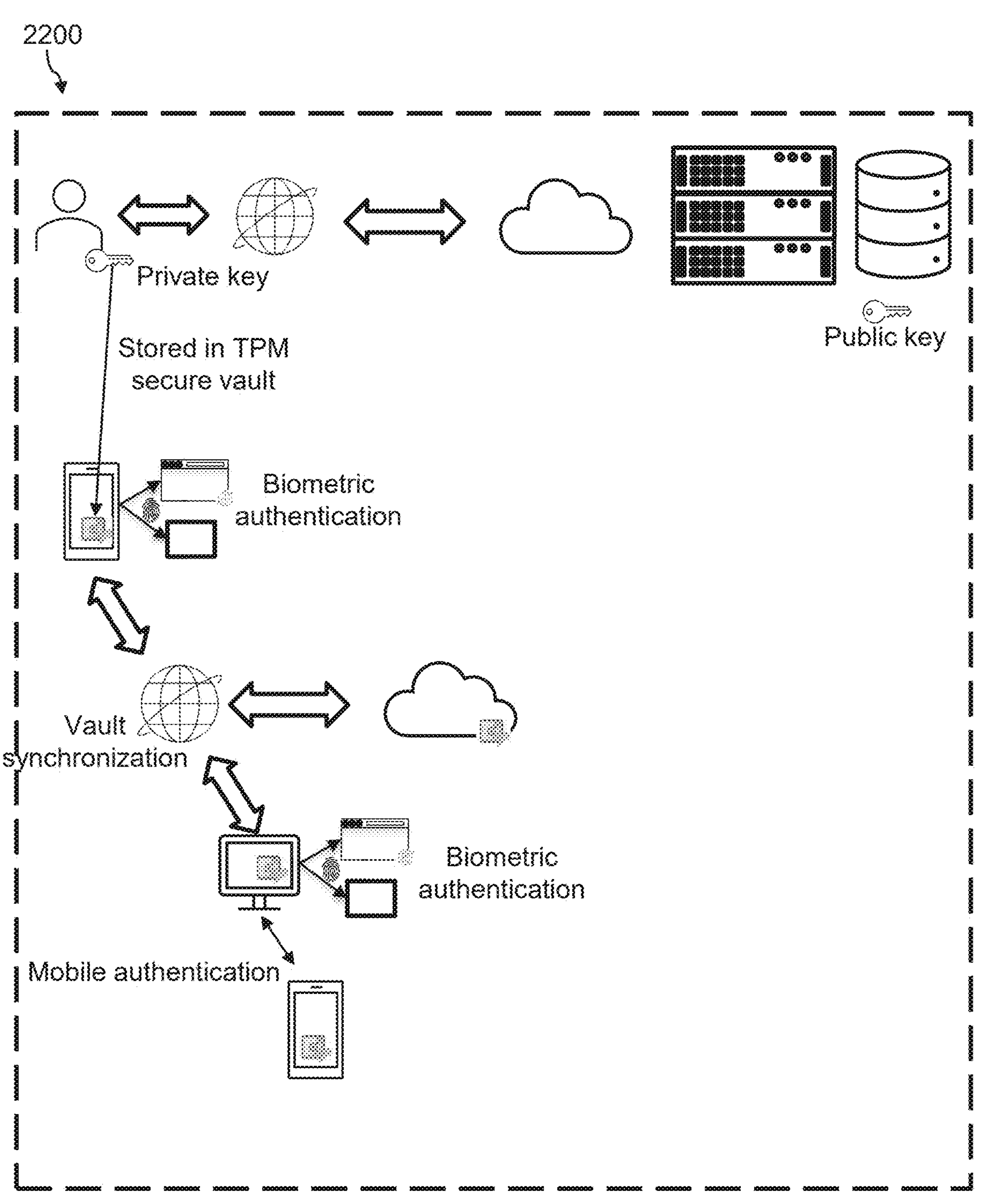
FIG. 22 is a schematic representation depicting a secure vault storing the private keys for the authentication, in accordance with an embodiment of the present disclosure.

FIG. 22 is a schematic representation 2200 depicting a secure vault storing the private keys for the authentication, in accordance with an embodiment of the present disclosure. The schematic representation 2200 depicts that the one or more private keys generated in the one or more user devices 102 may be securely stored in the secure vault (e.g., trusted platform module (TPM)). The securely stored private keys are synchronized across one or more user devices 102 using vault synchronizer. The one or more user devices 102 uses user biometric for authenticating the one or more user device requests for synchronizing the private key stored in the user device 102.

Figure 23:
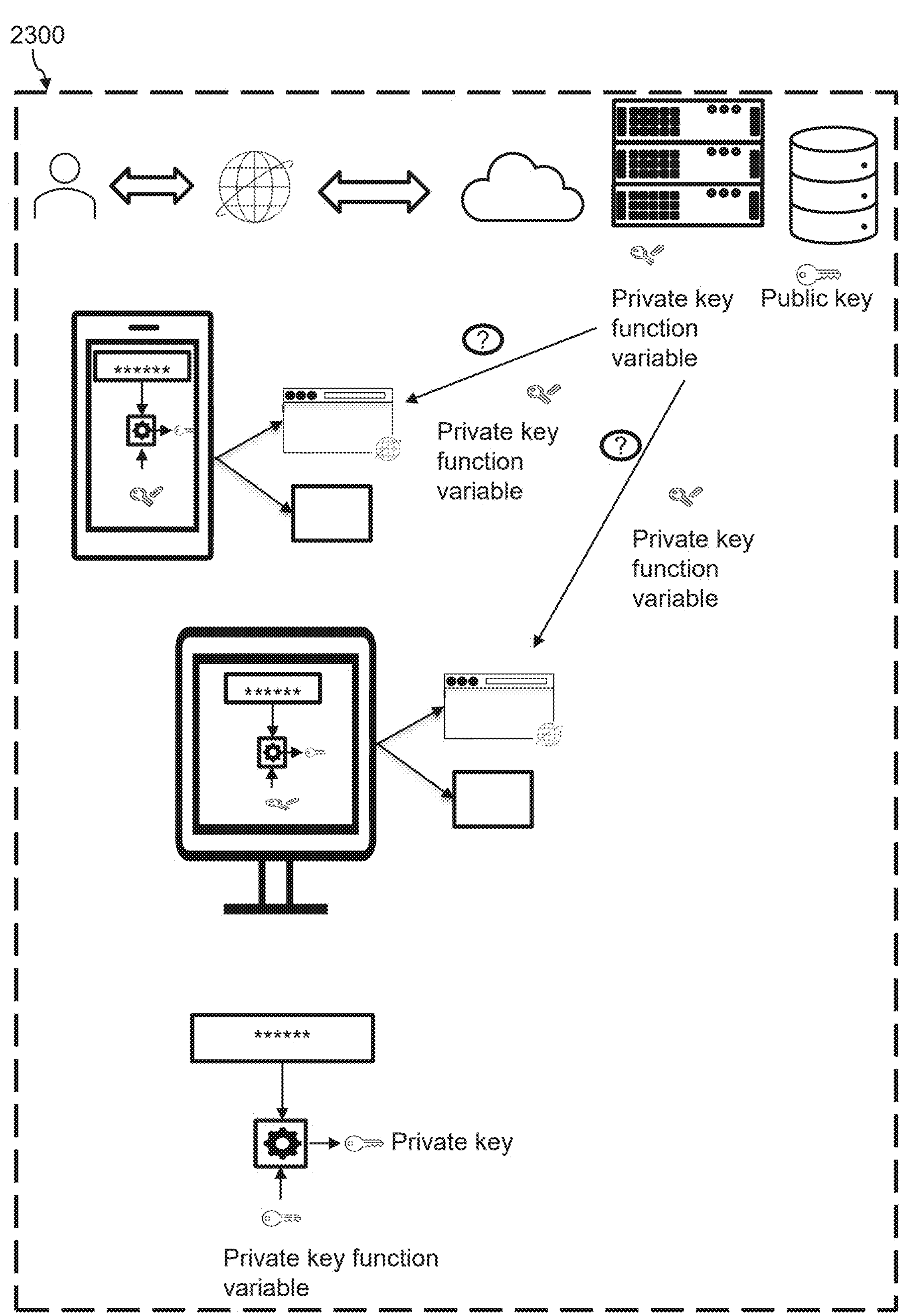
FIG. 23 is a schematic representation depicting the authentication between the one or more user devices and the one or more authentication servers based on one or more private key variables generated from the one or more servers, in accordance with an embodiment of the present disclosure.

FIG. 23 is a schematic representation 2300 depicting the authentication between the one or more user devices 102 and the one or more authentication servers 104 based on one or more private key variables generated from the one or more servers 104, in accordance with an embodiment of the present disclosure. The schematic representation 2300 depicts private key regeneration using the user entered password and the private key variables transmitted by the authentication server 104 in one or more user devices 102, according to an embodiment of the present disclosure.

Figure 24:
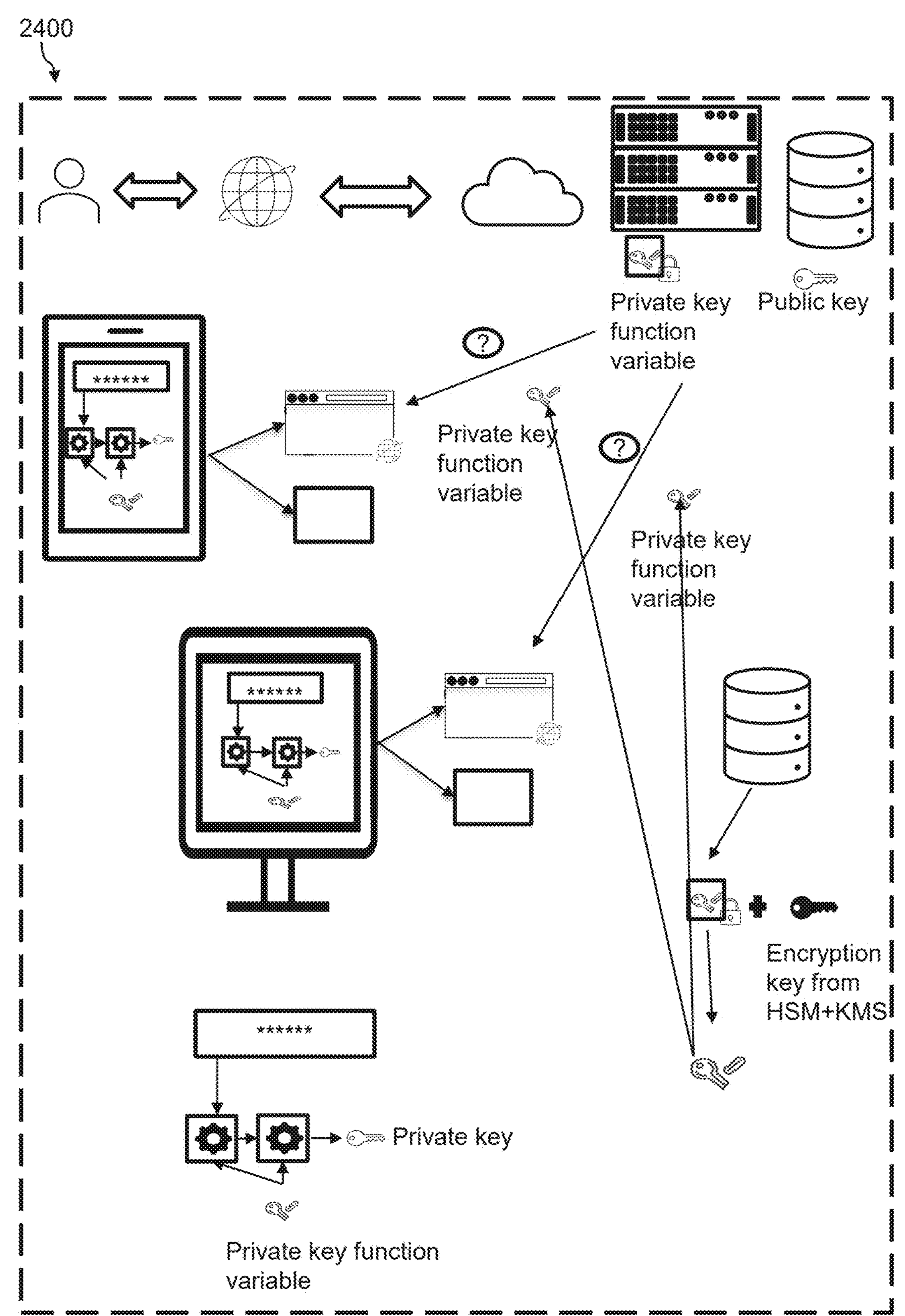
FIG. 24 is a schematic representation depicting the authentication between the one or more user devices and the one or more authentication servers based on the one or more private key variables with one or more encryption keys, in accordance with an embodiment of the present disclosure.

FIG. 24 is a schematic representation 2400 depicting the authentication between the one or more user devices 102 and the one or more authentication servers 104 based on the one or more private key variables with one or more encryption keys, in accordance with an embodiment of the present disclosure. The schematic representation 2400 depicts the private key regeneration using the user entered password and the private key variables transmitted by the authentication server 104 in one or more user devices 102, according to one of the embodiment described. The private key variables are further secured in the authentication server 104 by encrypting the private key variables with key from Hardware Security Module (HSM) and Key Management Service (KSM) subsystem.

Figure 25:
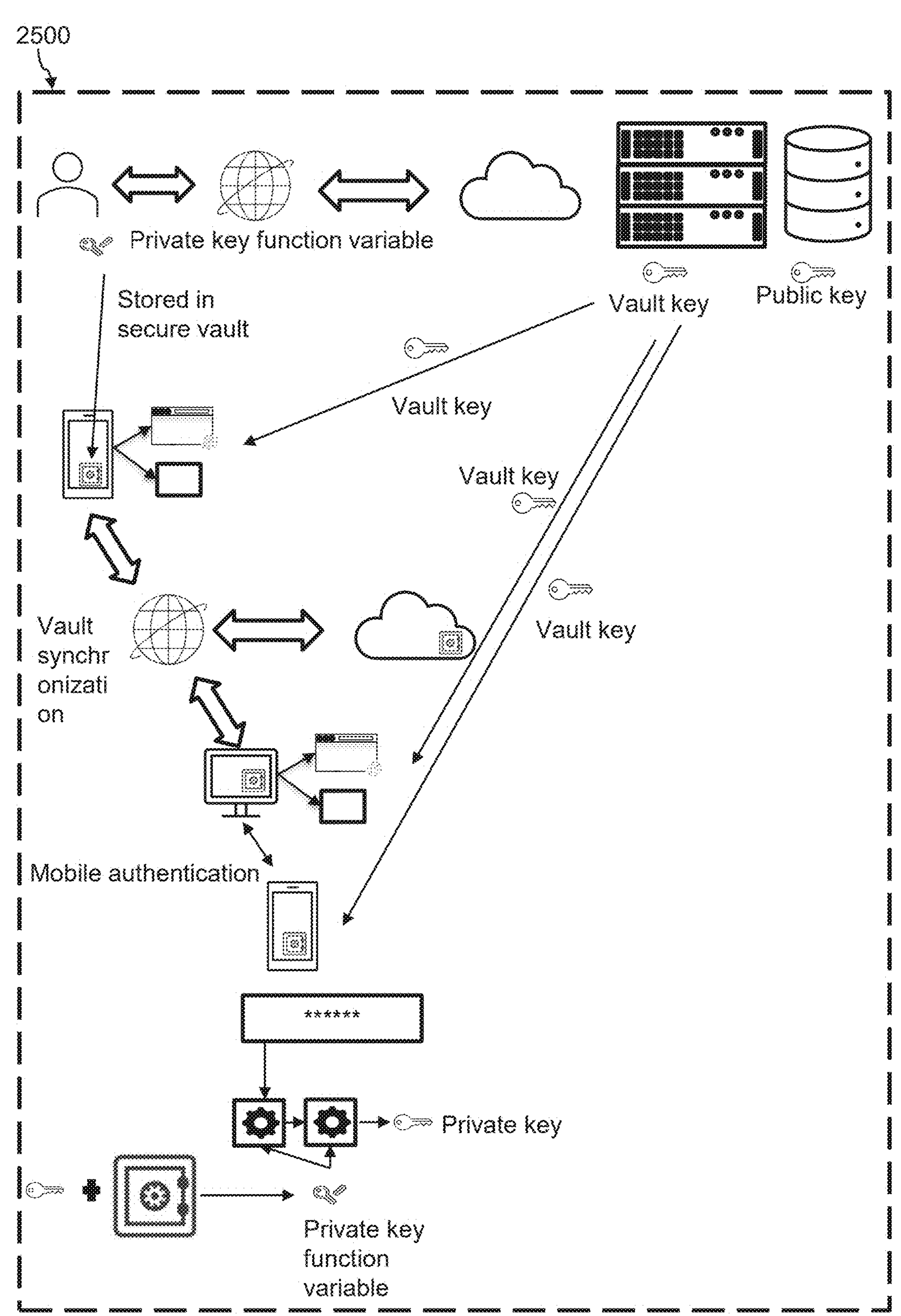
FIG. 25 is a schematic representation depicting the authentication between the one or more user devices and the one or more authentication servers based on one or more vault keys, in accordance with an embodiment of the present disclosure.

FIG. 25 is a schematic representation 2600 depicting the authentication between the one or more user devices 102 and the one or more authentication servers 104 based on one or more vault keys, in accordance with an embodiment of the present disclosure. The authentication server user credentials comprises of at least one of: username, a public key and a second key (e.g., vault key). During the logging in process, when the username matches in the one or more authentication servers 104, the one or more authentication servers 104 transmit the challenge generated using the public key and the vault key. The vault key is an encryption key that is used in the one or more user devices 102 to decrypt the private key stored in the one or more user devices 102 during the registration process. The encrypted private key stored locally in the one or more user devices 102 may be synchronized across the one or more user devices 102 using a synchronization subsystem. The encrypted private key stored locally in the one or more user devices 102 may be viewed as being the vault. In an embodiment, the vault may not be unlocked without the correct key and the private key may not be decrypted correctly without the correct encryption key. The decryption of the private key here is done by the private key regeneration sub system (i.e., the key generation subsystem 218) and the regenerated private key is used to generate the response to the challenge transmitted by the one or more authentication servers 104. The one or more authentication servers 104 compare the transmitted challenge response from the one or more user devices 102 to the challenge generated by the one or more authentication servers 104. In an embodiment, if the challenges match, then the user is authenticated otherwise rejected. In one embodiment, during the registration process, the prime numbers P, Q, of 1024 bit length and a random value R of 256 bit length are generated. The public key N=P*Q is generated and the private keys are encrypted using the random value R. The username, public key N, and the random value R which is the vault key is transmitted to the one or more authentication servers 104 for the registration.

Figure 26:
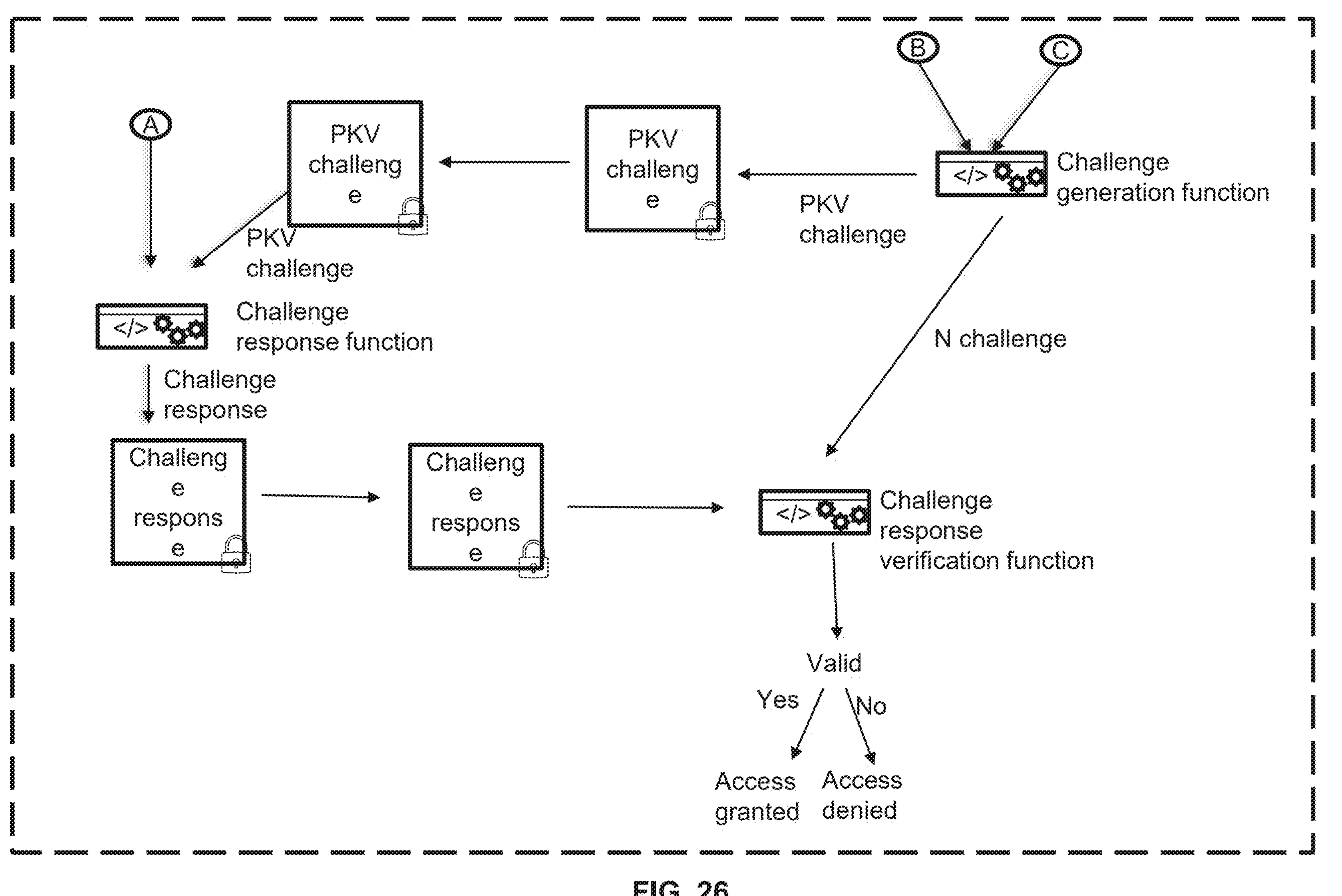
FIG. 26 is a schematic representation depicting the authentication between the one or more user devices and the one or more authentication servers using one or more salts, in accordance with an embodiment of the present disclosure.
Figure 26:
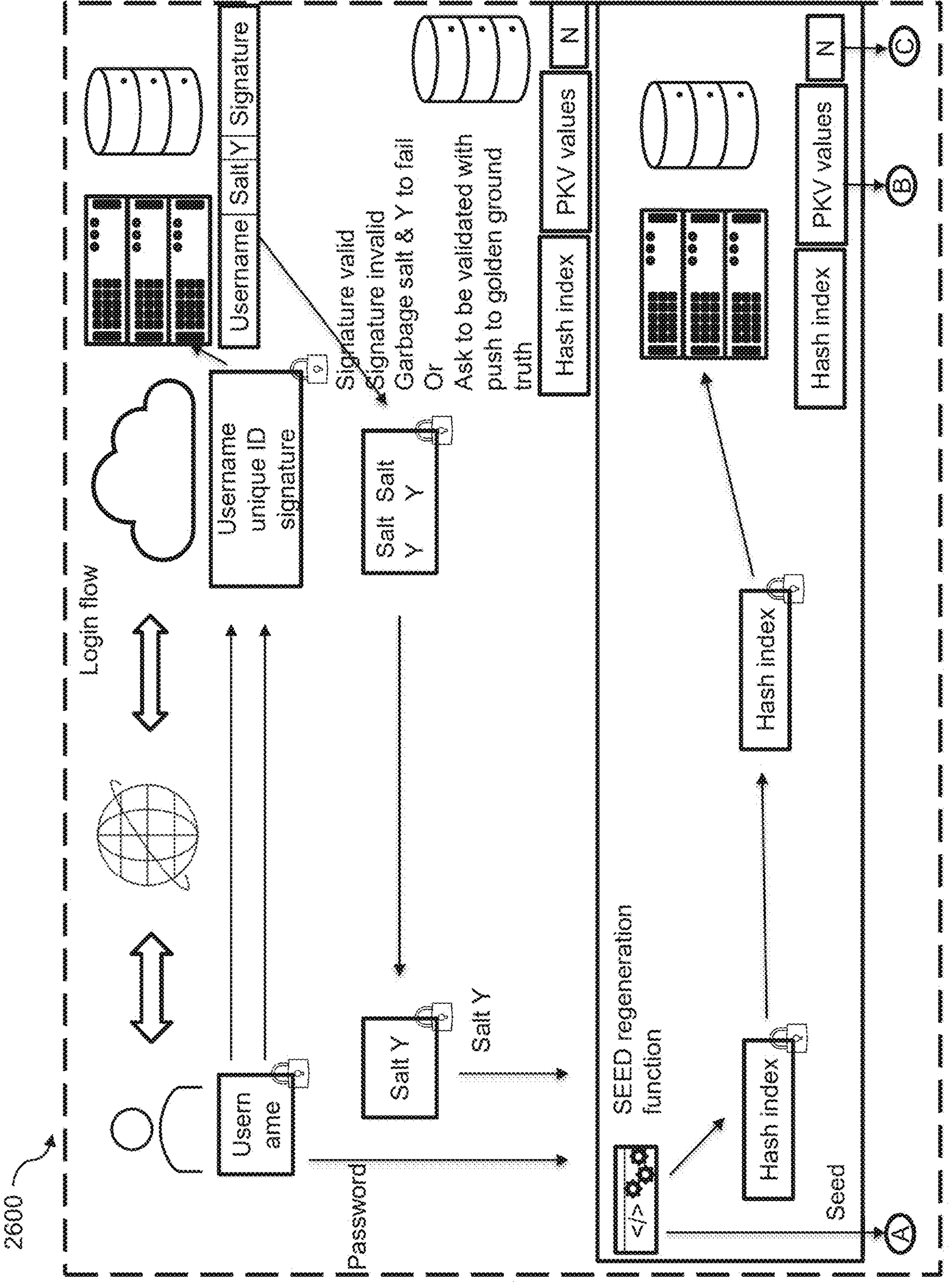

FIG. 26 is a schematic representation 2600 depicting the authentication between the one or more user devices 102 and the one or more authentication servers 104 using one or more salts, in accordance with an embodiment of the present disclosure. The detailed explanation for the logging in process for the authentication between the one or more user devices 102 and the one or more authentication servers 104, is given in the above said alternative embodiments.

Figure 27:
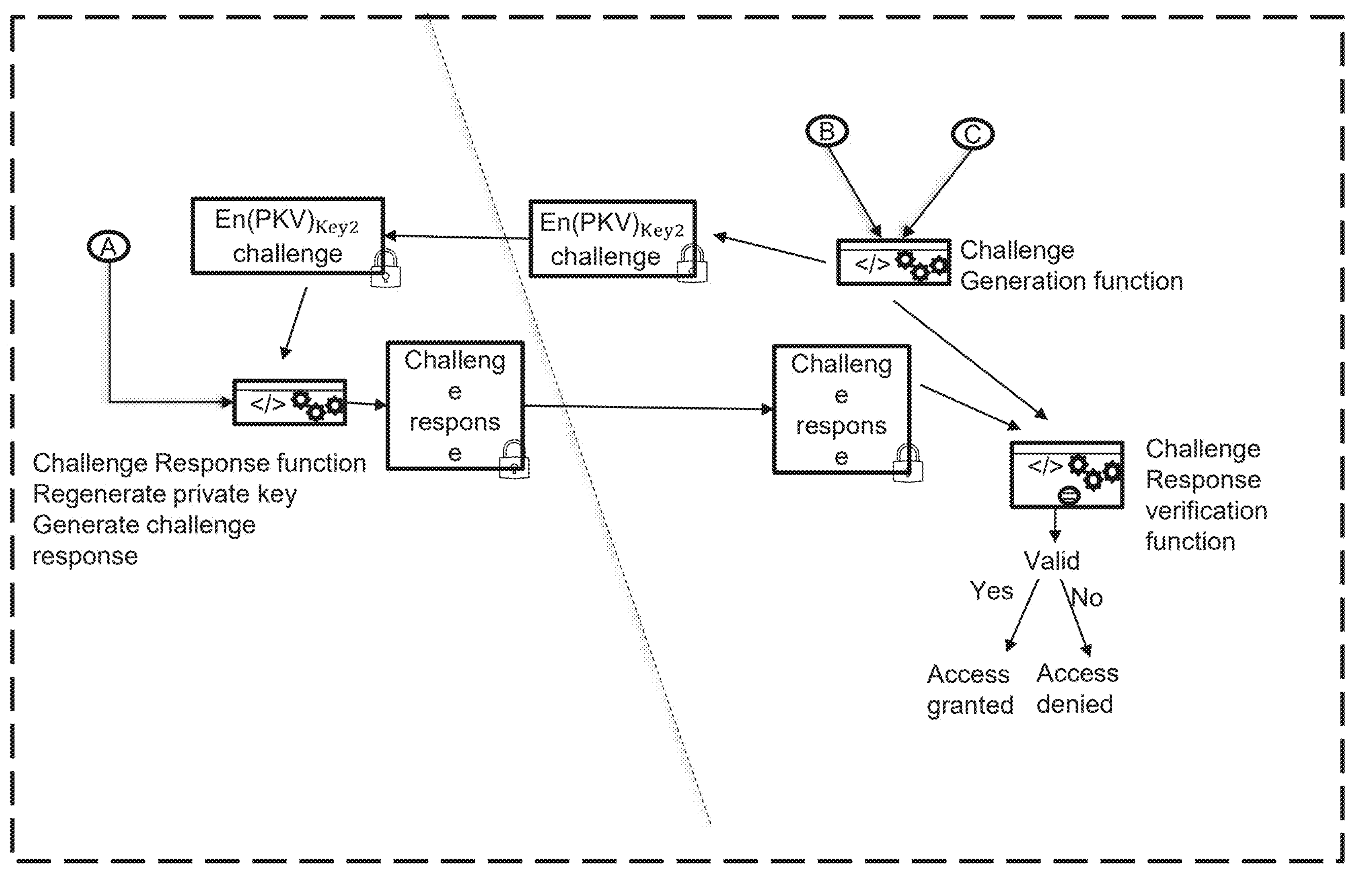
FIG. 27 is a schematic representation depicting the login process for the authentication between the one or more user devices and the one or more authentication servers, based hash square functions, in accordance with an embodiment of the present disclosure.
Figure 27:
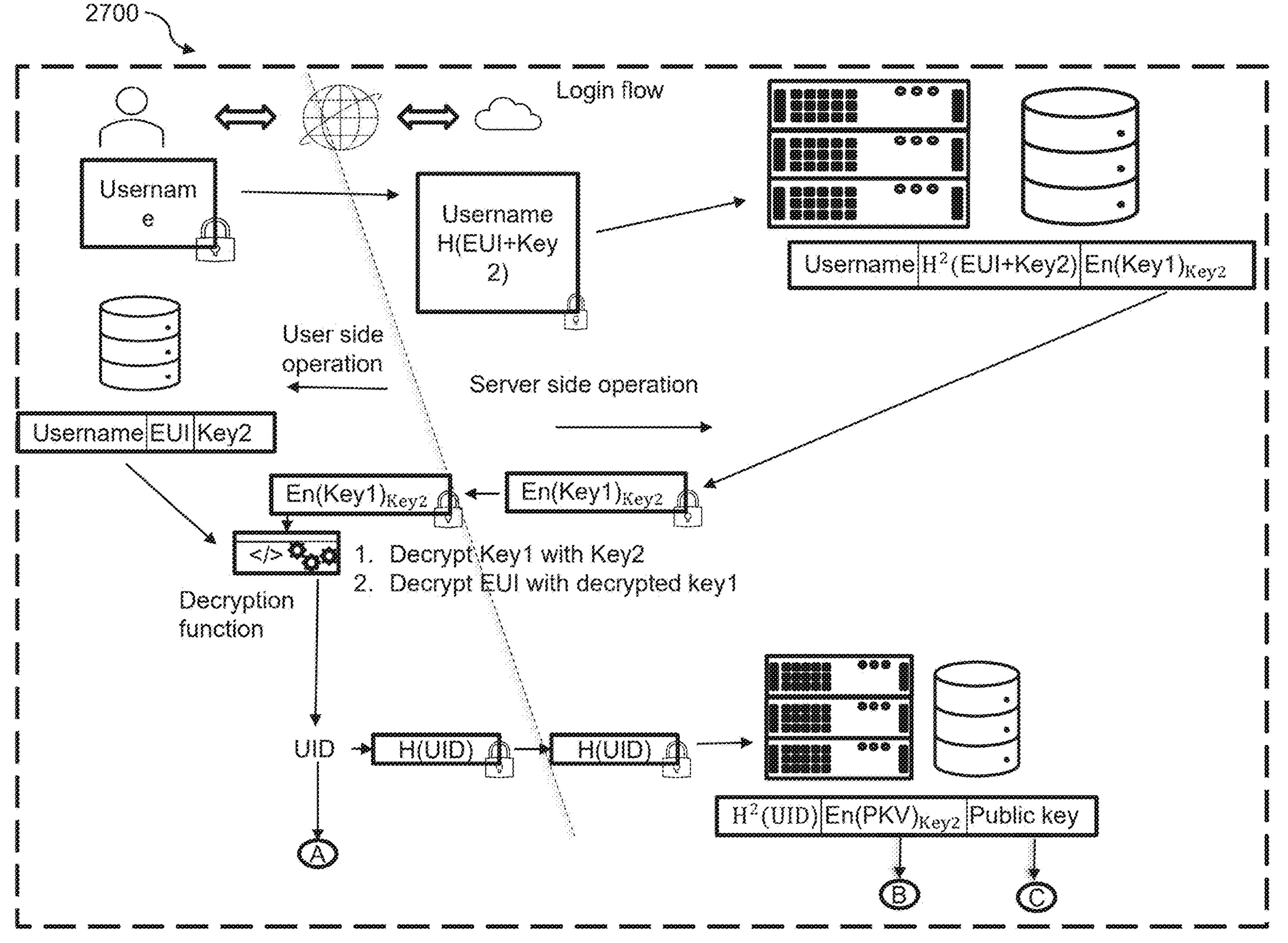

FIG. 27 is a schematic representation 2700 depicting the login process for the authentication between the one or more user devices 102 and the one or more authentication servers 104, based hash square functions, in accordance with an embodiment of the present disclosure. The detailed explanation for the logging in process for the authentication between the one or more user devices 102 and the one or more authentication servers 104, is given in the above said alternative embodiments.

FIG. 28 is an exemplary process 2800 depicting an implementation for authentication between the one or more user devices 102 and the one or more authentication servers 104, in accordance with an embodiment of the present disclosure. The detailed explanation for the implementation for authentication between the one or more user devices 102 and the one or more authentication servers 104, is given in above paragraphs.

Figure 29:
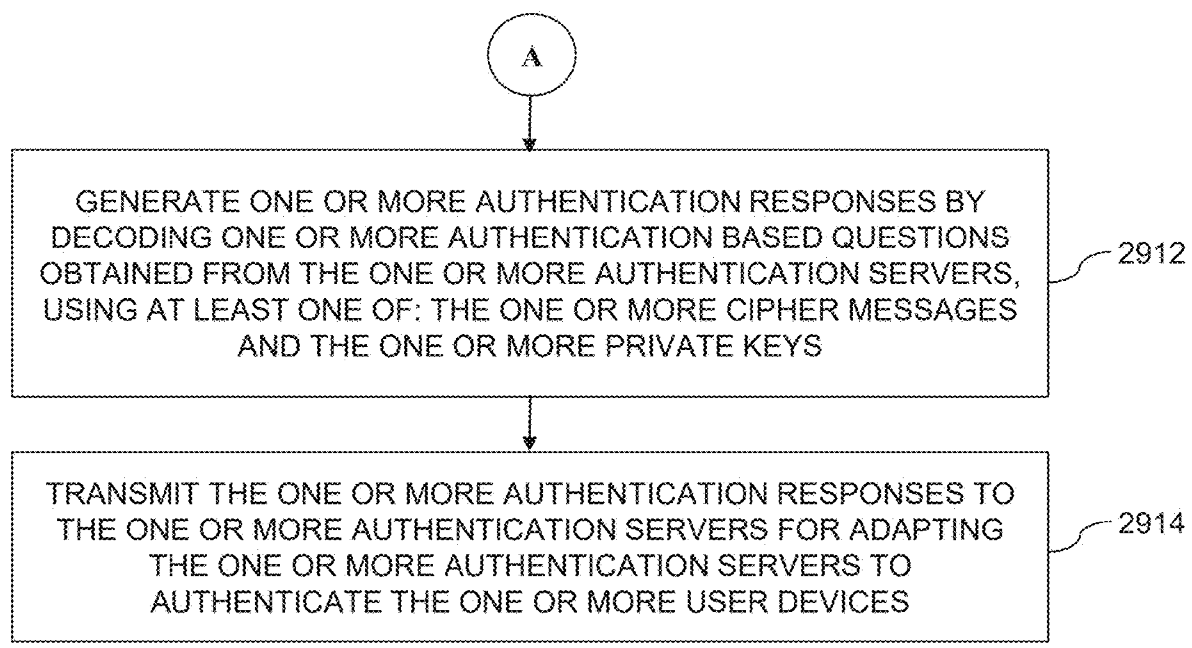
FIG. 29 is a flow chart illustrating a computer-implemented method for managing the authentication between the one or more user devices and the one or more authentication servers based on the generation of the one or more private keys using the private-public key cryptography, in accordance with an embodiment of the present disclosure.
Figure 29:
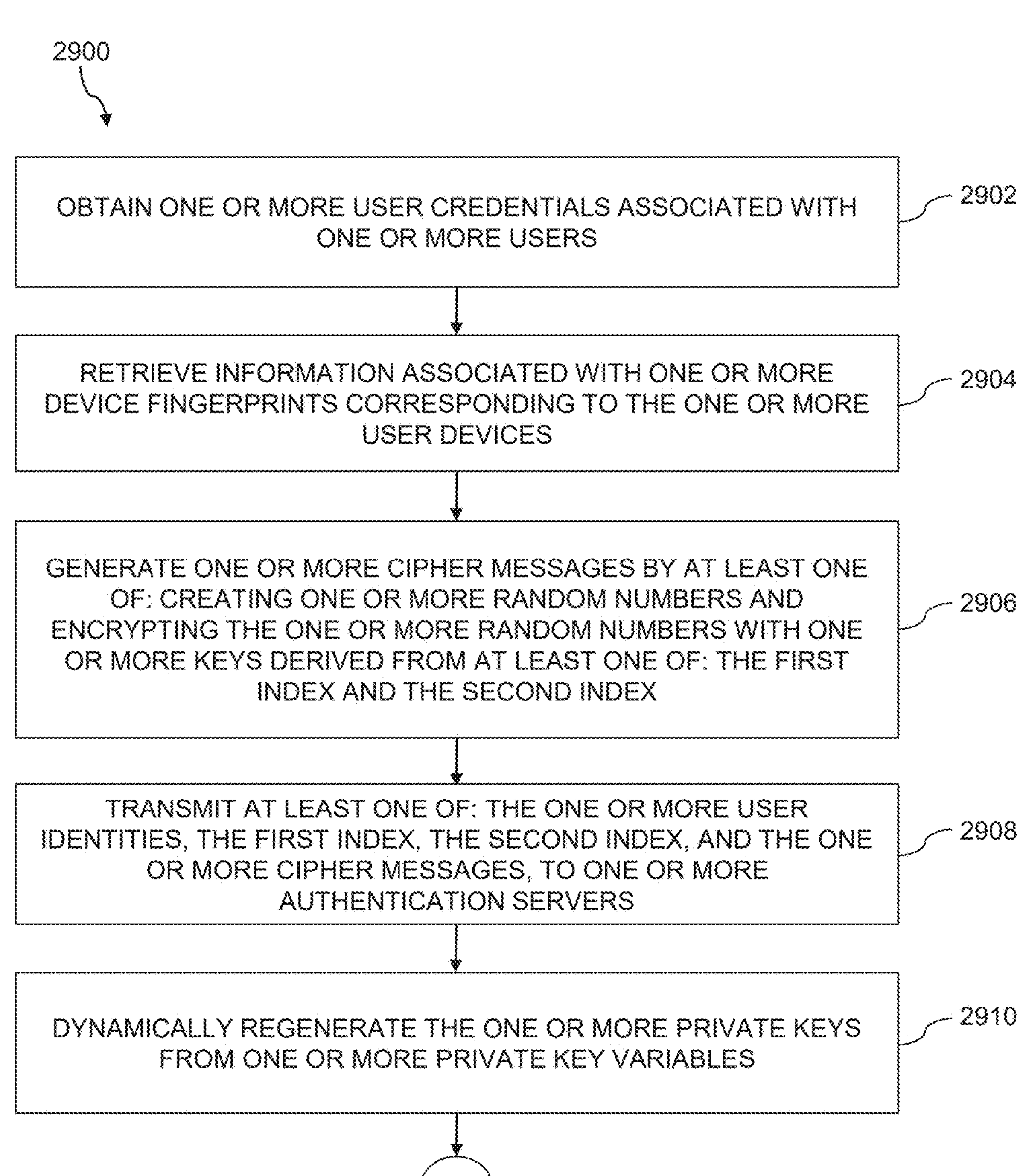

FIG. 29 is a flow chart illustrating a computer-implemented method 2900 for managing the authentication between the one or more user devices 102 and the one or more authentication servers 104 based on the generation of the one or more private keys using the private-public key cryptography, in accordance with an embodiment of the present disclosure.

At step 2902, the one or more user credentials associated with one or more users are obtained. In an embodiment, the one or more user credentials comprise at least one of: one or more user identities (ID) and one or more passwords, associated with the one or more users.

At step 2904, the information associated with one or more device fingerprints corresponding to the one or more user devices 102, is retrieved. In an embodiment, retrieving the information associated with the one or more device fingerprints comprises regenerating one or more indices comprising at least one of: first index and second index, associated with the one or more device fingerprints.

At step 2906, the one or more cipher messages are generated by at least one of: creating one or more random numbers and encrypting the one or more random numbers with one or more keys derived from at least one of: the first index and the second index.

At step 2908, at least one of: the one or more user identities, the first index, the second index, and the one or more cipher messages, is transmitted to one or more authentication servers 104. At step 2910, the one or more private keys are dynamically generated from one or more private key variables using the one or more passwords.

At step 2912, the one or more authentication responses are generated by decoding one or more authentication based questions obtained from the one or more authentication servers, using at least one of: the one or more cipher messages and the one or more private keys. At step 2914, the one or more authentication responses are transmitted to the one or more authentication servers 104 for adapting the one or more authentication servers 104 to authenticate the one or more user devices 102.

The present invention has following advantages. The present invention with the computer-implemented system 106 utilizes the private-public key cryptography based on the zero knowledge proof for authentication called zero knowledge authentication. The one or more authentication servers 104 may store only the public key which does not provide any information about the private key and the one or more authentication servers 104 are not feasible to derive the private key from the public key. The private key(s) variables stored in the one or more authentication servers 104 may not provide extra information about the private key(s). During the authentication process, the one or more authentication servers 104 may not learn any information about the private key(s) based on the authentication steps.

The present invention with the computer-implemented system 106 may not store the private key(s) anywhere either in the one or more user/client devices 102 or at the one or more authentication servers 104. During the login process, the private key(s) is/are dynamically regenerated using multiple different options including at least one of: the one or more passwords/passcodes, the one or more biometric information, the one or more device fingerprints, and one or more external devices connected through universal serial bus (USB)/Bluetooth/Near-Field communication (NFC).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the computer-implemented system 106 either directly or through intervening I/O controllers. Network adapters may also be coupled to the computer-implemented system 106 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 106 in accordance with the embodiments herein. The computer-implemented system 106 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the computer-implemented system 106. The computer-implemented system 106 can read the inventive instructions on the program storage devices and follow these instructions to execute the methodology of the embodiments herein.

The computer-implemented system 106 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

We claim:

1. A computer-implemented method for managing an authentication between one or more user devices and one or more authentication servers based on one or more private keys using private-public key cryptography, the computer-implemented method comprising:

obtaining, by at least one hardware processor of each user device, user credentials associated with one or more users, wherein the user credentials comprise user identities (ID) and public keys;

retrieving, by the at least one hardware processor of each user device, information associated with a device fingerprint corresponding to the respective user device, wherein retrieving the information associated with the device fingerprint comprises regenerating an index associated with the device fingerprint;

generating, by the at least one hardware processor of each user device, a cipher message by creating a random number and encrypting the random number with a key derived from the index;

transmitting, by the at least one hardware processor of each user device, the user identities, the index, and the cipher message, to one or more authentication servers;

dynamically regenerating, by the at least one hardware processor of each user device, a private key for the respective user device from a corresponding private key variable using a corresponding password;

generating, by the at least one hardware processor of each user device, an authentication response by decoding an authentication based question obtained from the one or more authentication servers, using at least one of: the cipher message and the private key; and transmitting, by the at least one hardware processor of each user device, the authentication response to the authentication servers for adapting the one or more authentication servers to authenticate the user devices.

2. The computer-implemented method of claim 1, further comprising:

determining, by the one or more authentication servers, whether the user identities are matched with the index associated with the device fingerprint;

retrieving, by the one or more authentication servers, at least one of: the public keys and the private key variable associated with the respective user device;

decoding, by the one or more authentication servers, the cipher message received from the respective user device;

generating, by the one or more authentication servers, the authentication based question based on at least one of: the decoded cipher message and the random number;

transmitting, by the one or more authentication servers, the private key variables variable and the authentication based question, to the respective user device;

validating, by the one or more authentication servers, the authentication response received from the respective user device;

determining, by the one or more authentication servers, whether the authentication response received from the respective user device is matched with the authentication based question; and authenticating, by the one or more authentication servers, the respective user device upon matching of the authentication response received from the respective user device with the authentication based question.

3. The computer-implemented method of claim 1, further comprising:

determining, by the one or more authentication servers, whether the user identities are matched with the index associated with the device fingerprint;

retrieving, by the one or more authentication servers, at least one of: the random number, one the public keys, and the private key variable associated with the respective user device;

decoding, by the one or more authentication servers, the cipher message received from each user device;

generating, by the one or more authentication servers, the authentication based question based on at least one of: the decoded cipher message and the random number;

transmitting, by the one or more authentication servers, the private key variable, the random number, and the authentication based question, to the respective user device;

validating, by the one or more authentication servers, the authentication response received from each user device;

determining, by the one or more authentication servers, whether the authentication response received from the respective user device is matched with the authentication based question; and authenticating, by the one or more authentication servers, the respective user device upon matching of the authentication response received from the respective user device with the authentication based question.

4. The computer-implemented method of claim 1, further comprising, prior to generating the private keys, generating, by the at least one hardware processor of each user device, optimized passwords using at least one of: the user identities, the strong passwords, and the random number.

5. The computer-implemented method of claim 1, further comprising:

retrieving, by the at least one hardware processor of each user device, encrypted random numbers from a database, wherein the encrypted random numbers comprise an encrypted first random number, an encrypted second random number, and an encrypted third random number;

generating, by the at least one hardware processor of each user device, a hash index based on the user identities and the encrypted random numbers;

generating, by the at least one hardware processor of each user device, the cipher message by creating the random number and encrypting the random number using a hash function of the public keys as an encryption key;

transmitting, by the at least one hardware processor of each user device, the user identities, the hash index, and the encrypted the random number, to the one or more authentication servers;

decrypting, by the at least one hardware processor of each user device, the encrypted third random number using the encrypted first random number and the encrypted second random number;

decrypting, by the at least one hardware processor of each user device, the encrypted first random number and the encrypted second random number using the decrypted third random number;

decrypting, by the at least one hardware processor of each user device, encrypted deltas using the decrypted third random number, wherein the encrypted deltas comprise a first delta and a second delta, and wherein the encrypted deltas are differences between prime numbers and the random number; and regenerating by the at least one hardware processor of each user device, the prime numbers based on a combination of the encrypted deltas and the random number.

6. The computer-implemented method of claim 5, further comprising:

determining, by the one or more authentication servers, whether the user identities are matched with the hash index;

retrieving, by the one or more authentication servers, the encrypted third random number and the encrypted deltas;

generating, by the one or more authentication servers, the authentication based question by decrypting the encrypted random number using the hash function of the public keys; and transmitting, by the one or more authentication servers, the authentication based question with the encrypted third random number and the encrypted deltas, to the respective user device.

7. The computer-implemented method of claim 1, further comprising generating, by one or more pre-computation servers, a private key variable and an encryption key, wherein the generation of the private key variable and the encryption key, is isolated from the one or more authentication servers.

8. The computer-implemented method of claim 7, further comprising:

pre-computing, by the one or more pre-computation servers, unique user identities; and transmitting, by the one or more pre-computation servers, the unique user identities to the respective user device.

9. The computer-implemented method of claim 5, further comprising:

determining, by the at least one hardware processor of each user device, whether hash square functions of the public keys sent by the one or more authentication servers are matched with the hash function of the public keys associated with the respective user device; and decrypting, by the at least one hardware processor of each user device, the encrypted third random number using the encrypted first random number and the encrypted second random number upon matching of the hash square functions of the public keys sent by the one or more authentication servers, with the hash function of the public keys associated with the respective user device.

10. The computer-implemented method of claim 1, further comprising:

receiving, by one or more roaming authenticators, one time passwords from each user device; and authenticating, by the roaming authenticators, the authentication servers by utilizing the one time passwords received from the respective user device.

11. A computer-implemented system for managing an authentication between one or more user devices and one or more authentication servers based on one ore more private keys using private-public key cryptography, the computer-implemented system comprising:

the one or more user devices comprising:

at least one hardware processor;

a memory coupled to the at least one hardware processor, wherein the memory comprises a plurality of subsystems in form of programmable instructions executable by the at least one hardware processor, and wherein the plurality of subsystems comprises:

a user credentials obtaining subsystem configured to obtain user credentials associated with one or more users, wherein the user credentials comprise user identities (ID) and public keys;

an information retrieval subsystem configured to retrieve information associated with a device fingerprint corresponding to a respective user device, wherein retrieving the information associated with one the device fingerprint comprises regenerating an index associated with the device fingerprint;

an information generating subsystem configured to generate a cipher message by creating a random number and encrypting the random number with a key derived from the index;

a transmission subsystem configured to transmit the user identities, the index, and the cipher message, to one or more authentication servers;

a key generation subsystem configured to dynamically regenerate a private key for the respective user device from a corresponding private key variable using a corresponding password;

an authentication response generation subsystem configured to generate an authentication response by decoding an authentication based question obtained from the one or more authentication servers, using at least one of: the cipher message and the private key; and the transmission subsystem configured to transmit the authentication response to the one or more authentication servers for adapting the one or more authentication servers to authenticate the one or more user devices.

12. The computer-implemented system as claimed in claim 11, wherein the one or more authentication servers are configured to:

determine whether the user identities are matched with the index associated with the device fingerprint;

retrieve at least one of: public keys and the private key variable associated with the respective user device;

decode the cipher message received from each user device;

generate the authentication based question based on the decoded cipher message and the random number;

transmit the private key variable and the authentication based question, to the respective user device;

validate the authentication response received from each user device;

determine whether the authentication response received from each user device is matched with the authentication based question; and authenticate the respective user device upon matching of the authentication response received from the respective user device with the authentication based question.

13. The computer-implemented system as claimed in claim 11, wherein the one or more authentication servers are further configured to:

determine whether the user identities are matched with the index associated with the device fingerprint;

retrieve at least one of: the random number, the public keys, and the private key variable;

decode the cipher message received from each user device;

generate the authentication based question based on at least one of: the decoded cipher message and the random number;

transmit the private key variable, the random number, and the authentication based question, to the respective user device;

validate the authentication response received from each user device;

determine whether the authentication response received from the respective user device is matched with the authentication based question; and authenticate the respective user device upon matching of the authentication response received from the respective user device with the authentication based question.

14. The computer-implemented system of claim 11, wherein the plurality of subsystems further comprises a password generation subsystem configured to generate optimized passwords using at least one of: the user identities, the strong passwords, and the random number, prior to generating the private keys.

15. The computer-implemented system of claim 11, wherein the plurality of subsystems further comprises:

a key retrieval subsystem configured to retrieve encrypted random numbers from a database, wherein the encrypted random numbers comprise an encrypted first random number, an encrypted second random number, and an encrypted third random number;

an index generation subsystem configured to generate a hash index based on the user identities and the encrypted random numbers;

the information generating subsystem configured to generate the cipher message by at least one of: creating the random number and encrypting the random number using a hash function of the public keys as an encryption key;

the transmission subsystem configured to transmit the user identities, the hash index, and the encrypted random number, to the authentication servers;

a decoding subsystem configured to decrypt the encrypted third random number using the encrypted first random number and the encrypted second random number;

the decoding subsystem further configured to decrypt the encrypted first random number and the encrypted second random number using the decrypted third random number;

the decoding subsystem further configured to decrypt encrypted deltas using the decrypted third random number, wherein the encrypted deltas comprise a first delta and a second delta, and wherein the encrypted deltas are differences between prime numbers and the random number; and the information generation subsystem configured to regenerate the prime numbers based on a combination of the encrypted deltas and the random number.

16. The computer-implemented system of claim 15, wherein the one or more authentication servers are further configured to:

determine whether the user identities are matched with the hash index;

retrieve the encrypted third random number and the encrypted deltas;

generate the authentication based question by decrypting the encrypted random number using the hash function of the public keys; and transmit the authentication based question with the encrypted third random number and the encrypted deltas, to the respective user device.

17. The computer-implemented system of claim 11, further comprising one or more pre-computation servers configured to generate a private key variable and an encryption key, wherein the generation of the private key variable and the encryption key, is isolated from the one or more authentication servers.

18. The computer-implemented system of claim 17, wherein the pre-computation servers are further configured to:

pre-compute unique user identities; and transmit the unique user identities to the respective user device.

19. The computer-implemented system of claim 15, wherein the plurality of subsystems further comprises:

a matching subsystem configured to determine whether hash square functions of the public keys sent by the one or more authentication servers are matched with the hash function of the public keys; and the decoding subsystem configured to decrypt the encrypted third random number using the encrypted first random number and the encrypted second random number upon matching of the hash square functions of the public keys sent by the one or more authentication servers, with the hash function of the public keys.

20. A non-transitory computer-readable storage medium having instructions stored therein that when executed by one hardware processors, cause the hardware processors to execute operations of:

obtaining user credentials associated with one or more users, wherein the user credentials comprise user identities (ID) and public keys;

retrieving information associated with a device fingerprint corresponding to a respective user device, wherein retrieving the information associated with device fingerprint comprises regenerating an index associated with the device fingerprint;

generating a cipher message by creating a random number and encrypting the random number with a key derived from the index;

transmitting the user identities, the index, and the cipher message, to one or more authentication servers;

dynamically regenerating a private key for the respective user device from a corresponding private key variable using a corresponding password;

generating an authentication response by decoding an authentication based question obtained from the authentication servers, using at least one of: the cipher message and the private key; and transmitting the authentication response to the one or more authentication servers for adapting the one or more authentication servers to authenticate the one or more user devices.

* * * * *